US011396152B1

(12) United States Patent
Roy

(10) Patent No.: US 11,396,152 B1
(45) Date of Patent: Jul. 26, 2022

(54) SELF-HEALING VEHICLE WITH 3D PRINTING DEVICE FOR AUTONOMOUS TIRE REPAIR

(71) Applicant: Matthew MacGregor Roy, Ottawa (CA)

(72) Inventor: Matthew MacGregor Roy, Ottawa (CA)

( * ) Notice: Subject to any disclaimer, the term of this patent is extended or adjusted under 35 U.S.C. 154(b) by 125 days.

(21) Appl. No.: 16/953,137

(22) Filed: Nov. 19, 2020

Related U.S. Application Data

(60) Provisional application No. 62/957,280, filed on Jan. 5, 2020.

(51) Int. Cl.
*B29D 30/54* (2006.01)
*B33Y 30/00* (2015.01)
*B33Y 10/00* (2015.01)

(52) U.S. Cl.
CPC .............. *B29D 30/54* (2013.01); *B33Y 10/00* (2014.12); *B33Y 30/00* (2014.12); *B29D 2030/546* (2013.01)

(58) Field of Classification Search
CPC ................ B29D 30/54; B29D 30/0685; B29D 2030/546; B33Y 10/00; B33Y 30/00
See application file for complete search history.

(56) References Cited

U.S. PATENT DOCUMENTS

2014/0353862 A1* 12/2014 Erdman ................ B29C 64/295 425/17
2015/0174842 A1* 6/2015 Pialot, Jr. ............... B29D 30/68 264/479
2015/0217522 A1* 8/2015 Ragula ...................... B05C 1/00 152/209.1
2016/0185040 A1* 6/2016 Costlow ................ B29C 64/106 264/40.5

FOREIGN PATENT DOCUMENTS

WO WO-2018224757 A1 * 12/2018 ............. B29D 30/02

OTHER PUBLICATIONS

Translation of WO-2018224757-A1, El Oulhani M, Dec. 2018 (Year: 2018).*

* cited by examiner

*Primary Examiner* — George R Koch

(57) ABSTRACT

A vehicle comprises a chassis, wheels rotationally mounted to the chassis, each wheel being disposed within a respective wheel well, and a tire mounted to each wheel. A tire sensor disposed within the wheel well senses a tire condition and generates and outputs a tire condition signal indicative of the tire condition. A repair controller receives the tire condition signal from the tire sensor and processes the tire condition signal to determine whether to repair the tire. The repair controller is configured to generate and output a tire repair signal. A 3D printing device disposed in the wheel well and communicatively connected to the repair controller receives the tire repair signal and 3D prints an additive reparation to the tire by drawing a tire repair compound from a supply container within the vehicle and by depositing the tire repair compound on the tire to repair the tire.

20 Claims, 52 Drawing Sheets

100
110
120
13
10
12
13

Repair Controller
301

Repair Controller
301

SELF-HEALING VEHICLE WITH 3D PRINTING DEVICE FOR AUTONOMOUS TIRE REPAIR

CROSS-REFERENCE TO RELATED APPLICATIONS

This application claims priority from U.S. Provisional Patent Application 62/957,280 filed Jan. 5, 2020 entitled "VEHICLE WITH 3D PRINTING DEVICE FOR ON-WHEEL TIRE REPAIR".

TECHNICAL FIELD

The present invention relates generally to vehicles and, in particular, to on-wheel repair of vehicle tires.

BACKGROUND

Tires of vehicles become worn over time and may also become damaged. Although worn or damaged tires may be replaced, in some instance it may be possible to repair the worn or damaged tires. Tire re-treading technologies are known. However, tire re-treading requires that the tire and the wheel to which it is mounted be removed from the wheel hub of the vehicle to effect the repair. The repair thus requires significant time and effort to effect. A quicker and more efficient way to repair tires would be highly desirable.

SUMMARY

In general, the present invention provides a self-healing vehicle having a 3D printing device for autonomously repairing a tire while attached to a respective wheel of the vehicle. There may be one 3D printing device for each tire so that each tire can be independently repaired. The 3D printing device deposits a tire compound on the tire to repair the tire. The vehicle may include a tire sensor to sense a tire condition of a tire and to enable the 3D printing device to locate the portion of the tire to repair and to determine how much tire compound to deposit to effect the repair. The vehicle may include a heater to heat the portion of the tire where the tire compound is to be deposited. The vehicle may include a vulcanizer to vulcanize the tire compound. The vehicle may include a laser or other tire-cutting tool to cut or form grooves to refurbish a tread of the tire after deposition of the tire compound. The vehicle may include a cleaner to clean the tire to facilitate inspection and repair.

One inventive aspect of the disclosure is a vehicle comprising a chassis, wheels rotationally mounted to the chassis, each wheel being disposed within a respective wheel well, and a tire mounted to each wheel. A tire sensor disposed within the wheel well senses a tire condition and generates and outputs a tire condition signal indicative of the tire condition. A repair controller receives the tire condition signal from the tire sensor and processes the tire condition signal to determine whether to repair the tire. The repair controller is configured to generate and output a tire repair signal. A 3D printing device disposed in the wheel well and communicatively connected to the repair controller receives the tire repair signal and 3D prints an additive reparation to the tire by drawing a tire repair compound from a supply container within the vehicle and by depositing the tire repair compound on the tire to repair the tire. As such, the vehicle is a self-healing vehicle capable of autonomously repairing a tire while the tire is on a wheel and the wheel is mounted to the vehicle.

Another inventive aspect of the disclosure is a vehicle comprising a chassis, wheels rotationally mounted to the chassis, each wheel being disposed within a respective wheel well, a tire mounted to each of the wheels, each tire having a tire tread, and a tire tread sensor for sensing a tire tread condition and for generating and outputting a tire tread condition signal indicative of the tire tread condition. The vehicle also includes a repair controller for receiving the tire tread condition signal from the tire sensor and for processing the tire tread condition signal to determine whether to repair the tire tread, wherein the repair controller is configured to generate and output a tire tread repair signal. The vehicle includes a 3D printing device disposed in the wheel well and communicatively connected to the repair controller to receive the tire tread repair signal and to 3D print an additive reparation to the tire tread by drawing a tire repair compound from a supply container within the vehicle and by depositing the tire repair compound on the tire tread to repair the tire tread.

Another inventive aspect of the disclosure is a vehicle comprising a chassis, wheels rotationally mounted to the chassis, each wheel being disposed within a respective wheel well, and a tire mounted to each of the wheels. A coating controller is configured to generate and output a tire coating signal and a coating-dispensing device disposed in the wheel well and communicatively connected to the coating controller to receive the tire coating signal and to coat the tire by drawing a coating from a coating supply container within the vehicle and by coating the tire with the coating.

Another inventive aspect of the disclosure is a vehicle comprising a chassis, wheels rotationally mounted to the chassis, and a tire mounted to each wheel. Attached to each wheel of the vehicle is an automatically adjustable wheel-balancing weight that is automatically movable in response to a balance control signal from a wheel balance controller to automatically balance the wheel. The wheel-balancing weight may be moved by a wheel-balancing actuator. The wheel may have one or more vibration sensors to detect vibrations that are induced by a rotating imbalance of the wheel-and-tire combination. The automatic balancing of the wheel may be done in response to a tire repair.

Another inventive aspect of the present disclosure is a method of repairing a tire tread of a vehicle when mounted to the vehicle. The method entails sensing a tire tread condition, using a tire sensor disposed within a wheel well of the vehicle, wherein sensing comprises generating and outputting a tire tread condition signal indicative of the tire tread condition. The method further entails receiving, by a repair controller, the tire tread condition signal from the tire sensor and processing the tire tread condition signal to determine whether to repair the tire tread, the repair controller generating and outputting a tire tread repair signal. The method further entails receiving the tire tread repair signal by a 3D printing device and, in response to receiving the tire tread repair signal, depositing a tire repair compound using a 3D printing device on a portion of the tire tread to repair the tire tread of the tire.

The method may include vulcanizing the tire repair compound after depositing the tire repair compound.

The method may include heating the portion of the tire tread prior to depositing the tire repair compound to enhance adhesion of the tire repair compound to the tire tread.

The method may include cutting a groove in the tire repair compound after depositing the tire repair compound.

The method may include autonomously moving the vehicle forward or backward so that rotation of the tires sequentially exposes all portions of the tire tread for sensing and repair.

The foregoing presents a simplified summary of the invention in order to provide a basic understanding of some aspects of the invention. This summary is not an exhaustive overview of the invention. It is not intended to identify essential, key or critical elements of the invention or to delineate the scope of the invention. Its sole purpose is to present some concepts in a simplified form as a prelude to the more detailed description that is discussed later. Other aspects of the invention are described below in relation to the accompanying drawings.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
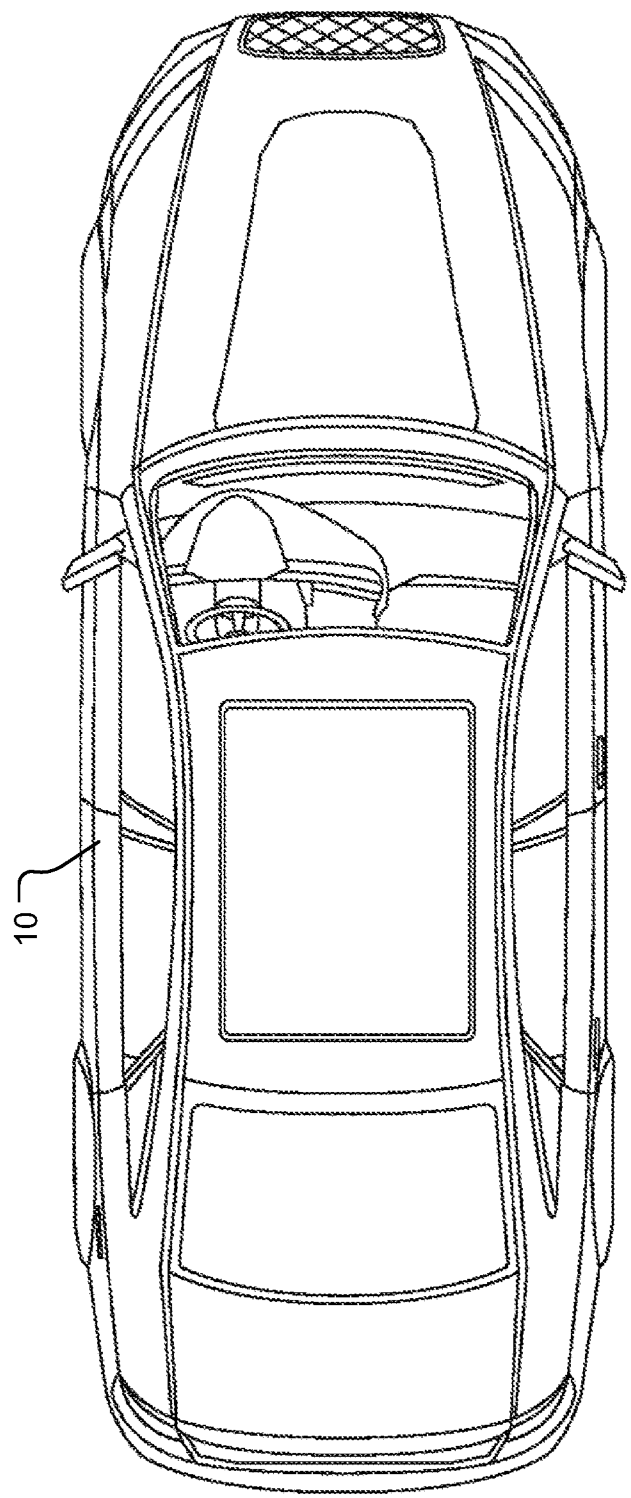
FIG. 1 is a top view of an autonomous electric vehicle in accordance with an embodiment of the present invention.
Figure 2:
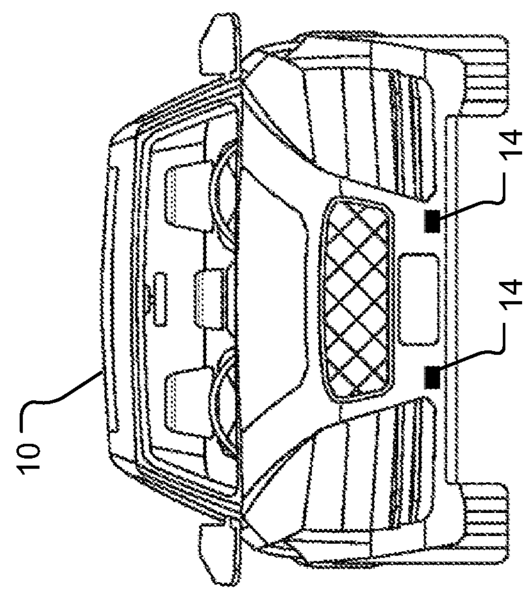
FIG. 2 is a front view of the autonomous electric vehicle of FIG. 1.
Figure 3:
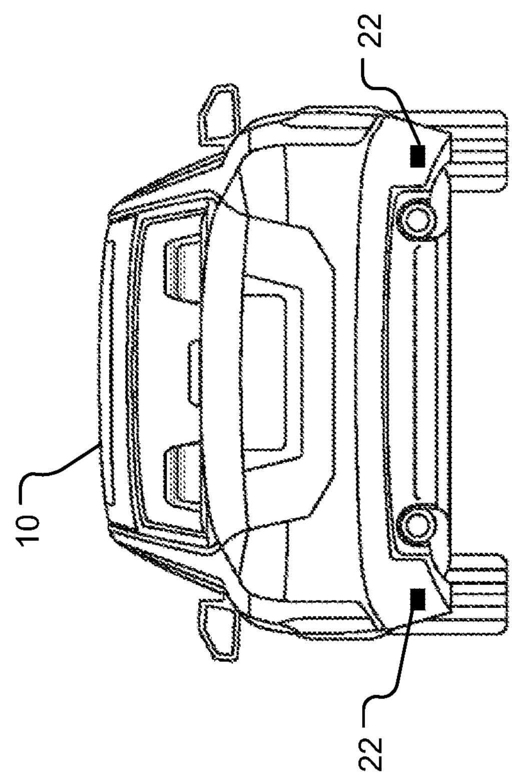
FIG. 3 is a rear view of the autonomous electric vehicle of FIG. 1.
Figure 4:
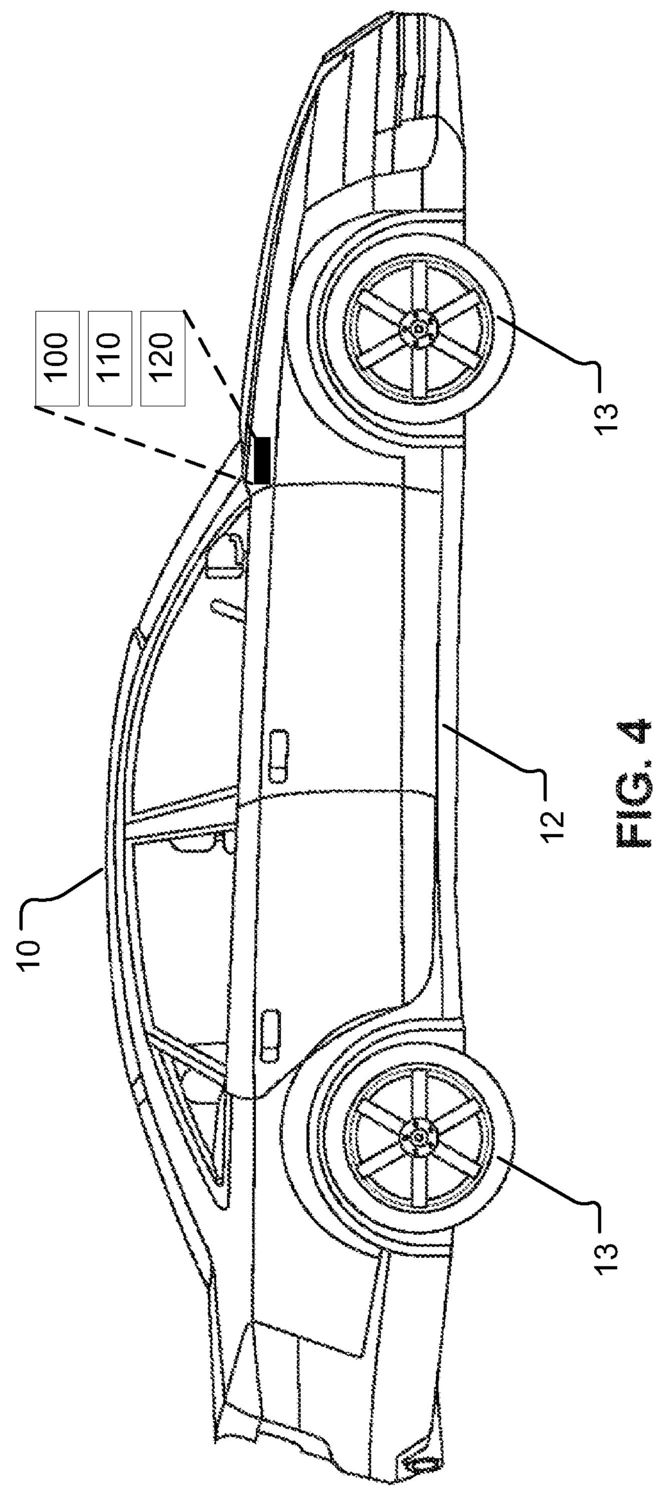
FIG. 4 is a right side view of the autonomous electric vehicle of FIG. 1.

Disclosed herein are various embodiments of a vehicle that automatically performs on-wheel tire repairs. In some embodiments, which are described below in greater detail, the vehicle has a 3D printing device for repairing a tire while attached to a respective wheel of the vehicle. One or more 3D printing devices, e.g. one for each tire, deposits a tire compound on a surface of the tire to additively repair a worn or damaged tire. The vehicle may include a tire sensor for each tire to sense a tire condition of the tire. The tire sensor may provide an image or map of the worn tire to enable the 3D printing device to identify which portion(s) of the tire need repair and the quantity of tire compound that must be deposited to repair the tire. In some embodiments, the vehicle may include a heater for each tire to heat (pre-heat) the portion of the tire where the tire compound is to be deposited in order to enhance adhesion of the depositions on the surface of the tire. In some embodiments, the vehicle may include a vulcanizer for each tire to vulcanize the tire compound. In some embodiments, the vehicle may include a laser or other tire-cutting tool for each tire to cut or form grooves to refurbish a tread of the tire after deposition of the tire compound. The vehicle may include a cleaner for each tire, e.g. a fluid jet cleaner or brush, to clean the tire to facilitate inspection and repair.

For the purposes of this specification, the term "vehicle" is meant to encompass any wheeled vehicle such as a car, van, minivan, sports utility vehicle (SUV), crossover-type vehicle, bus, minibus, truck, tractor-trailer, semi-trailer, construction vehicle, work vehicle, offroad vehicle, electric cart, or the like that has tires on the wheels. The terms "autonomous vehicle" and "self-driving vehicle" are meant to encompass any wheeled vehicle having environment-detecting sensors and a processor, controller, computer, computing device or computer system for autonomously steering, accelerating and braking the vehicle, i.e. self-driving or driving autonomously, without a driver physically touching, interacting with or providing direct or immediate input to the steering wheel, accelerator pedal and brake pedal.

For the purposes of this specification, a mixed-mode (human-drivable and self-drivable) vehicle is a self-driving car, truck, van, etc. that can be optionally driven directly by a human driver sitting in the driver's seat. The mixed-mode vehicle has two operating modes: (i) a conventional human driver mode with a human directly driving the vehicle using the steering wheel, brake pedal and accelerator as is conventionally done with non-autonomous vehicles; and (ii) a self-driving (or autonomous) mode in which the vehicle's processor or computing system drives autonomously without direct human input, whether a human is seated in the driver's seat or not.

FIGS. 1-5 depict an autonomous electric vehicle 10 as one exemplary implementation of a vehicle. The self-driving vehicle or autonomous vehicle (AV) 10 includes, in the illustrated embodiment, a vehicle chassis 12 and a plurality of wheels 13, and an electric motor 16 supported by the chassis and mechanically connected to one or more wheels for providing traction to the one or more of the wheels. The vehicle 10 includes a braking system and a steering system for steering the vehicle via a steering mechanism.

The autonomous vehicle 10 depicted by way of example in FIGS. 1-5 includes a plurality of sensors i.e. environment-detecting sensors for collision avoidance and following a road. The sensors may include RADAR, LIDAR, cameras and ultrasonic rangefinders. The autonomous (or self-driving) vehicle 10 further includes a self-driving processor, processors or computing device(s) configured to receive analog or digital signals (data) from the sensors and to generate steering, acceleration and braking control signals for controlling the steering system, the motor and the braking system of the vehicle. The autonomous driving processor may generate a steering control signal, an acceleration control signal and a braking control signal based on the signals received from the sensors. The autonomous driving processor may also generate other control signals for other subsystems and equipment on the vehicle, e.g. a turn indicator light control signal, a horn control signal, a headlight control signal, a transmission selector signal, an ignition shutoff signal, an ignition start-up signal, a door lock signal, a door unlock signal, a windshield defroster signal, a windshield wiper activation signal, a wiper fluid squirt signal, climate control signal, headlight activation signal, to name but a few.

Figure 5:
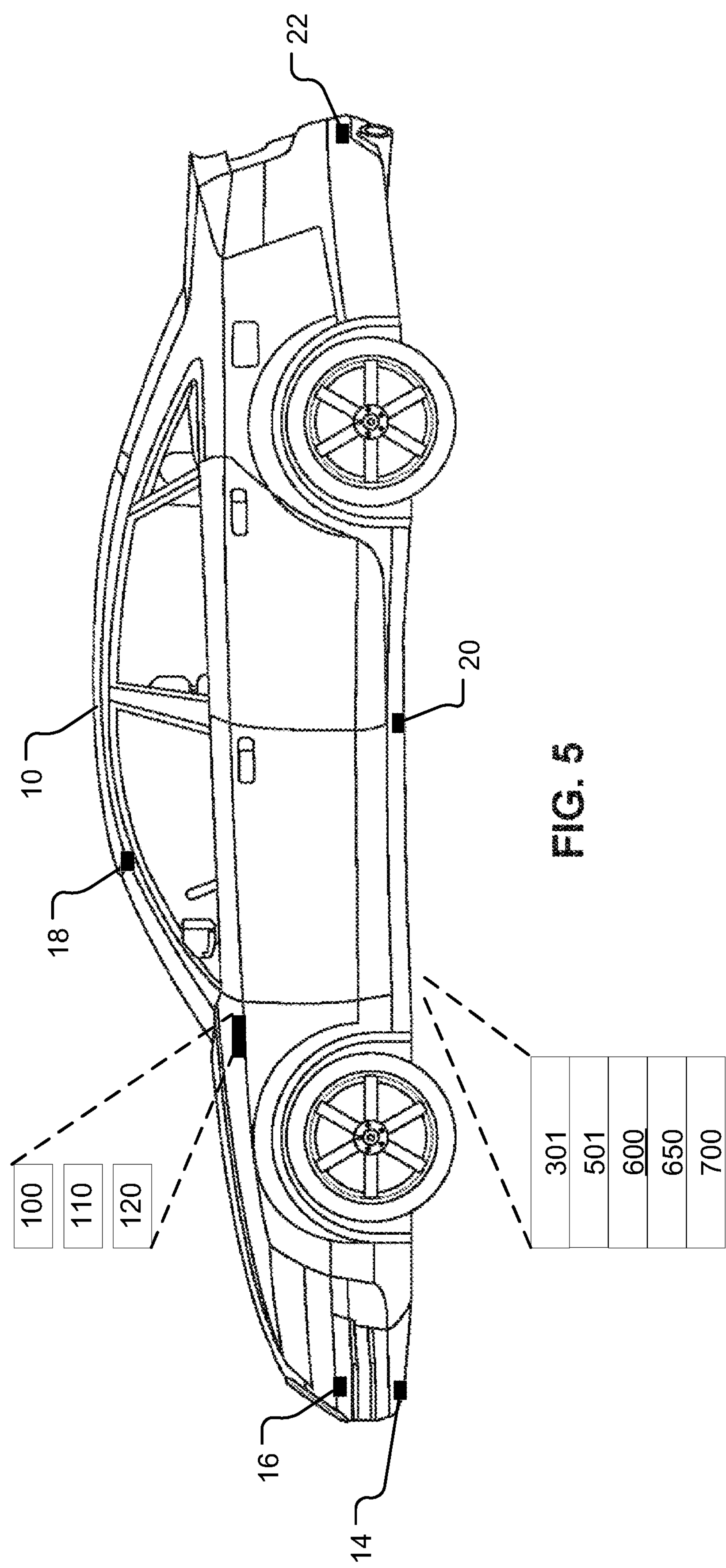
FIG. 5 is a left side view of the autonomous electric vehicle of FIG. 1.
Figure 6:
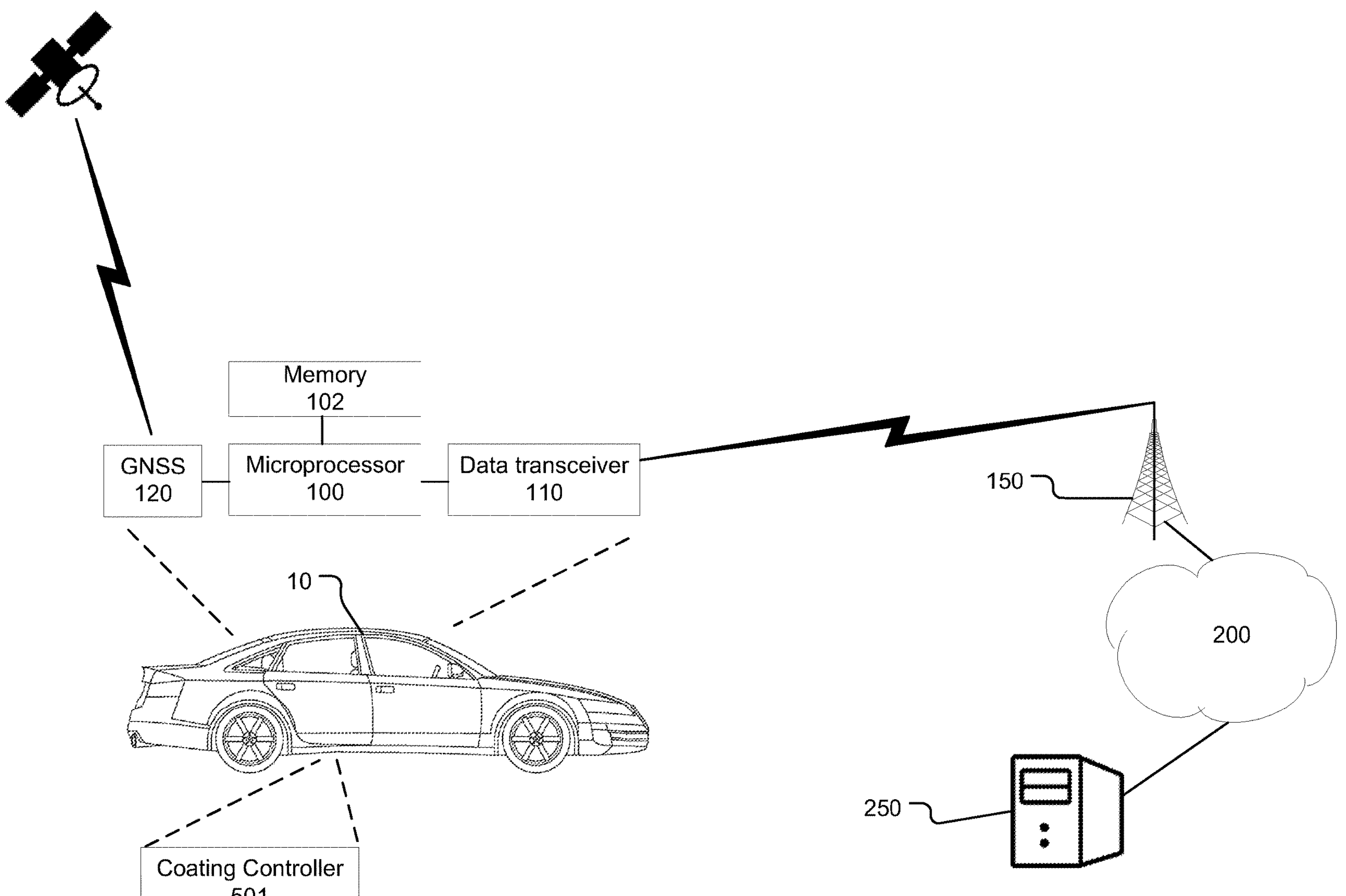
FIG. 6 depicts a vehicle communicating wirelessly with a server to obtain road condition data to enable the vehicle to coat the tires with a suitable tire coating.

In the illustrated embodiment of FIGS. 1-5, the vehicle has a first sensor 14, a second sensor 16, a third sensor 18, a fourth sensor 20, and a fifth sensor 22. In the illustrated embodiment of FIGS. 1-5, the first, second, third, fourth and fifth sensors can be visible-spectrum cameras, infrared cameras and/or thermal imaging cameras. One or more of the sensors can be RADAR or LIDAR. Additional sensors may be provided on the vehicle 10, including additional cameras, additional LIDAR and RADAR sensors. The location of the sensors on the vehicle may be varied from what is shown in the figures. A different suite of sensors from what is illustrated may be used in other variants. These sensors are communicatively connected, either by wired or wireless channels, to the processor 100 for executing the autonomous driving functions based on the sensor input. The processor 100 may be coupled to a memory 102 as shown in FIG. 6.

The autonomous (self-driving) vehicle 10 depicted by way of example in FIGS. 1-6 further includes a radiofrequency data transceiver 110, e.g. a cellular data transceiver, short-range wireless transceiver, a satellite transceiver or any other radiofrequency data transceiver. The data transceiver 110 may be any suitable wireless data transceiver for transmitting and receiving data wirelessly. In one main embodiment, the data transceiver is a cellular data transceiver (e.g. GSM, LTE, 5G or equivalent) that transmits data to a remote internet-connected server 250 via a base transceiver station 150 that provides a data gateway to the internet 200.

The autonomous vehicle 10 depicted by way of example in FIGS. 1-5 further includes a navigation system for autonomously navigating the autonomous electric vehicle to a destination. The navigation system includes a Global Navigation Satellite System (GNSS) receiver 120 for receiving satellite signals and for determining a current location of the autonomous vehicle. The GNSS receiver 120 may be a Global Positioning System (GPS) receiver that decodes satellite signals transmitted by orbiting GNSS satellites. The GNSS (or GPS) receiver may be part of the vehicle navigation system. The GNSS or GPS receiver (e.g. in the form of a chip or chipset) receives GNSS/GPS radio signals transmitted from one or more orbiting GNSS/GPS satellites. References herein to "GPS" are meant to include Assisted GPS and Aided GPS. Although the present disclosure refers expressly to the "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

As will be described in greater detail below, the vehicle 10 in the embodiment shown in FIG. 5 includes one or more of the following controllers: a repair controller 301, a coating controller 501, an extraction controller 600, a patch controller 650 and a balance controller 700. The repair controller 301 controls a tire-repairing system. The coating controller 501 controls a tire-coating system. The extraction controller 600 controls a nail-extraction system. The patch controller 650 controls a tire-patching system. The balance controller 700 controls a tire-balancing system. It will be appreciated that the vehicle may include only one of these systems, all of these systems or any subset or combination of these systems for any one or all of the tires. The controllers 301, 501, 600, 650 and 700 are described and illustrated as separate and discrete controllers but may be combined or integrated into multi-function controllers.

FIG. 6 depicts the vehicle 10 communicating wirelessly with the remote server 250 to obtain road condition data to enable the vehicle 10 to operate a tire-coating subsystem to pre-emptively coat the tires of the vehicle with a suitable tire coating to modify a tire performance characteristic, e.g. to improve tire grip. For example, the road condition data obtained from the remote server 250 may indicate that the road ahead is slippery (e.g. icy or snowy), or that it is wet, dry, etc. In response to obtaining the road condition data, the vehicle 10 may selectively coat the tires with a coating, e.g. to enhance grip for slippery road conditions. The vehicle 10 may be configured to coat all of the tires or only a subset of the tires. The vehicle 10 may be configured to coat the tires only if the road ahead is rated as dangerous or high-risk, e.g. a winding mountain road or if the ambient light conditions are below a predetermined threshold, e.g. nighttime driving. In one embodiment, the coating is designed to wear off after a predetermined distance. In one embodiment, the vehicle 10 includes the coating controller 501 to control a tire-coating system per tire which controls the selective application of a coating to each of the tires. In this embodiment, the coating controller 501 may be configured to determine a distance of the road condition and then apply a suitably thin coating that will wear off when the distance has been traversed. For example, the coating may be an epoxy-based coating, a silicone-based coating, etc. The coating may optionally include a grit (abrasive particles) to further enhance grip. The decision to coat the tire may also be temperature-dependent. The coating controller 501 of the vehicle may determine whether to apply the coating based on the current temperature or the anticipated temperature over the roadway to be traversed. Coating of the tires may be also be done to prolong tire life by minimizing tire wear.

In some embodiments, the vehicle 10 includes a tire-repair system to automatically or autonomously repair tires while mounted to the vehicle. As such, the vehicle can be considered to be a self-healing vehicle that autonomously repairs a tire that is still mounted to the vehicle. The vehicle (or self-healing vehicle) may include a 3D printing device for each tire as described below. Repair of the tires may be initiated in response to an automatic visual inspection of the tires that reveals tire wear or damage. Automatic visual inspection of the tires may be done while driving or parked using one or more tires sensors disposed in the wheel wells of the vehicles. The tire sensors may include lights or illumination devices to facilitate visual inspection in dark conditions.

Inspection of the tires by the tire sensor(s) may be done in response to the vehicle detecting a damage-causing event such as hitting a pot-hole, scraping a curb, hitting an obstacle or debris on the road, an emergency braking incident or other event that may cause tire degradation. Alternatively, inspection by the tire sensor(s) may be performed prior to departing on a journey or trip. Alternatively, inspection by the tire sensor(s) may be performed after completing a journey or trip. Still alternatively, inspection by the tire sensor(s) may be performed at predetermined distances or mileage, e.g. every 50 miles, 100 miles, 200 miles, 500 miles, 1000 miles, etc.

Although in the best mode of implementing this aspect of the invention, the vehicle is a self-healing vehicle that autonomously repairs the tire, it will be appreciated that in another embodiment the 3D printing device of the vehicle is activated and controlled in response to user input or user commands, i.e. the repair is performed not autonomously or automatically but rather in response to user input. In one embodiment, the vehicle determines whether the tire is considered reparable or whether it needs to be replaced. The determination as to whether the tire may be repaired (or refurbished) or whether the tire should be replaced may be based on comparing the degree of measured wear/damage to a predetermined permissible wear/damage threshold. For example, the vehicle may determine that the tire is worn by a certain measured percentage, e.g. 5%, 10%, 15%, etc. If this measured wear percentage is less than the predetermined permissible wear/damage threshold, the tire is repaired. If the measured wear percentage is equal to or greater than the predetermined permissible wear/damage threshold, the tire should be replaced, in which case the vehicle either travels autonomously to a service center or garage for the tire to replaced (or alternatively multiple tires replaced to ensure proper balance) or it display or presents a notification to the user that tire replacement is recommended. The vehicle may also automatically schedule an appointment to replace the tire in response to determining that the tire is not reparable. In another embodiment, the degree of damage/wear sensed by the tire sensor is used by the vehicle to modify or adjust autonomous driving behaviour, e.g. reducing maximal allowable speed, diminishing sharp cornering and/or hard braking, avoiding traveling on rough or unpaved roads, etc. so as to reduce the stress placed on the already damaged/worn tire. In a variant, the autonomous vehicle may change the tire inflation pressure of the damaged/worn tire.

Figure 7:
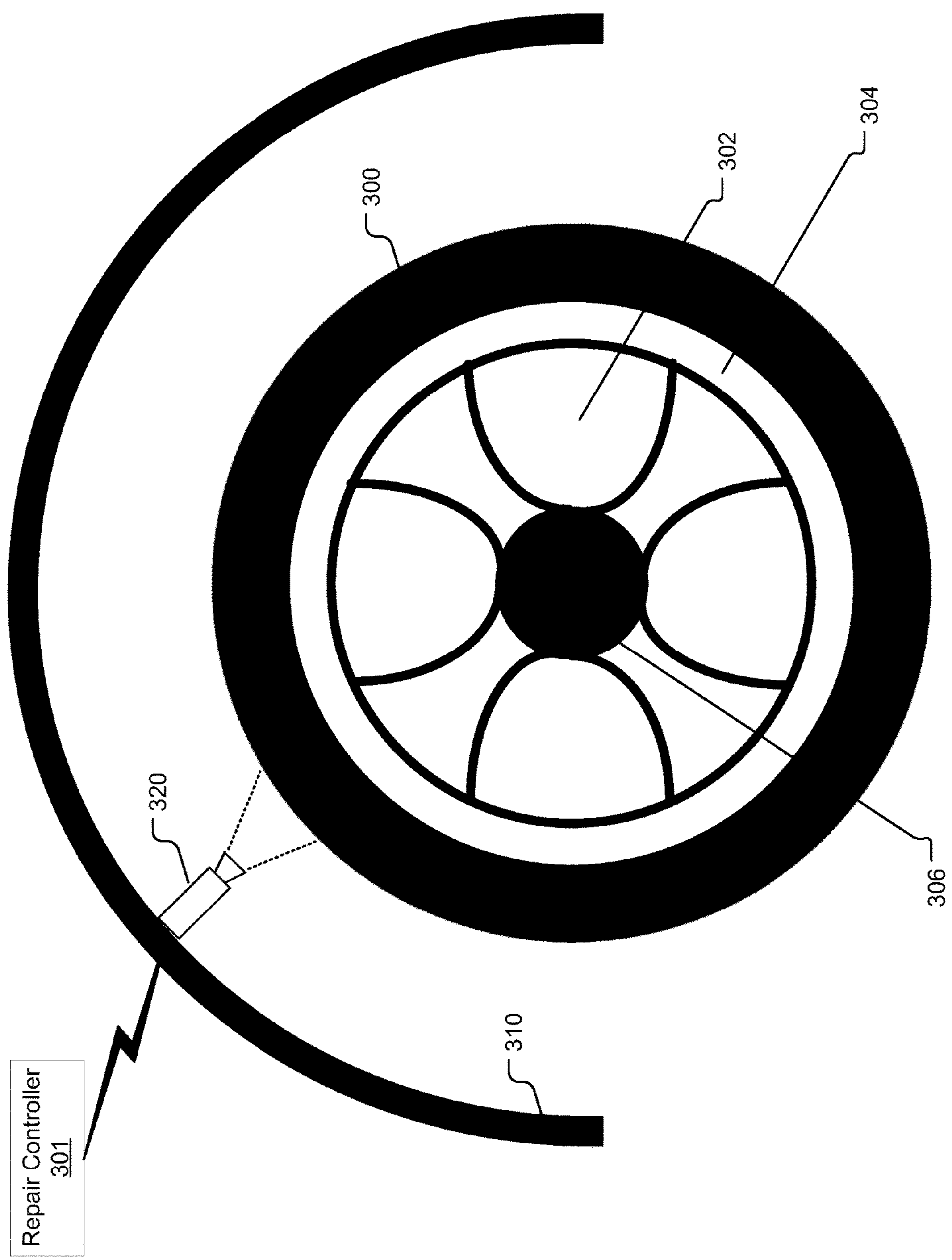
FIG. 7 depicts a tire sensor for sensing a tire condition of a tire of a vehicle.

FIG. 7 is a side view depicting a tire 300 mounted to a wheel 302 of a vehicle. The wheel 302 has a rim 304 and a hub 306. The wheel 300 and tire 302 are disposed within a wheel well 310. In the wheel well is a tire sensor 320 for sensing a tire condition of the tire 300. The tire sensor 320 senses the shape or topology of the tire to determine whether the tire is worn or damaged. The tire sensor 320 may be a visible-spectrum camera, an infrared camera, ultrasonic imager, terahertz imager or functionally equivalent transducer, imager or sensor. There may be one tire sensor per tire for the vehicle. Thus, for a four-wheeled vehicle, there are four tire sensors. In one embodiment, the tire sensor 320 is configured to be activated to sense the tire condition when the wheel and its tire are rotating within a predetermined range of angular velocities or, alternatively, below a maximum rotational speed. The tire sensor 320 provides a tire condition signal to the repair controller 301. The repair controller 301 determines whether to repair the tire based on the tire condition signal. In one embodiment, the repair controller 301 compares an image of the new tire (e.g. the original tire tread) with the current tire condition. If the difference in images is above a predetermined threshold of wear, the repair controller 301 generates and outputs a tire repair signal to cause the tire-repair system to repair the tire. In one embodiment, the tire sensor 320 may be an image sensor of the type described for example in U.S. Pat. No. 10,773,557 or 10,078,892, which are hereby incorporated by reference. A radar-based tread sensor may also be used, such as the one described in U.S. Patent Application 2020/0031173, which is hereby incorporated by reference.

Figure 8:
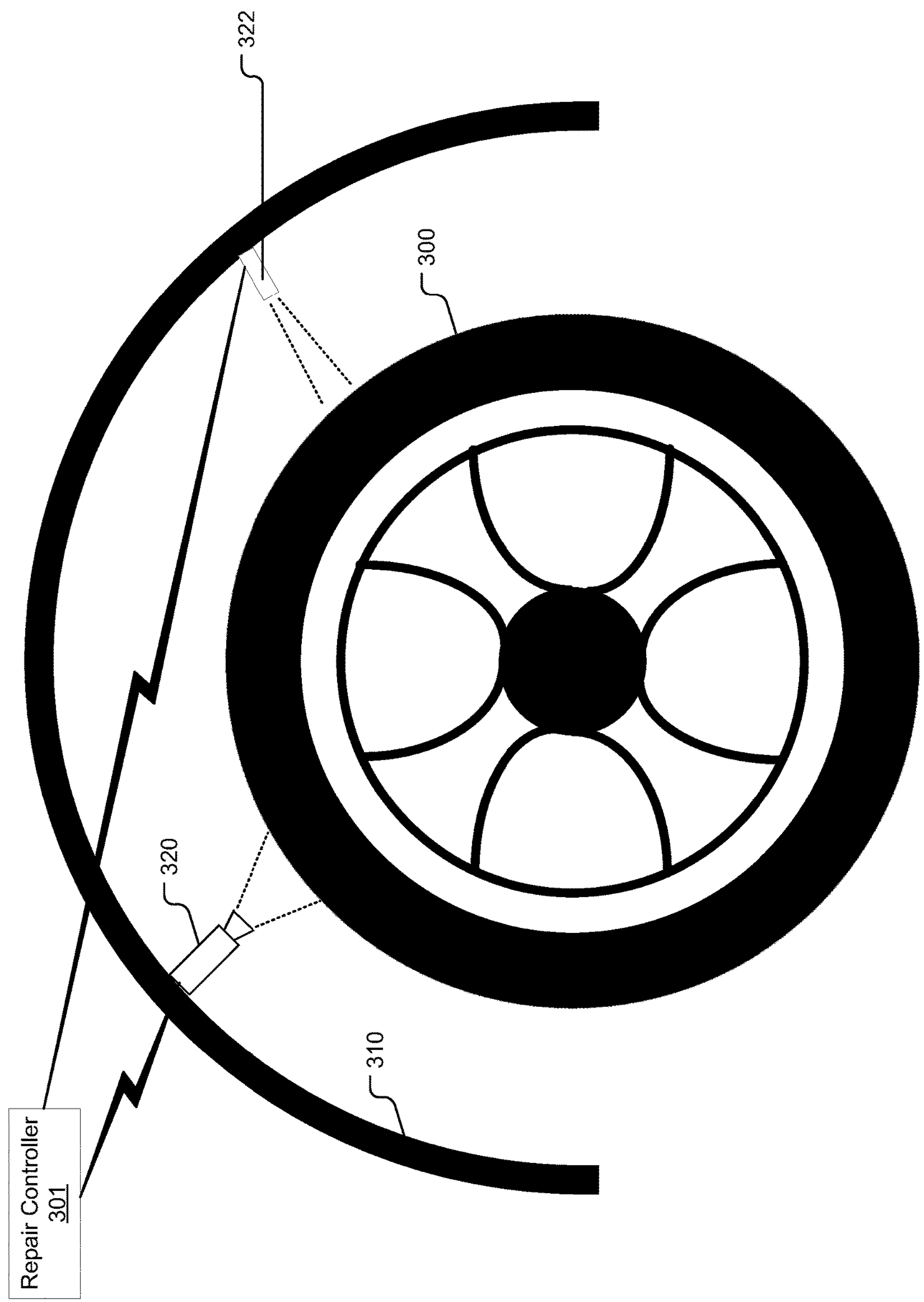
FIG. 8 depicts two tire sensors for sensing a tire condition of a tire of a vehicle.

FIG. 8 depicts two tire sensors for sensing a tire condition of the tire 300. In the embodiment of FIG. 8, the two tire sensors include a first tire sensor 320 and a second tire sensor 322. The first and second tire sensors 320, 322 may be different types of sensors, e.g. one may be a camera and the other an ultrasonic imager. The first and second tire sensors provide first and second tire condition signals to the repair controller 301.

Figure 9:
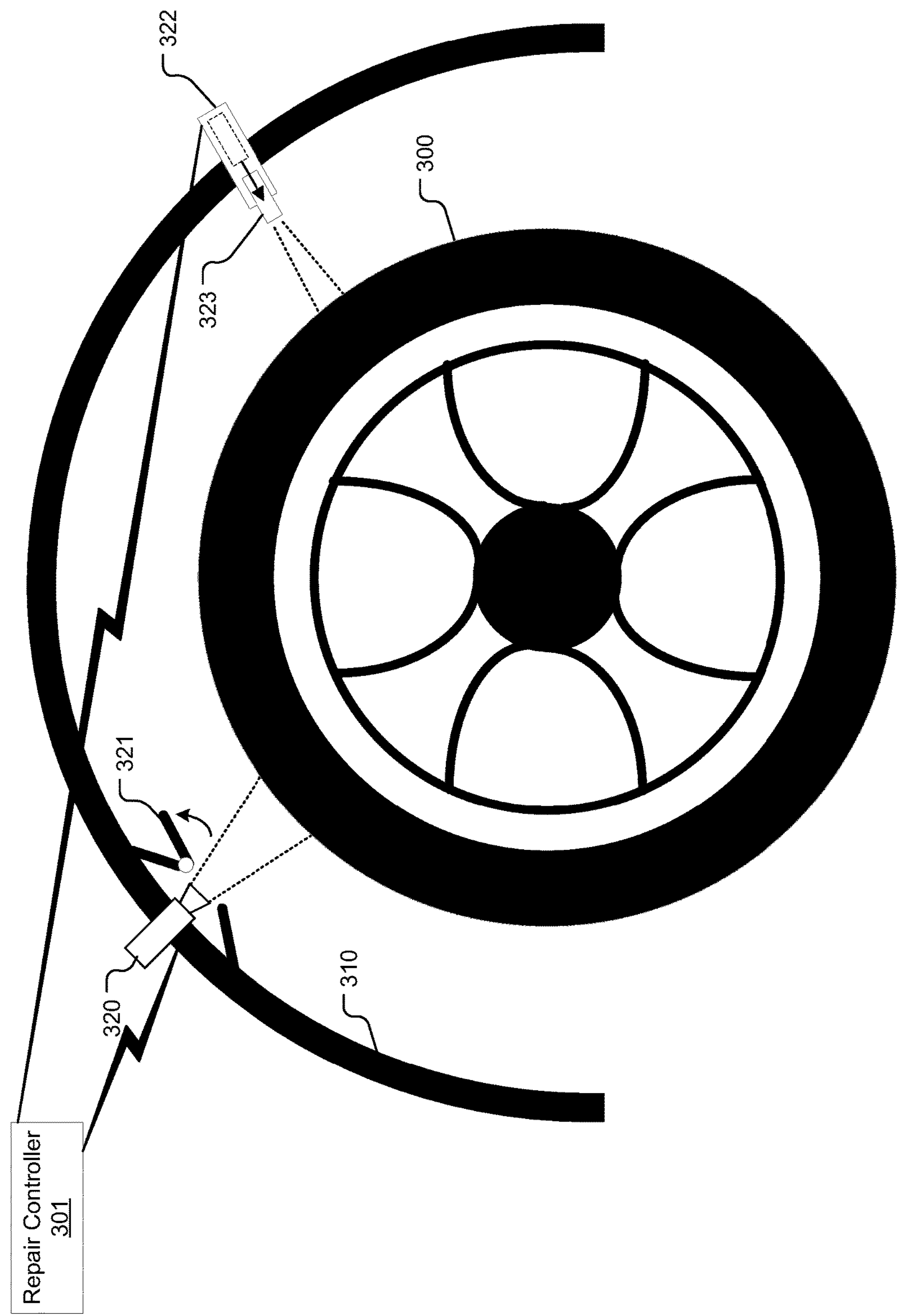
FIG. 9 depicts two retractable tire sensors.

FIG. 9 depicts two retractable tire sensors 320, 322. In the embodiment of FIG. 9, the first tire sensor 320 has a pivotal hatch, cover or door 321 that opens and closes. The hatch 321 protects the first tire sensor 320 and keeps it clean from dirt, debris and tire spray. The second tire sensor 322 has a linearly extendable-retractable mechanism or telescopic mechanism 323 that protects the second tire sensor and keeps it clean from dirt, debris and tire spray. Optionally, one or more wipers may be provided to clean the first and second tire sensors. The hatch 321, extendable-retractable mechanism 323 and wipers may be operated by the repair controller 301.

Figure 10:
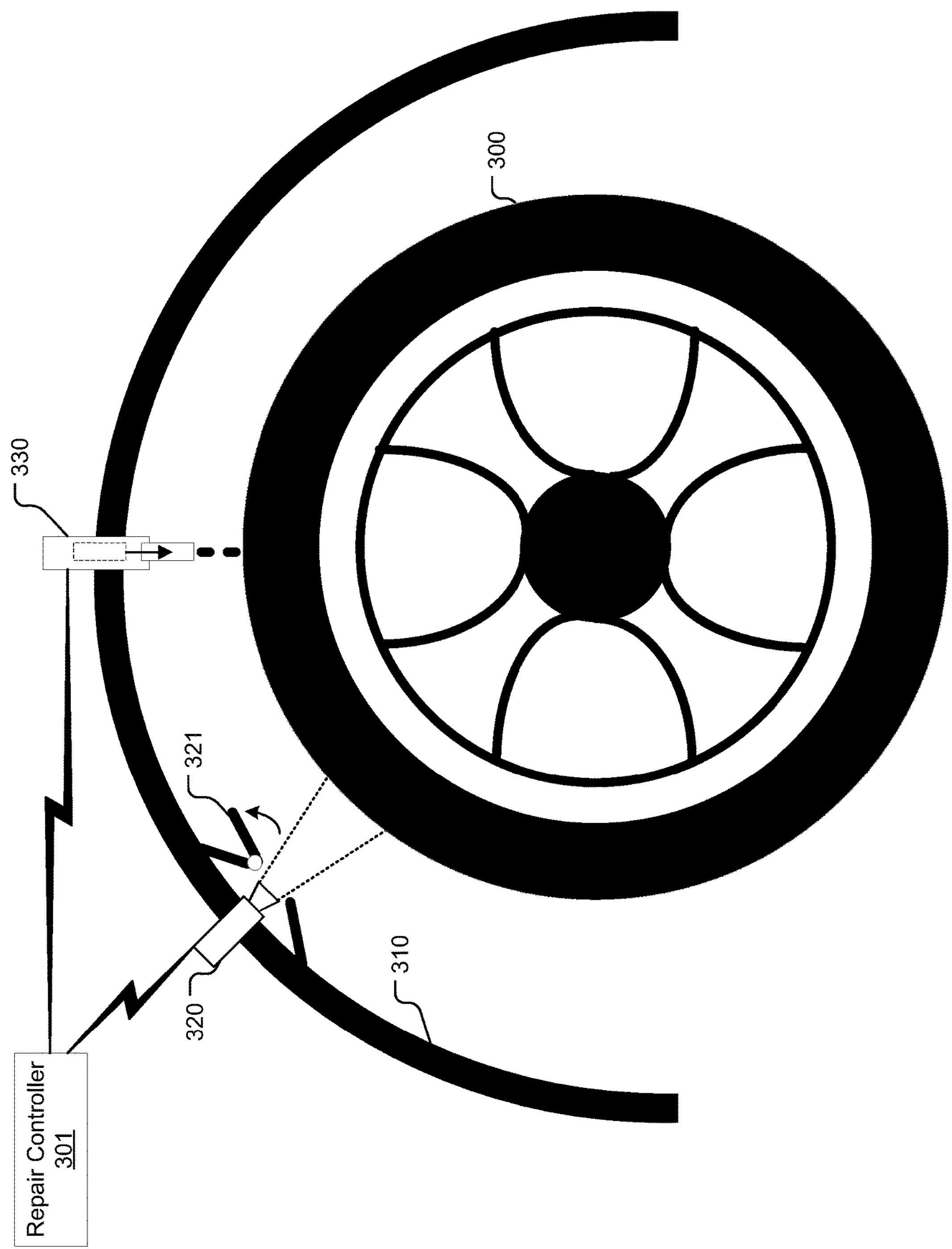
FIG. 10 depicts a tire-repairing system including a 3D printing device and a tire sensor.

FIG. 10 depicts a tire-repairing system including a 3D printing device 330 and the tire sensor 320 previously introduced. The 3D printing device 330, like the tire sensor 320, is disposed in the wheel well 310. The 3D printing device 330 is configured to deposit a tire compound on a surface of the tire to repair a worn or damaged portion of the tire. This repair is accomplished with the tire mounted to the wheel and the wheel-and-tire combination attached to the vehicle, thus obviating the need to remove the tire and wheel combination from the vehicle as it conventionally done. In the embodiment of FIG. 10, the tire sensor 320 disposed within the wheel well 310 senses a tire condition and generates and outputs a tire condition signal indicative of the tire condition. The tire condition signal may be an image or image data of the tire and/or post-processed image data locating areas of the tire that are worn or damaged. The repair controller 301 of the vehicle receives the tire condition signal from the tire sensor 320 and processes the tire condition signal to determine whether to repair the tire. The repair controller 301 is configured to generate and output a tire repair signal. A 3D printing device disposed in the wheel well and communicatively connected to the repair controller 301 receives the tire repair signal and 3D prints an additive reparation to the tire by drawing a tire repair compound from a supply container within the vehicle and by depositing the tire repair compound on the tire to repair the tire. The 3D printing device is configured to deposit small discrete droplets of the tire compound onto the surface of the tire. The repair signal may include a map of the tire showing locations to repair and a depth of tire compound to be deposited at each location to be repaired.

For the purposes of this specification, the expression "3D printing device" is meant to encompass any suitable 3D printer capable of depositing small discrete amounts, particles, bits or droplets of a material that can be added to a rubberized, rubber-like or rubber-based tire. The particles or droplets of the material are deposited via nozzles of a print head. There may be multiple nozzles or multiple print heads per 3D printer. The material (or tire compound) may be stored in solid form and then melted by the 3D printer to enable it to flow through the nozzle(s). The melted material re-solidifies upon deposition on the tire. The expression "3D printing device", for the purposes of this specification, is also meant to include any "additive manufacturing" device or apparatus that sequentially deposits particles or droplets that bond or fuse into successive layers of melted or partially melted material.

For the purposes of this specification, the expression "tire compound" may be a natural rubber, styrene-butadiene rubber (SBR), polybutadiene rubber (BR), or butyl rubber (e.g. halogenated butyl rubber) or any other equivalent rubber-based material suitable for a tire. The "tire compound" may alternatively be a plastic, polymer, or elastomeric compound that can adhere to a tire to act as a reconstructive or reparative material. In one exemplary embodiment, a thermoplastic polyurethane (TPU) may be used as disclosed in U.S. Pat. No. 9,889,617 which is hereby incorporated by reference. The TPU may be 3D printed, for example, via a fused filament fabrication process or a fused deposition modeling technique. In another exemplary embodiment, green rubber (or unvulcanized rubber) is used to 3D print the additive reparations to the tire as disclosed in U.S. Pat. No. 10,456,978 which is hereby incorporated by reference. The green rubber may be pressurized between 200 and 3200 psi, as disclosed in U.S. Pat. No. 10,456,978, in a rubber storage container and may be extruded through a nozzle of the 3D printing device whereupon a cutting apparatus of the 3D printing device cuts the extruded green rubber into particles, pellets or droplets of a size suitable to be deposited onto the wear zone(s) of the tire. The nozzle may include a heater or heating element to heat the rubber. In one embodiment, the tire-repairing system includes a grit blaster for surface roughening of the tire prior to depositing the tire compound. In one embodiment, the repair controller 301 of the tire-repairing system is configured to verify a tire inflation pressure to ensure the tire pressure is within a predetermined acceptable range before commencing the repair of the tire. The controller may verify the tire inflation pressure by receiving a pressure reading from a tire pressure sensor. In another embodiment, the repair controller 301 verifies the type of tire by optically scanning the sidewall for tire identification information or by scanning the tread and then comparing the imaged tread with a CAD file or image of the original tire tread. Once the tire type is verified, the repair controller 301 can repair the tire by recreating the original topology of the tread.

Figure 11:
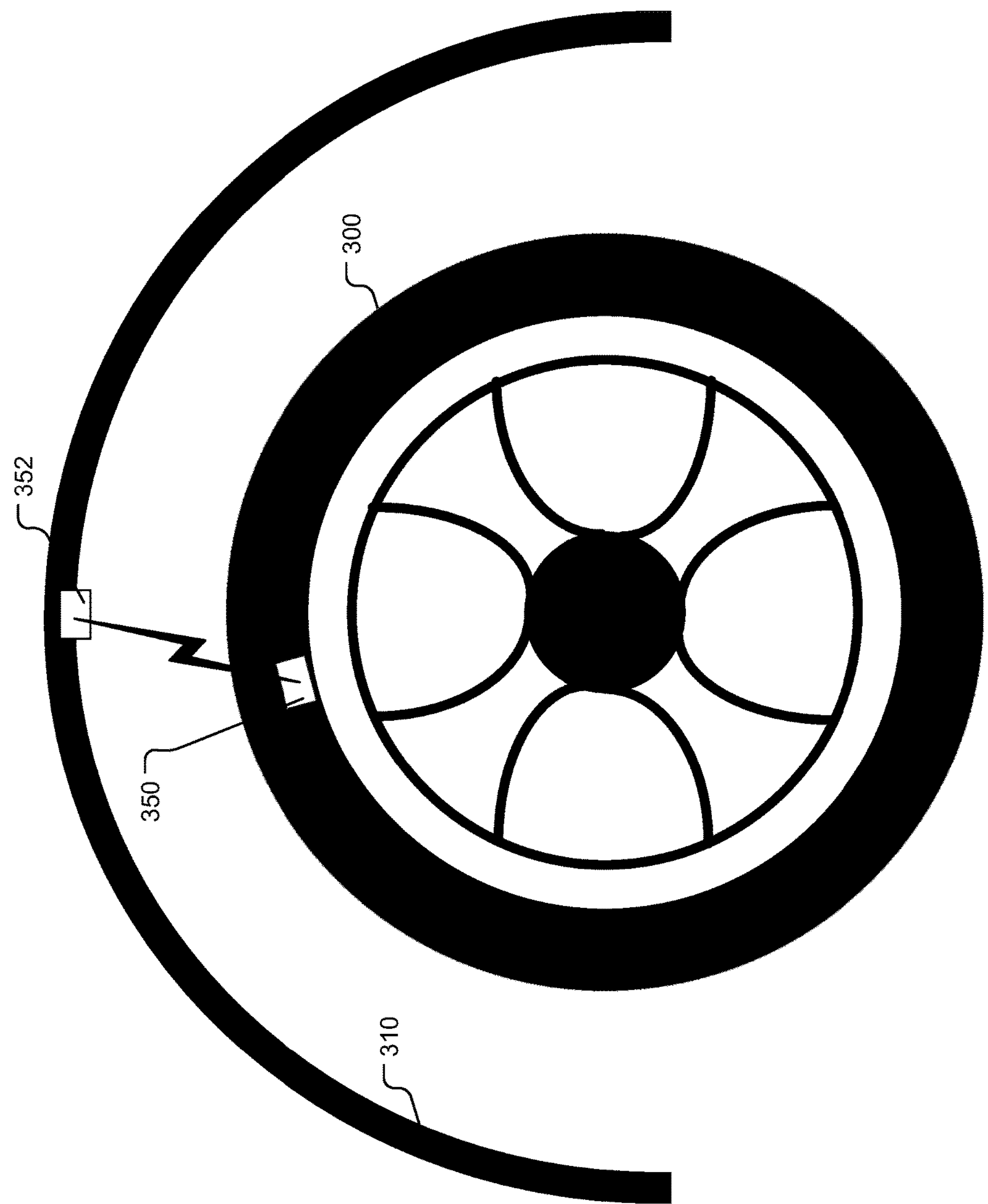
FIG. 11 depicts a tire-repairing system including a wireless wheel-mounted tire sensor.

FIG. 11 depicts a tire-repairing system including a wireless wheel-mounted tire sensor having an emitter 350 and its associated receiver 352. In this embodiment, the emitter 350 periodically or intermittently emits a predetermined signal that is captured by the receiver 352. Any change in the nature of the signal received by the receiver 352 is indicative of a change in the tire thickness. The receiver 352 may communicate with the repair controller 301.

Figure 12:
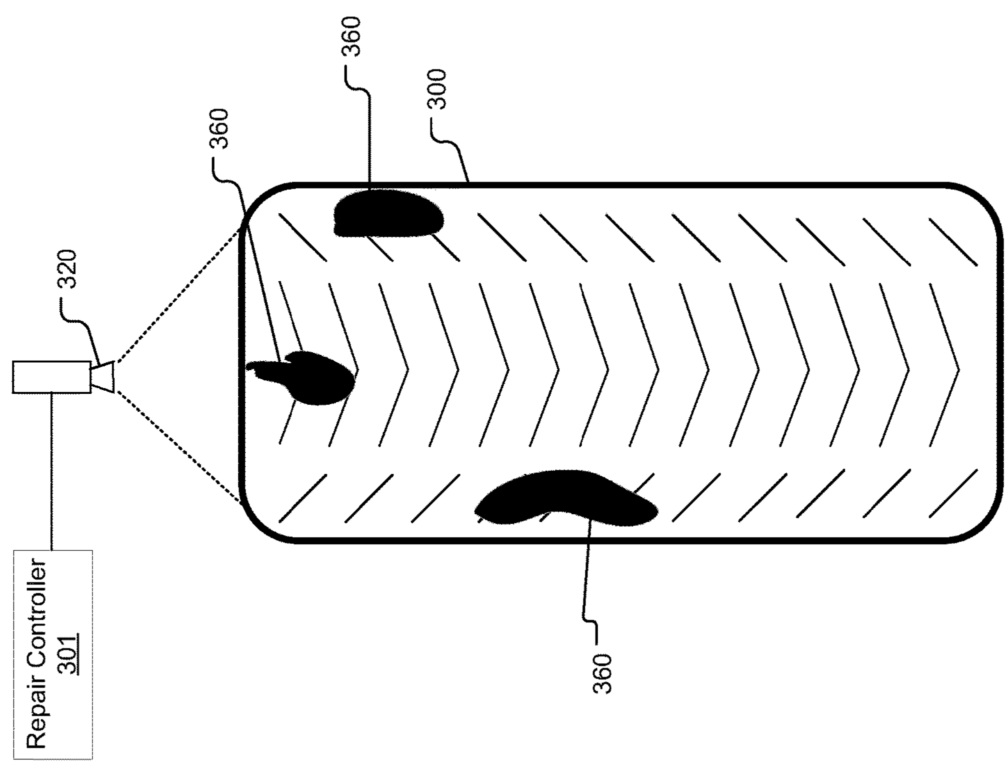
FIG. 12 is a front view of a tire and a tire sensor.

FIG. 12 is a front view of the tire 300 and the tire sensor 320 and further showing example wear zones 360 on the tire as detected by the tire sensor 320. In response to detecting the wear zones 360, the tire sensor 320 may generate and output a tire wear map to the repair controller 301 showing the areas of the tire requiring repair and the depth of tire compound needed to repair each of the wear zones 360 of the tire.

Figure 13:
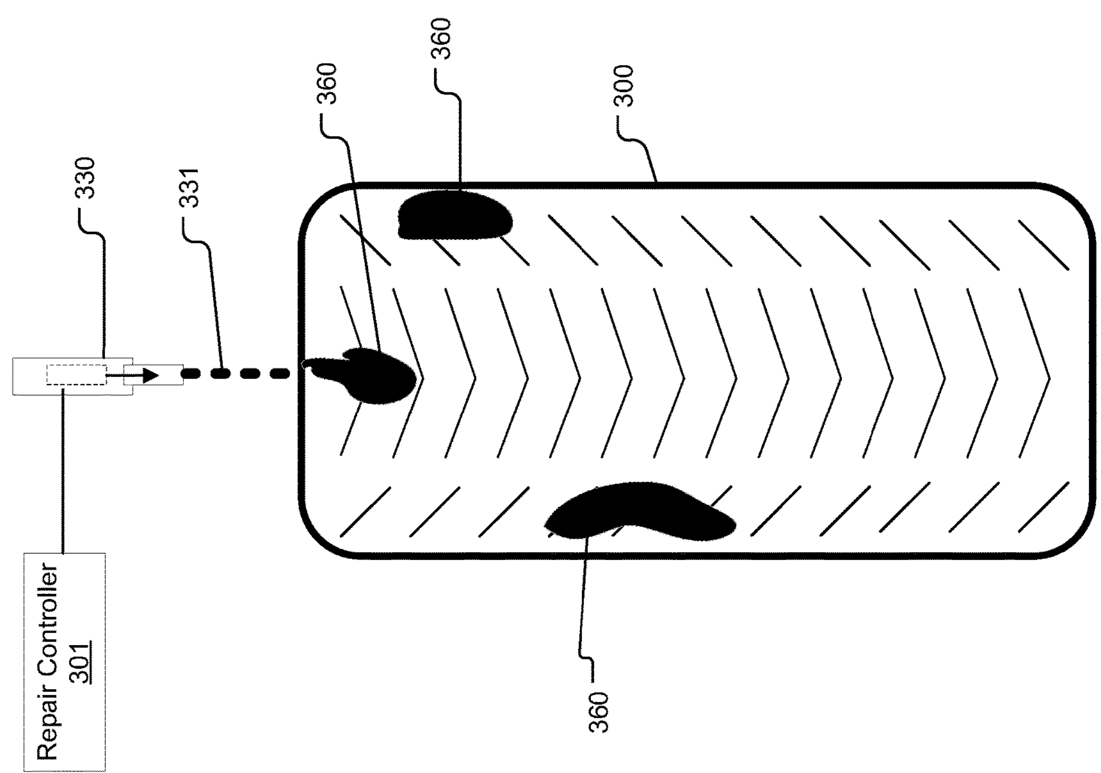
FIG. 13 is a front view of a tire and a 3D printing device.

FIG. 13 is a front view of a 3D printing device 330 depositing a tire compound 331 in the form of discrete droplets onto a surface of the tire 300 to be repaired. As will be explained in greater detail below, to reach different areas of the tire, the 3D printing device may be movable and/or the vehicle may move forward and backward to rotate the tire. The 3D printing device 330 is communicatively connected to the repair controller 301 and receives its repair signal(s) from the repair controller 301.

Figure 14:
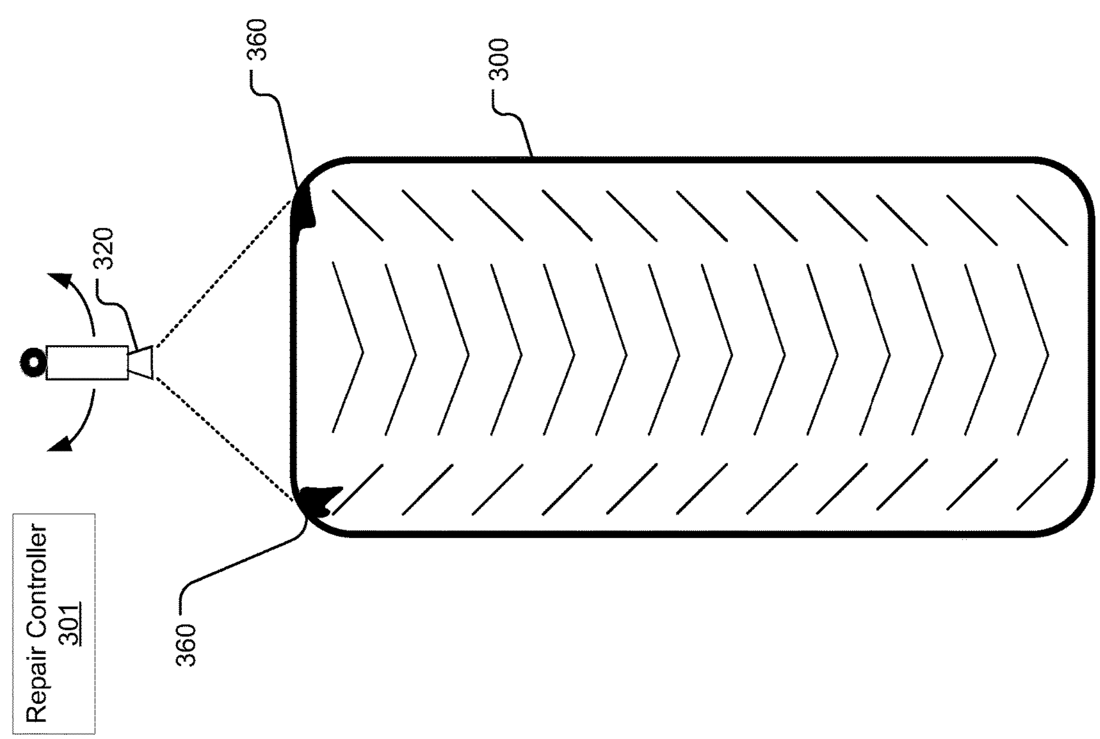
FIG. 14 is a front view of a tire and a rotatable tire sensor.

FIG. 14 depicts a rotatable tire sensor 320. The rotatable tire sensor is useful if the field of view of the tire sensor is less than the full width of the tire. In that case, the rotatable tire sensor is able to scan the full width of the wire by rotating. The movement of the rotatable tire sensor 320 may be controlled by the repair controller 301.

Figure 15:
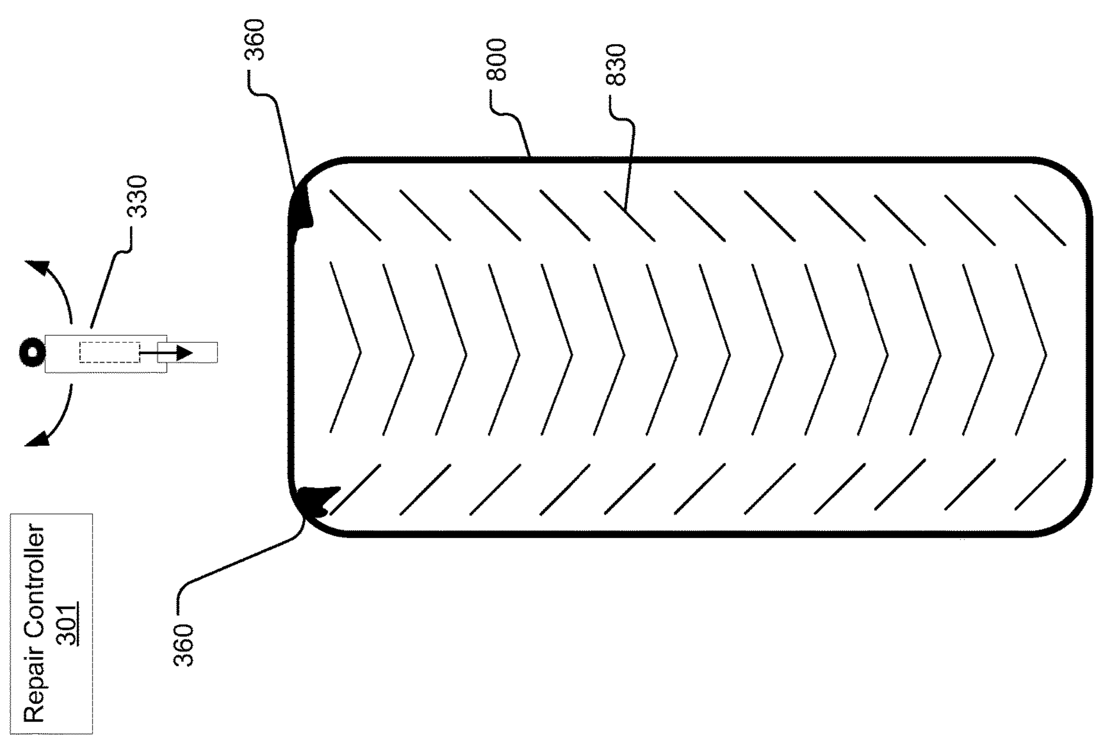
FIG. 15 is a front view of a tire and a rotatable 3D printing device.

FIG. 15 depicts a rotatable 3D printing device 330 for augmenting the lateral reach of the 3D printing device so as to be able to 3D print over the full width of the tire. The movement of the rotatable 3D printing device 330 may be controlled by the repair controller 301.

Figure 16:
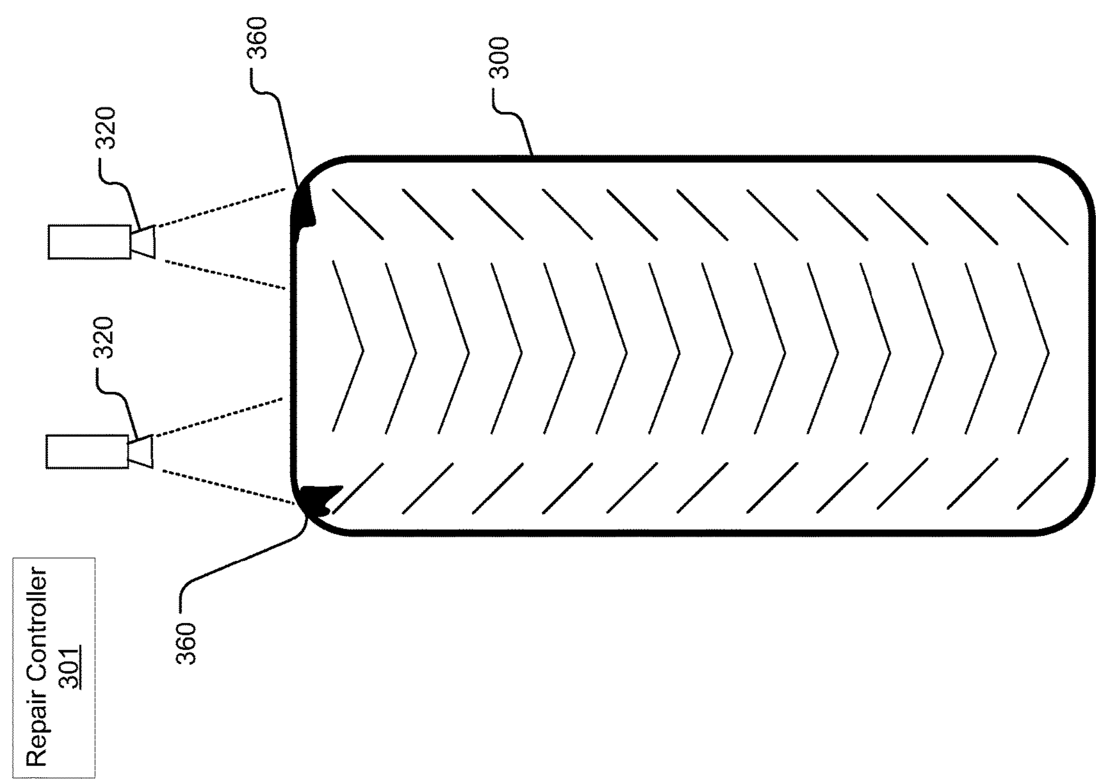
FIG. 16 is a front view of a tire and two tire sensors.

FIG. 16 is a front view of the tire 300 being scanned by two tire sensors 320 that are spaced apart to provide greater coverage of width of the tire. In one embodiment, the tire sensors 320 are positioned to scan only the edges of the tire where wear is generally greatest. The two tire sensors 320 may be communicatively connected (e.g. wirelessly or by wired connection) to the repair controller 301.

Figure 17:
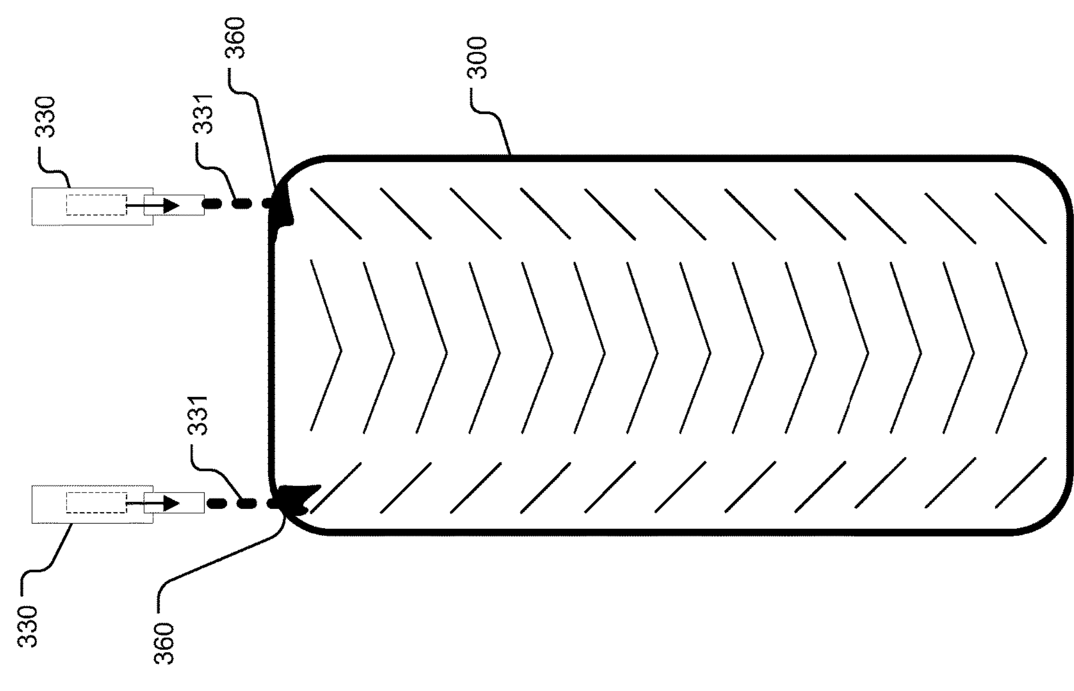
FIG. 17 is a front view of a tire and two 3D printing devices.

FIG. 17 is a front view of the tire being repaired by two 3D printing devices 330. In this embodiment, the left and right wear zones 360 are simultaneously repaired by droplets of tire compound 331 deposited by respective 3D printing devices 330 controlled by the repair controller 301 or alternatively by two repair controllers 301. In this embodiment, the two 3D printing devices may share a common supply container or they may draw the tire compound from their own respective supply containers.

Figure 18:
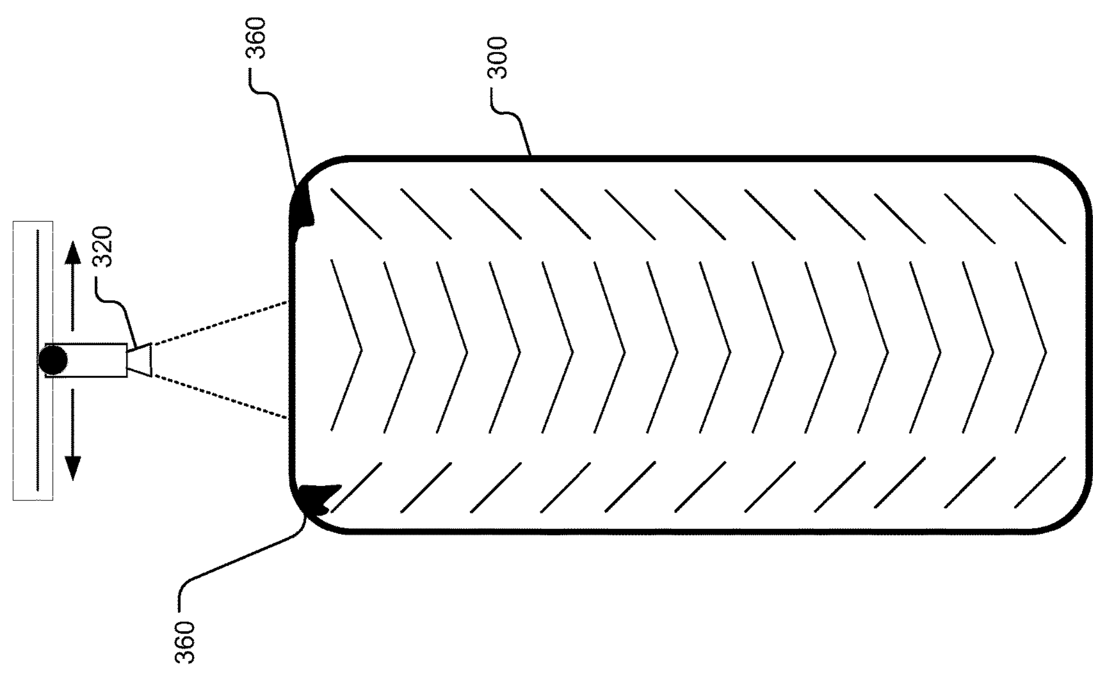
FIG. 18 is a front view of a tire and a transversely movable tire sensor.

FIG. 18 depicts a transversely movable tire sensor 320 that is able to slide or translate laterally to enable the tire sensor 320 to scan the full width of the tire 300. The repair controller 301 may control the displacement and speed of the tire sensor.

Figure 19:
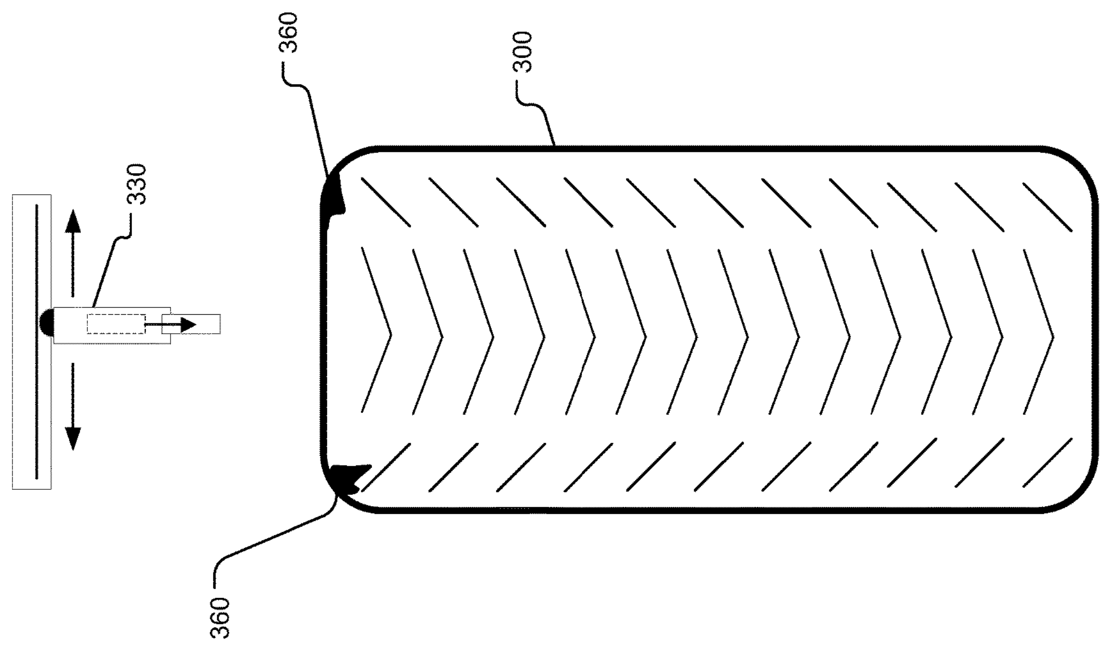
FIG. 19 is a front view of a tire and a transversely movable 3D printing device.

FIG. 19 depicts a transversely movable 3D printing device 330 that is able to slide or translate laterally to enable the 3D printing device 330 to deposit the droplets of tire compound across the full width of the tire 300. The repair controller 301 may control the displacement and speed of the 3D printing device.

Figure 20:
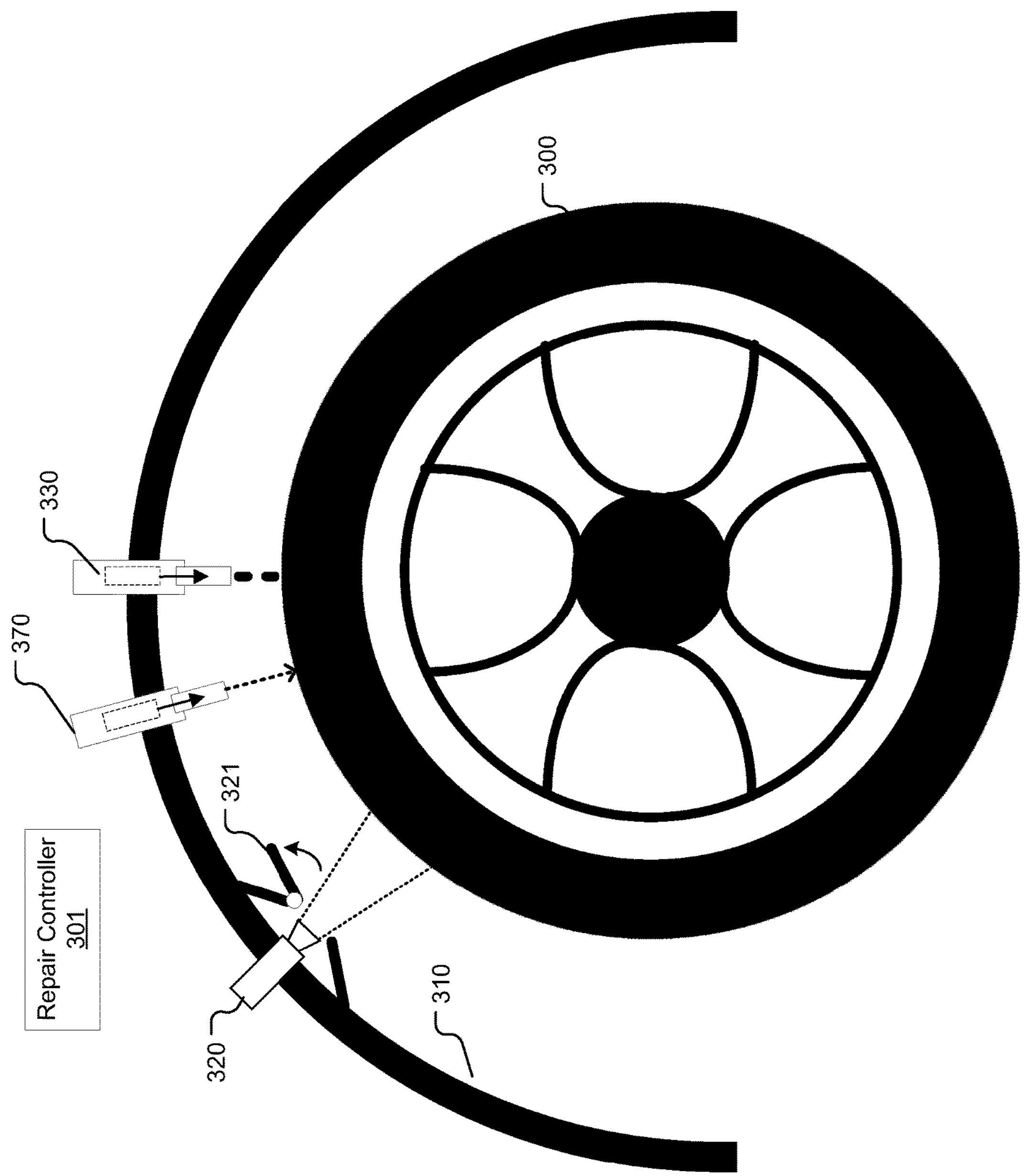
FIG. 20 depicts a tire-repairing system including a 3D printing device, a laser cutter and a tire sensor.

FIG. 20 depicts a tire-repairing system that includes a laser cutter 370 in addition to the tire sensor 320 and the 3D printing device 330. The laser cutter 370 may be used to cut or form grooves to refurbish treads. The repair controller 301 may be communicatively connected to the tire sensor, 3D printing device and laser cutter to thereby control operation of the tire sensor, 3D printing device and laser cutter.

Figure 21:
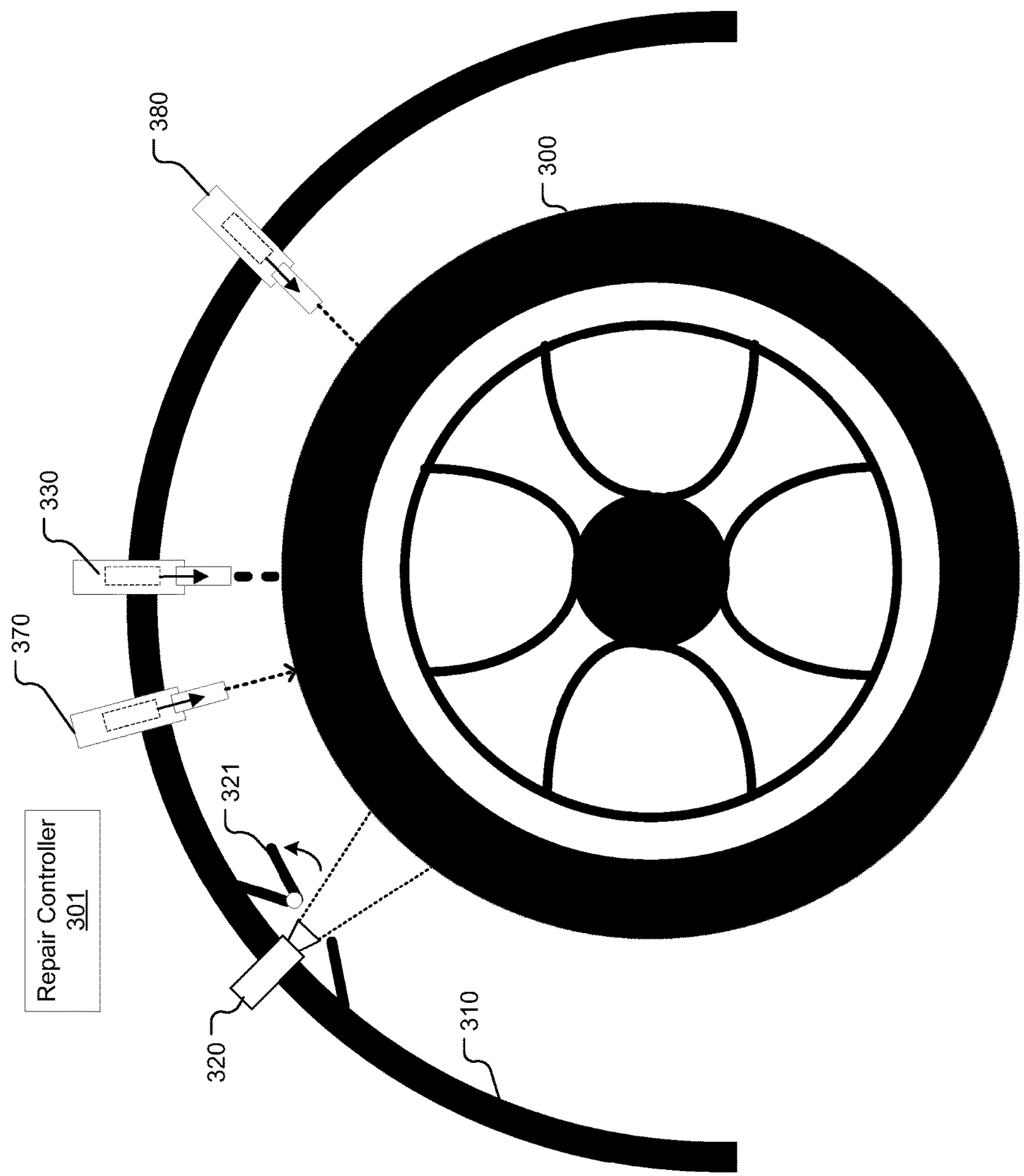
FIG. 21 depicts a tire-repairing system including a heater, a 3D printing device, a laser cutter and a tire sensor.

FIG. 21 depicts a tire-repairing system including a heater 380 in addition to the 3D printing device 330, the laser cutter 370 and the tire sensor 320. The repair controller 301 may be communicatively connected to the heater to control the operation of the heater. As noted above, the repair controller may control the function of the other components: the 3D printing device, laser cutter and tire sensor.

Figure 22:
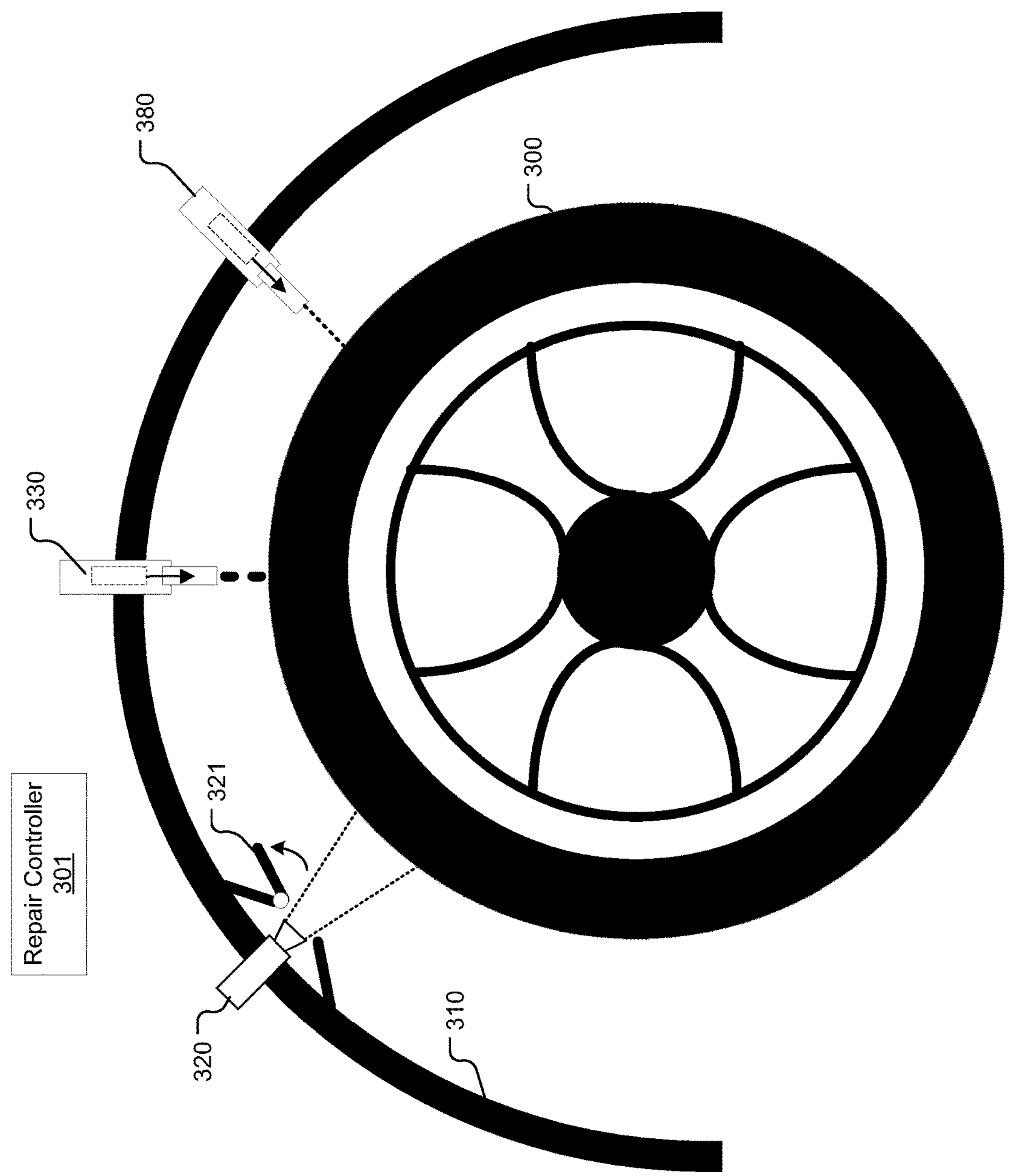
FIG. 22 depicts a tire-repairing system including a heater, a 3D printing device and a tire sensor.

In the embodiment depicted in FIG. 22, the tire-repairing system includes the heater 380, the 3D printing device 330 and the tire sensor 320 but does not include the laser cutter 370 of FIG. 21. Again, the repair controller 301 control each of the heater, 3D printing device and tire sensor.

It will be appreciated that the relative locations of the components of the tire-repairing system that are shown in these figures may be varied from what is shown in the figures. Also it will be appreciated that the components may be grouped or packaged together in various combinations. It will be appreciated that the repair controller 301 may coordinate the functioning of the various components to provide a suitable sequence of operations.

The tire-repairing system enables in-situ on-wheel repair or refurbishment of one or more tires of the vehicle without having to remove the tires (and its wheel) from the vehicle as would be conventionally necessary. The in-situ on-wheel repair of the tire can be done incrementally when wear or damage is detected by a tire sensor, thus progressively maintaining the tire in excellent shape. As will be appreciated, the tire must be rotated 360 degrees to provide access to the entire circumference of the tire tread. Since at least one portion of the tire must contact the ground at any given time, the tire repair (assuming the entire circumference is to be repaired) must be effected in stages by progressively rolling the tire while allowing the tire compound to set, cure or vulcanize. Thus, the vehicle may be moved forward and/or backward to expose all areas of the tread to the 3D printing device and/or other components of the tire-repairing system. In one embodiment, the vehicle is an autonomous vehicle that moves itself autonomously forward and/or backward to expose the tread to the 3D printing device and/or other components of the tire-repairing system. In order to account for the setting, curing or vulcanizing time of the tire compound deposited on the tire, the processor of the vehicle may be configured to roll the tire only a certain angular amount to avoid contacting the pavement and compressing the tire under the weight of the vehicle until the tire compound has had sufficient time to set, cure or vulcanize.

Figure 23:
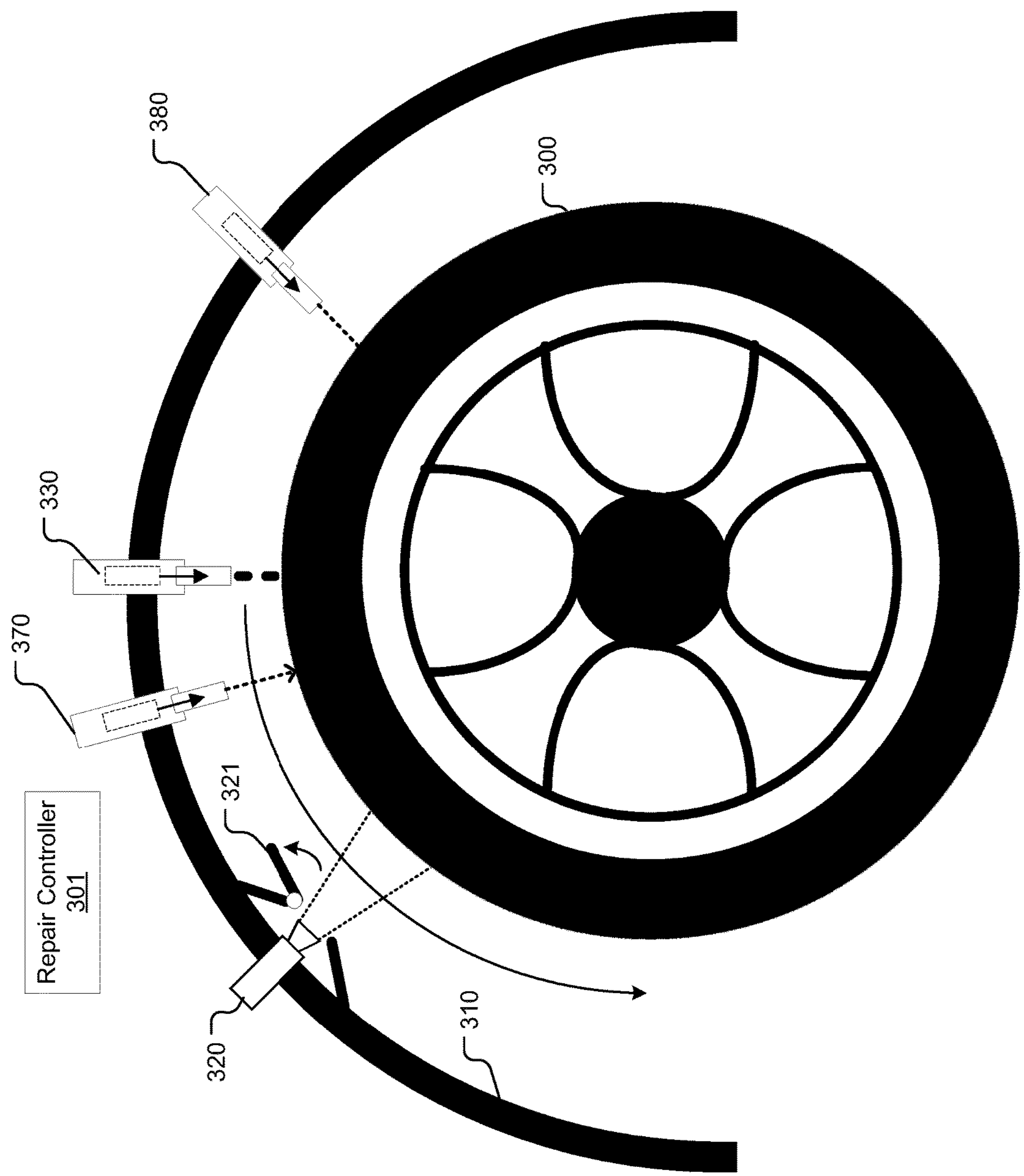
FIG. 23 depicts a first step of a process of refurbishing a tire by performing a first quarter rotation of the tire.
Figure 24:
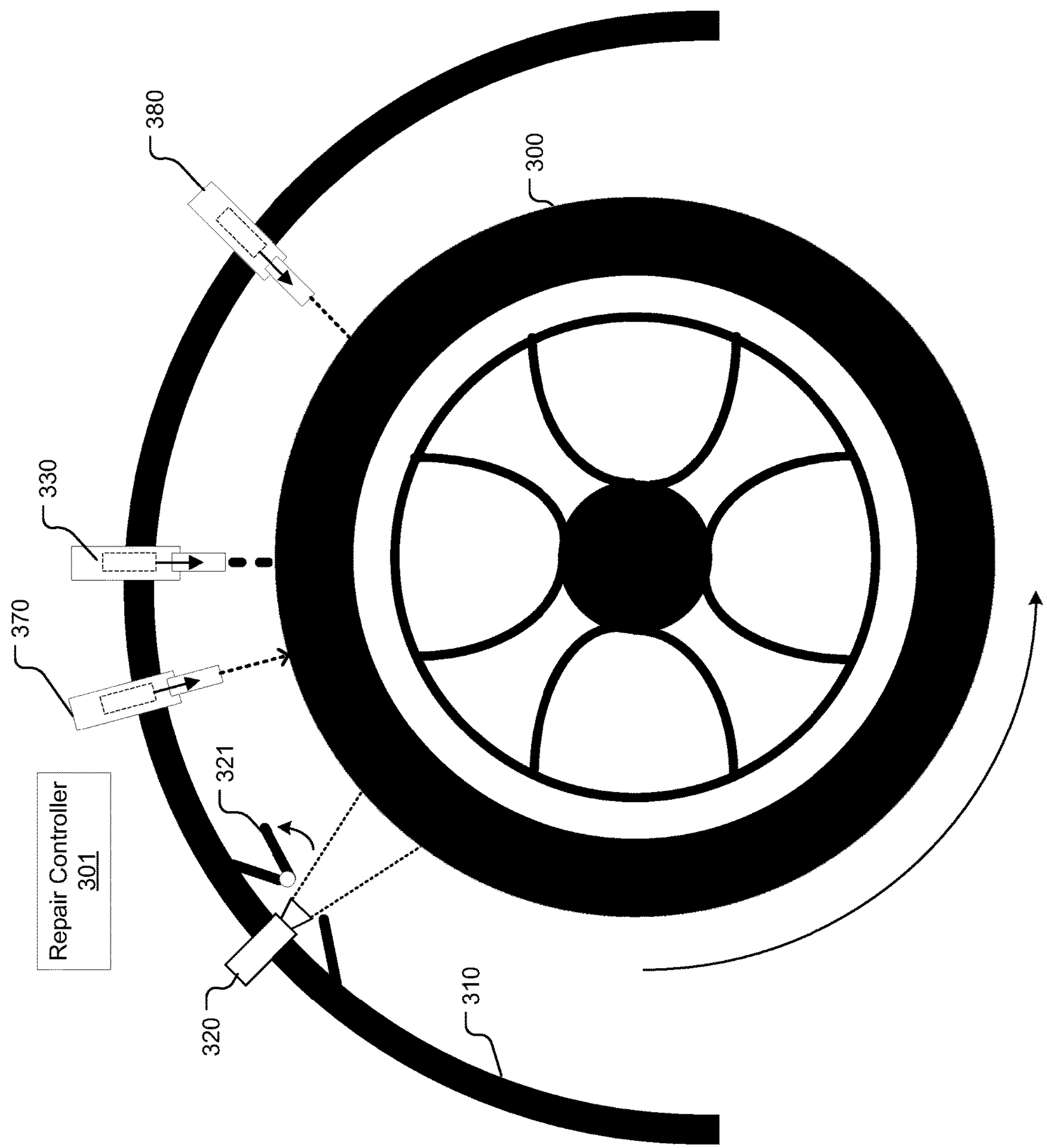
FIG. 24 depicts a second step of the process of refurbishing the tire by performing a second quarter rotation of the tire.
Figure 25:
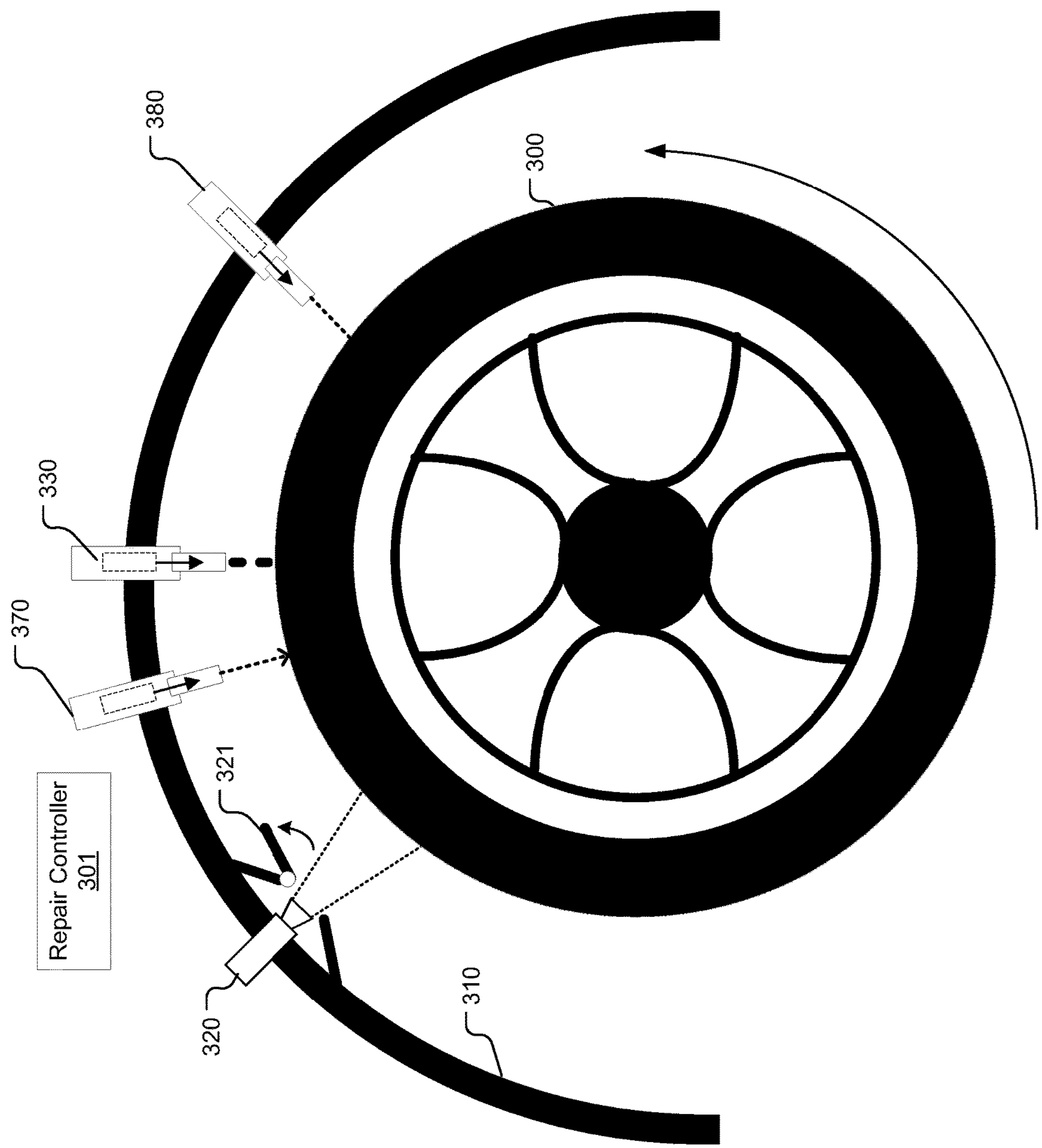
FIG. 25 depicts a third step of the process of refurbishing the tire by performing a third quarter rotation of the tire.
Figure 26:
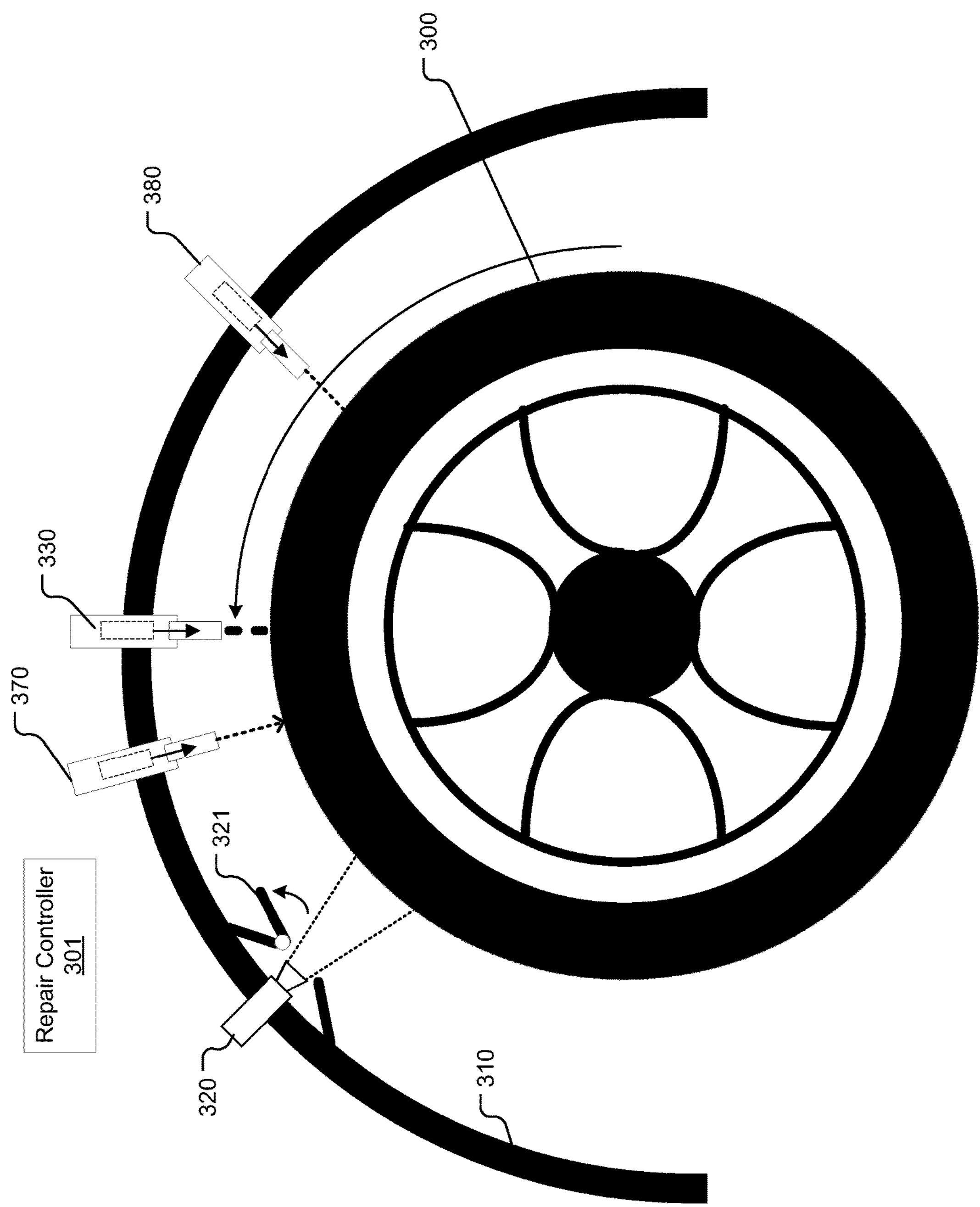
FIG. 26 depicts a fourth step of the process of refurbishing the tire by performing a fourth quarter rotation of the tire.

FIGS. 23-26 depict a process (method) of repairing or refurbishing a tire while the wheel and tire are mounted to the vehicle. The process may be controlled by the repair controller 301. FIG. 23 depicts a first step of the process of refurbishing the tire. In this first step, the vehicle is moved forward to effect a first quarter rotation of the tire. FIG. 24 depicts a second step of the process of refurbishing the tire by performing a second quarter rotation of the tire. FIG. 25 depicts a third step of the process of refurbishing the tire by performing a third quarter rotation of the tire. FIG. 26 depicts a fourth step of the process of refurbishing the tire by performing a fourth quarter rotation of the tire. It will be appreciated that the number of discrete rotations may be varied in other embodiments. For example, the wheel and tire may be rotated in increments of 10 degrees, 15 degrees, 20, degrees, 30 degrees, etc. It will also be appreciated that if the tire sensor detects that there is only a single wear zone requiring repair, the tire is rotated to expose the single wear zone to the 3D printing device. Likewise, if there are only discrete wear zones (i.e. if the tire wear does not extend around the full circumference of the tire), then the tire is rotated to sequentially expose each wear zone to the 3D printing device.

Figure 27:
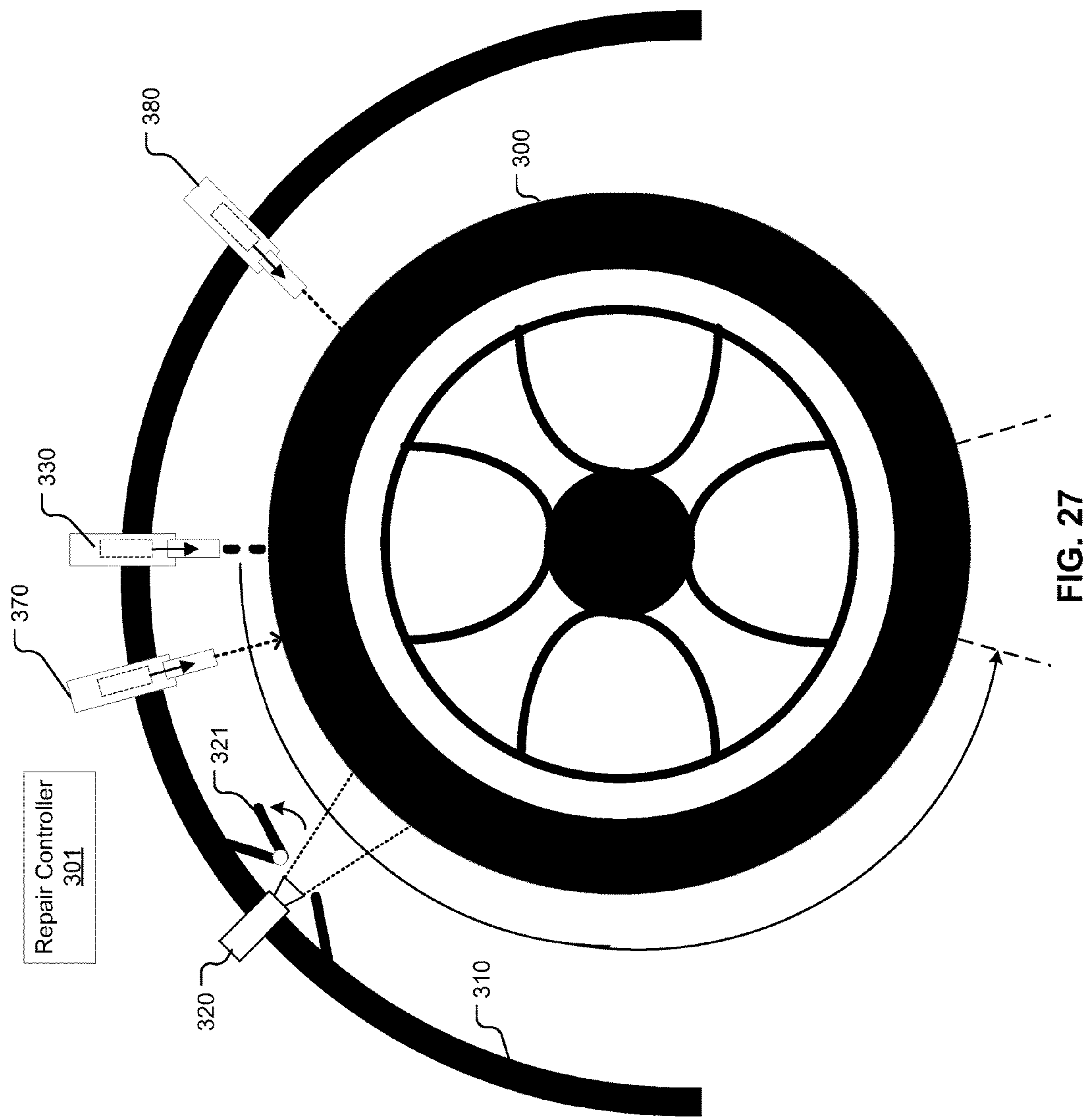
FIG. 27 depicts a first step of another process of refurbishing a tire in which the vehicle is moved forward to rotate the tire counterclockwise more than a quarter rotation but less than a half rotation.
Figure 28:
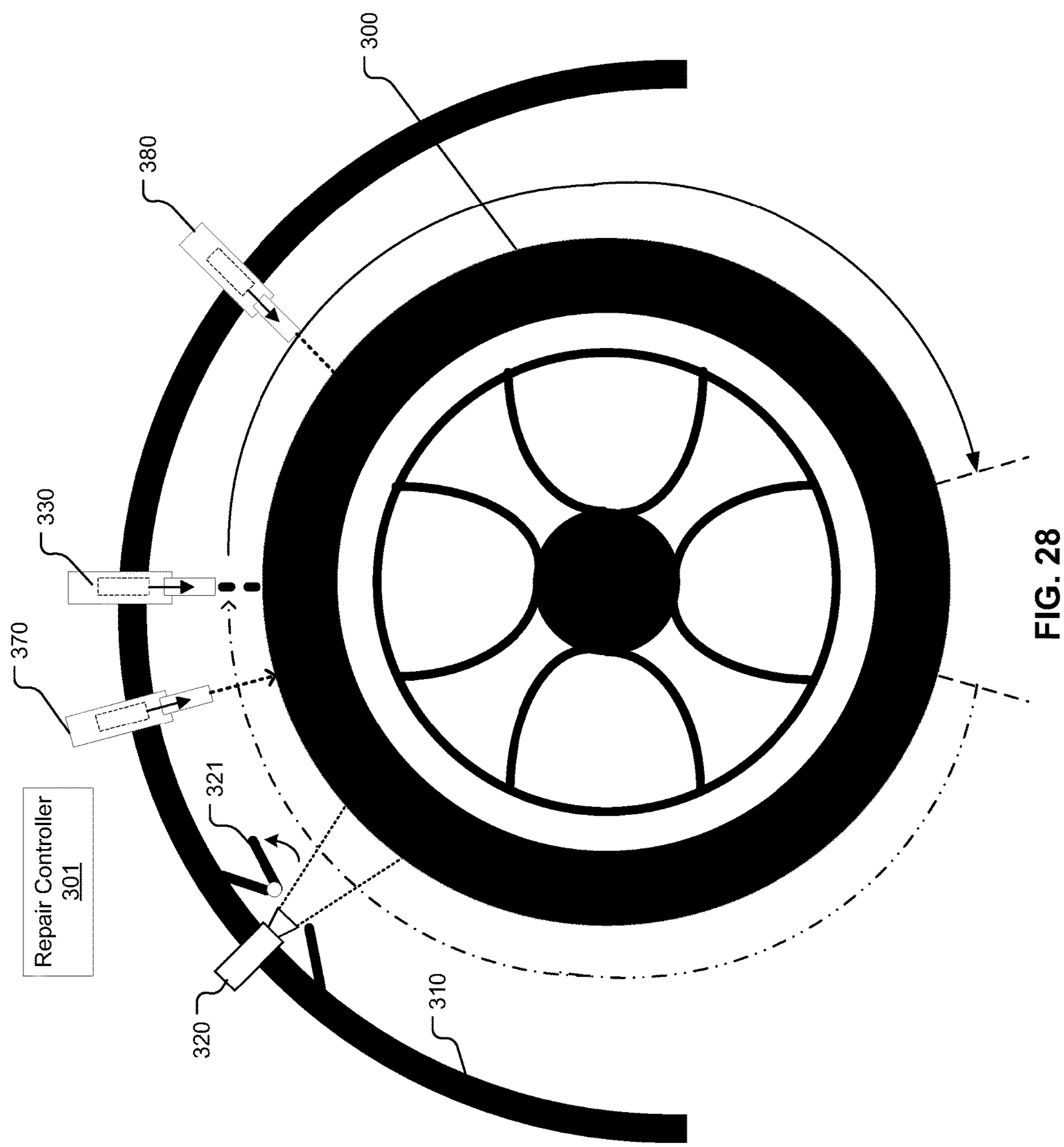
FIG. 28 depicts a tire-repairing system including a second step of the process of FIG. 27 in which the vehicle is moved rearward to rotate the tire clockwise more than a quarter rotation but less than a half rotation.

FIGS. 27-28 depict another example process of refurbishing a tire in which the vehicle is parked in a location where it cannot move forward by a complete forward rotation. The process of FIGS. 27-28 may be controlled by the repair controller 301. In this scenario, the vehicle moves forward then moves backward to expose the tire to the 3D printing device. FIG. 27 depicts a first step of a process of refurbishing a tire in which the vehicle is moved forward to rotate the tire counterclockwise more than a quarter rotation but less than a half rotation. FIG. 28 depicts a second step of the process of FIG. 27 in which the vehicle is moved rearward to initially rotate the tire clockwise back to its original position (as shown by the dashed line) and then further rotated more than a quarter rotation but less than a half rotation. In this example, the ground-contacting portion is not refurbished in the steps of FIGS. 27-28. This ground-contacting portion is then refurbished when the vehicle has sufficient room to rotate to expose that ground-contacting portion to the 3D printing device.

Figure 29:
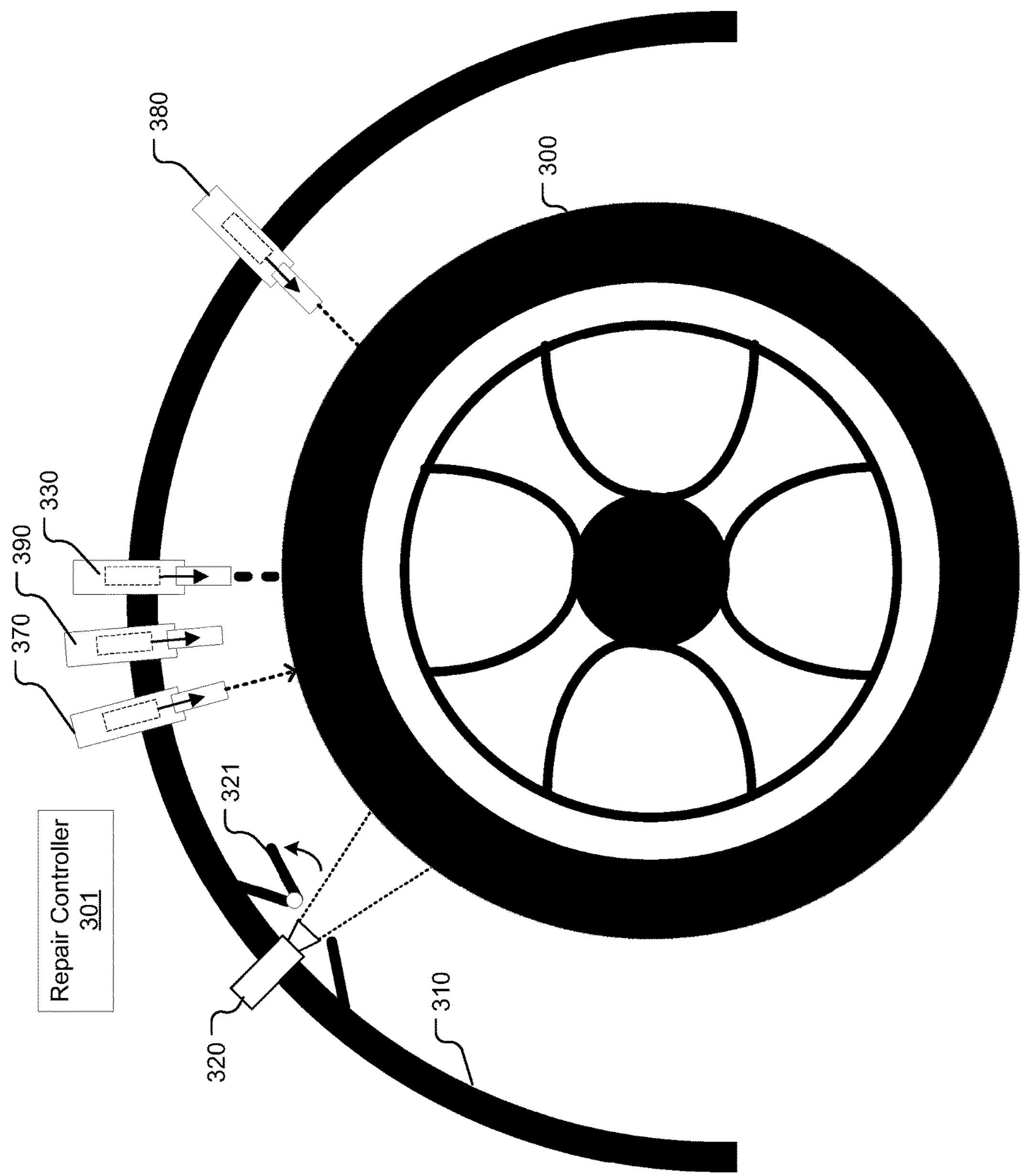
FIG. 29 depicts a tire-repairing system including a heater, a 3D printing device, a vulcanizer, a laser cutter and a tire sensor.

FIG. 29 depicts a tire-repairing system that includes a vulcanizer 390 in addition to the heater 380, 3D printing device 330, laser cutter 370 and tire sensor 320. The vulcanizer 390 is controlled by the repair controller 301.

Figure 30:
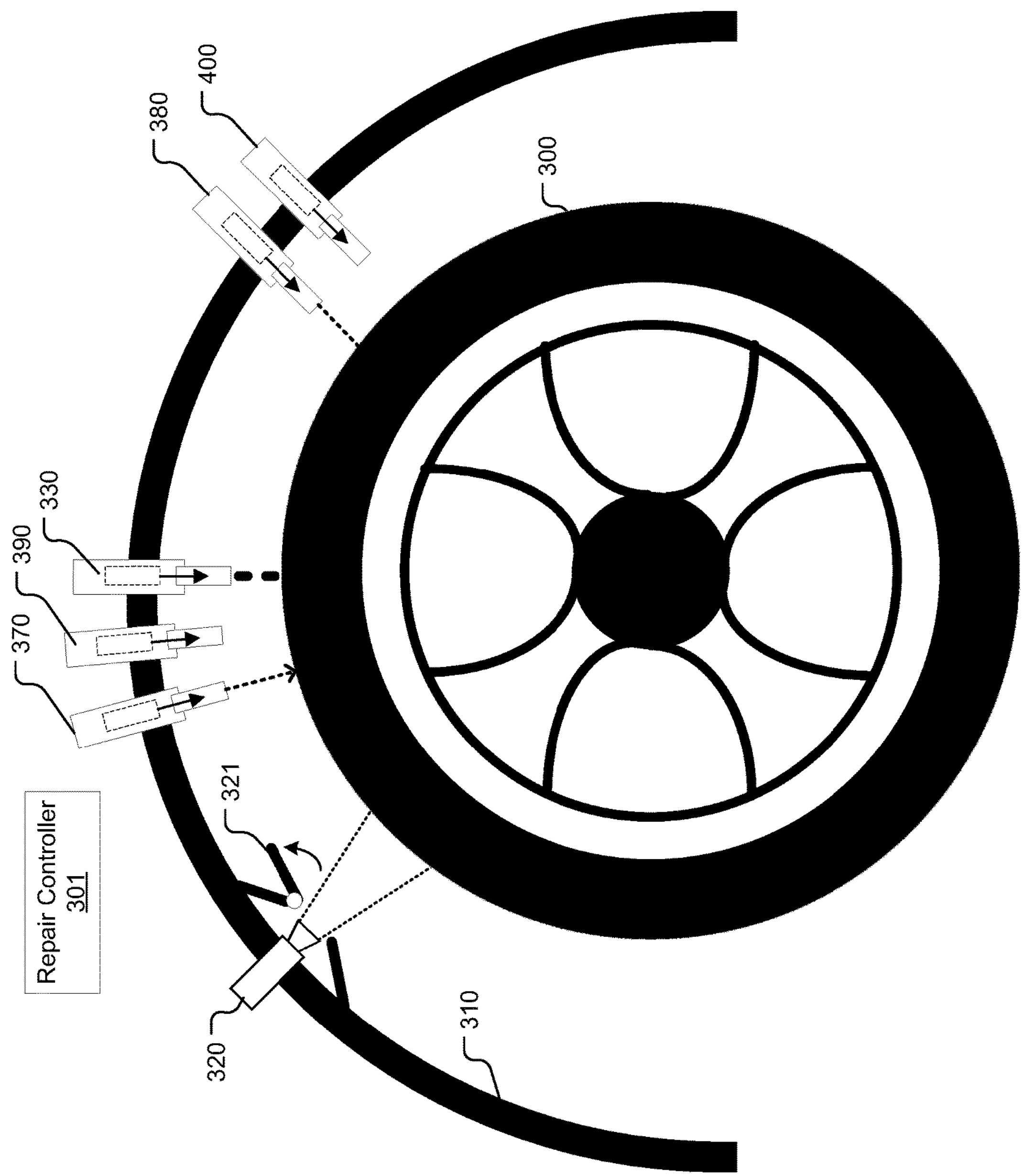
FIG. 30 depicts a tire-repairing system including a fluid-jet cleaner, a heater, a 3D printing device, a vulcanizer, a laser cutter and a tire sensor.

FIG. 30 depicts a tire-repairing system that includes a fluid-jet cleaner 400 in addition to the heater 380, 3D printing device 330, vulcanizer 390, laser cutter 370 and tire sensor 320. The fluid-jet cleaner 400 is controlled by the repair controller 301. The fluid-jet cleaner may be an airjet or waterjet.

Figure 31:
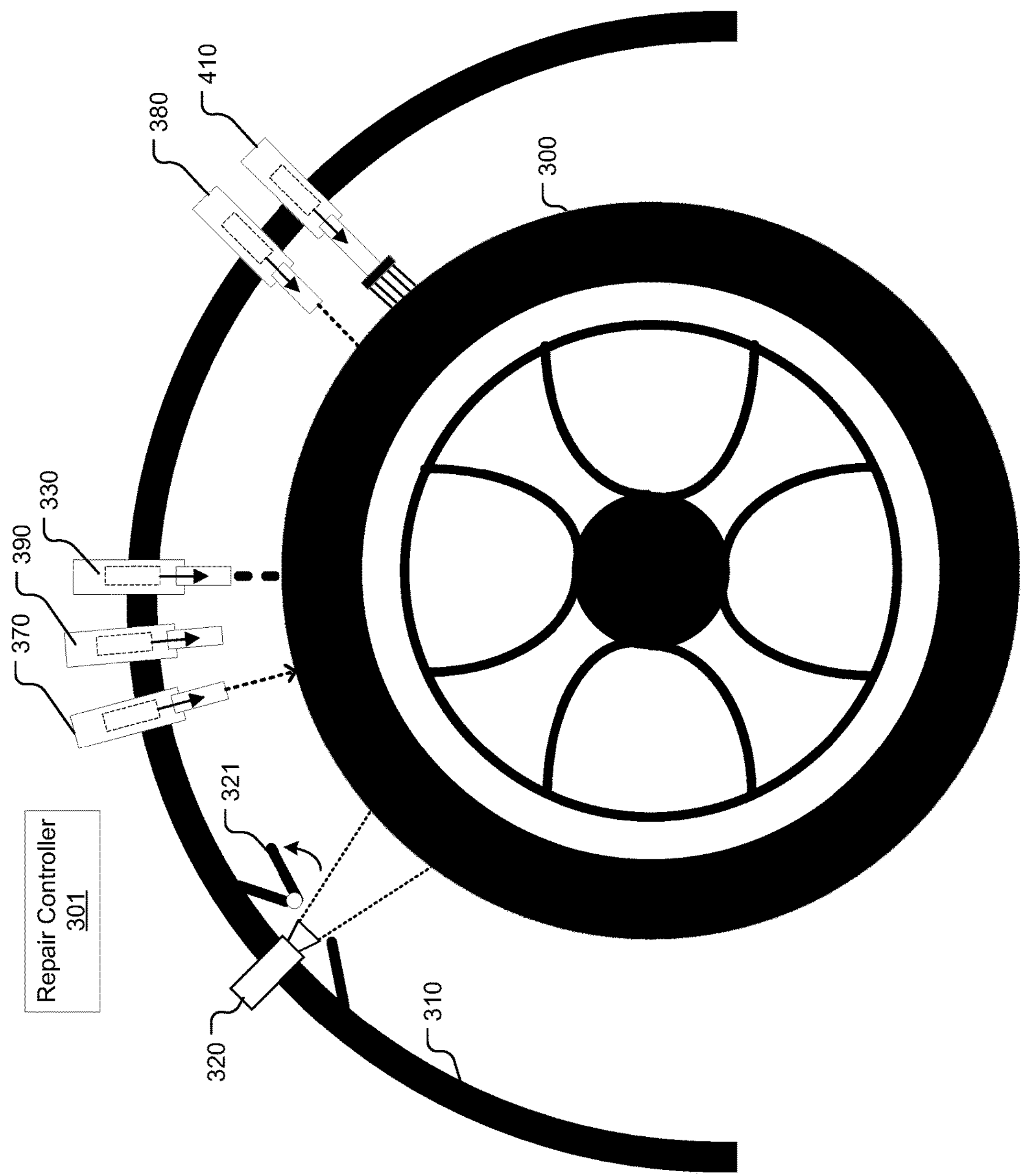
FIG. 31 depicts a tire-repairing system including a brush-type cleaner, a heater, a 3D printing device, a vulcanizer, a laser cutter and a tire sensor.

FIG. 31 depicts a tire-repairing system that includes a brush-type cleaner 410 in addition to the heater 380, 3D printing device 330, vulcanizer 390, laser cutter 370 and tire sensor 320. Extension and retraction of the brush-type cleaner 410 is controlled by the repair controller 301. In a variant, the brush-type cleaner may be rotated.

Figure 32:
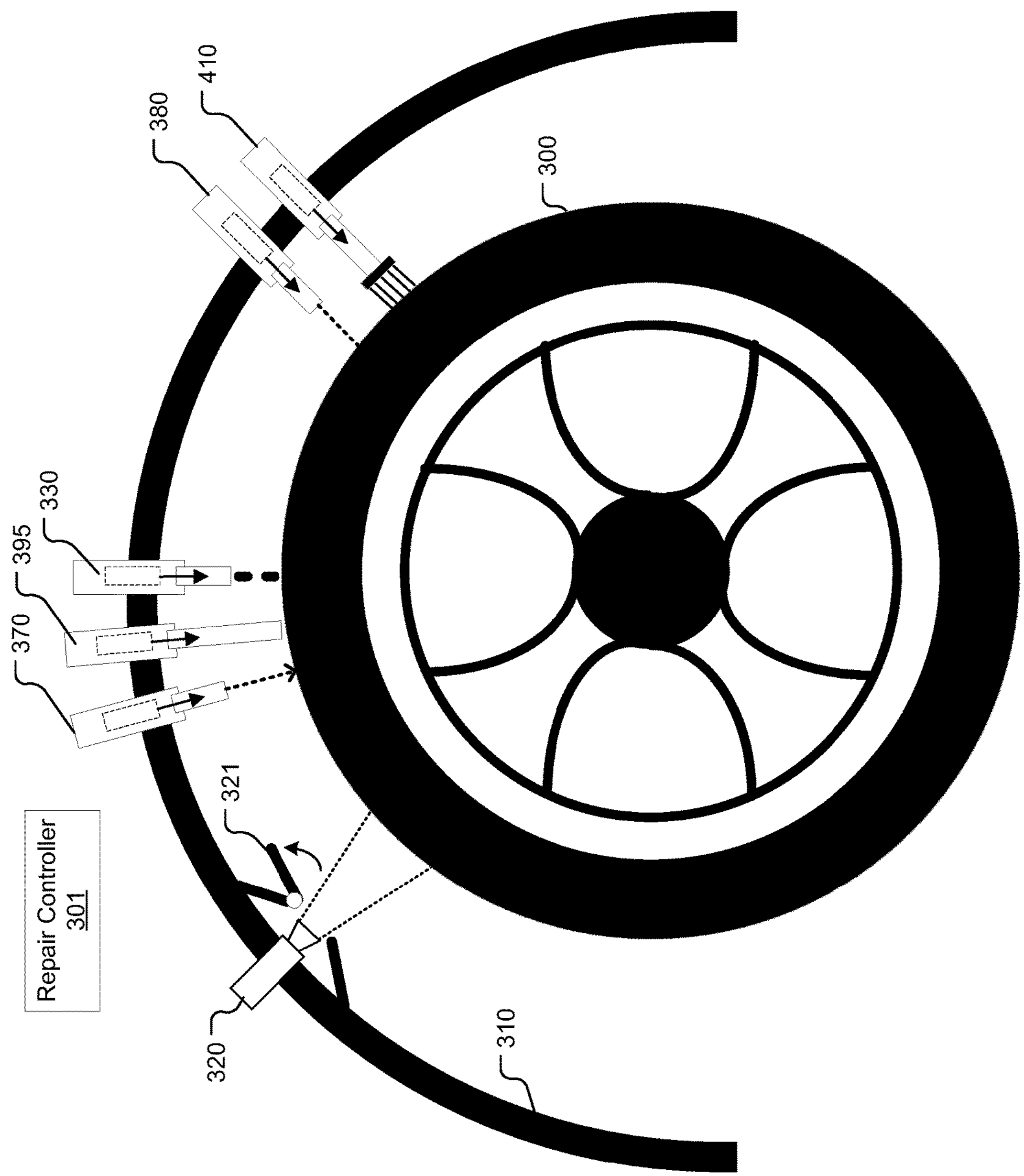
FIG. 32 depicts a tire-repairing system including a brush-type cleaner, a heater, a 3D printing device, an extendable tire-contacting vulcanizer, a laser cutter and a tire sensor.

FIG. 32 depicts a tire-repairing system that includes an extendable tire-contacting vulcanizer 395 which may be controlled by the repair controller 301. The tire-repairing system of FIG. 32 also includes the brush-type cleaner 410, the heater 380, the 3D printing device 330, the laser cutter 370 and the tire sensor 320.

Figure 33:
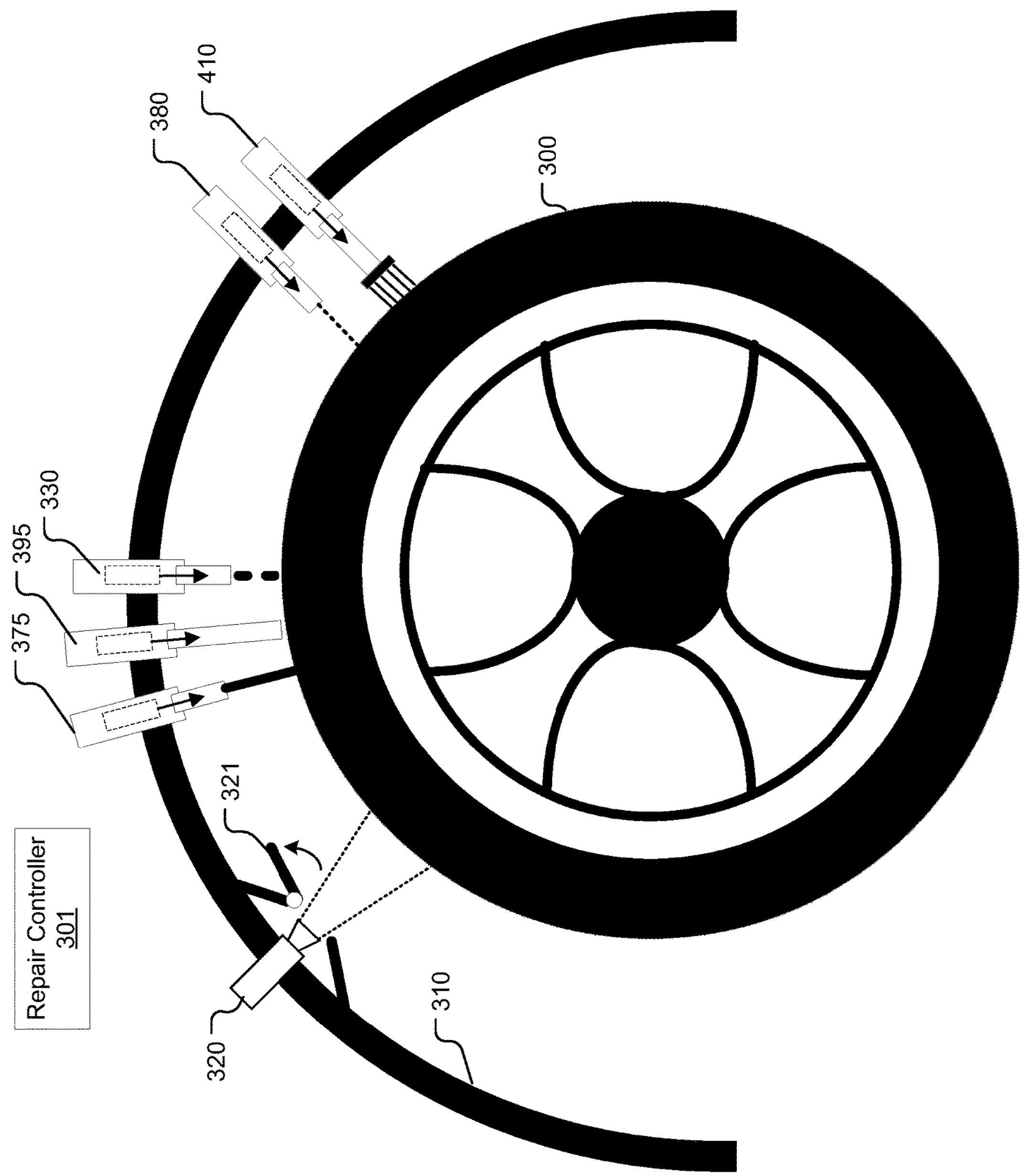
FIG. 33 depicts a tire-repairing system including a brush-type cleaner, a heater, a 3D printing device, an extendable tire-contacting vulcanizer, a tire-contacting cutting tool and a tire sensor.

FIG. 33 depicts a tire-repairing system that includes a tire-contacting cutting tool 375 which may be controlled by the repair controller 301. The tire-repairing system of FIG. 33 also includes the brush-type cleaner 410, the heater 380, the 3D printing device 330, the extendable tire-contacting vulcanizer 395, and the tire sensor 320.

Figure 34:
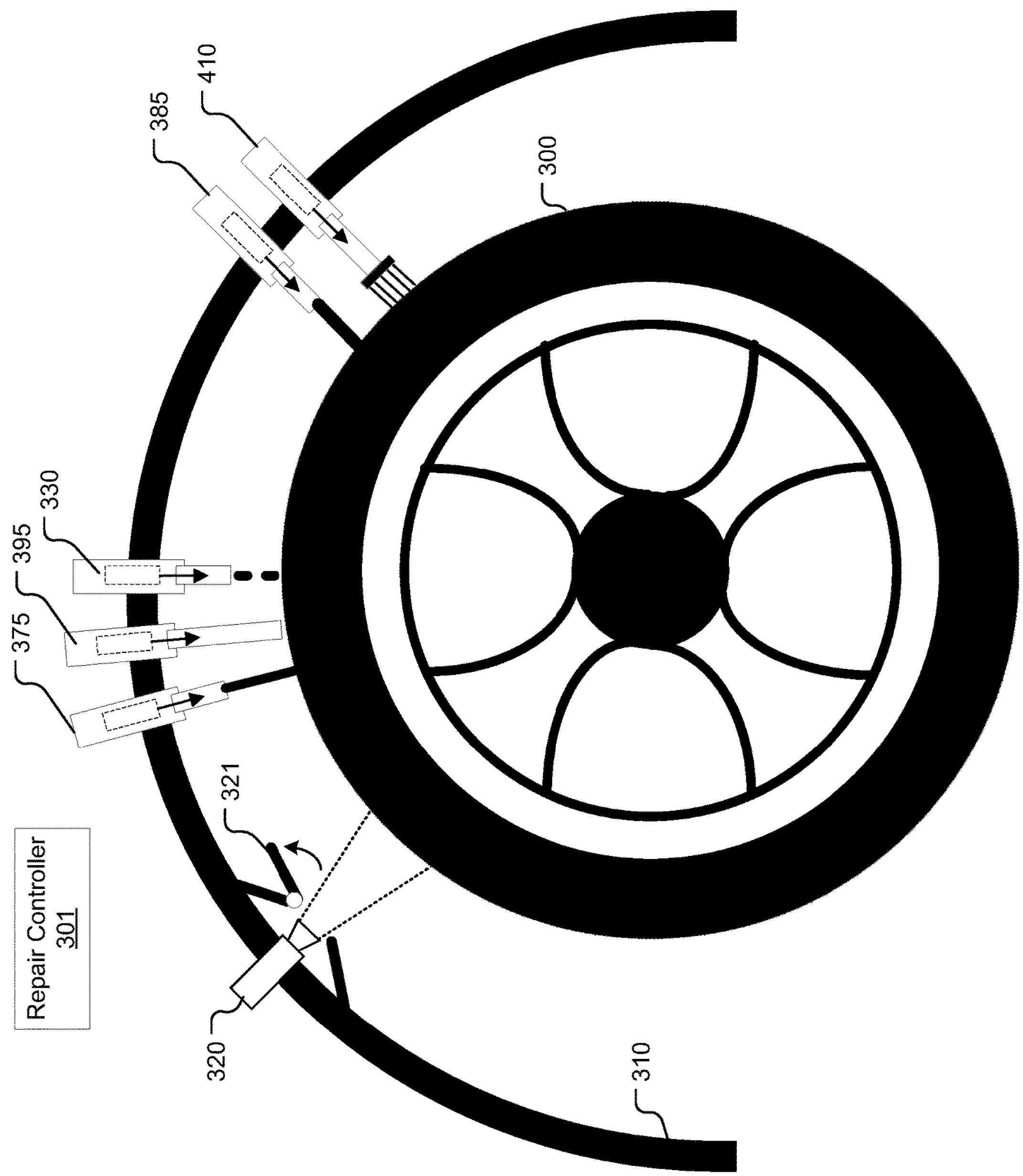
FIG. 34 depicts a tire-repairing system including a brush-type cleaner, a tire-contacting conductive heater, a 3D printing device, an extendable tire-contacting vulcanizer, a tire-contacting cutting tool and a tire sensor.

FIG. 34 depicts a tire-repairing system that includes a tire-contacting conductive heater 385 which may be controlled by the repair controller 301. In addition, as shown in FIG. 34, the tire-repairing system includes the brush-type cleaner 410, the 3D printing device 330, the extendable tire-contacting vulcanizer 395, the tire-contacting cutting tool 375 and the tire sensor 320.

Figure 35:
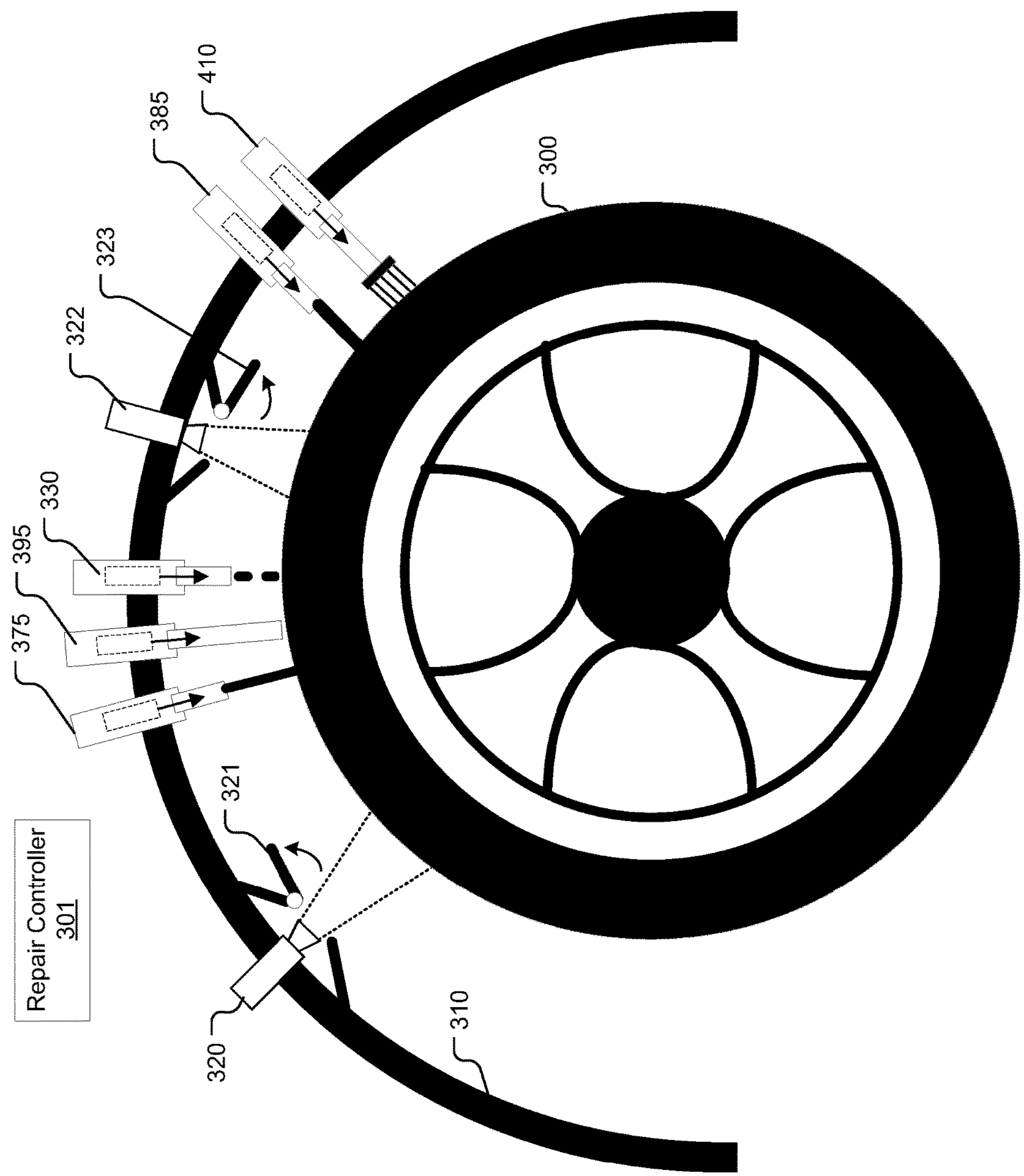
FIG. 35 depicts a tire-repairing system including a brush-type cleaner, a tire-contacting conductive heater, a first tire sensor, a 3D printing device, an extendable tire-contacting vulcanizer, a tire-contacting cutting tool and a second tire sensor.

FIG. 35 depicts a tire-repairing system having two tire sensors 320, 322. Specifically, as in the embodiment depicted in FIG. 35, the tire-repairing system includes a brush-type cleaner 410, a tire-contacting conductive heater 385, a first tire sensor 320 with a first protective hatch 321, a 3D printing device 330, an extendable tire-contacting vulcanizer 395, a tire-contacting cutting tool 375 and a second tire sensor 322 with a second protective hatch 323. All of these components may be controlled by the repair controller 301.

Figure 36:
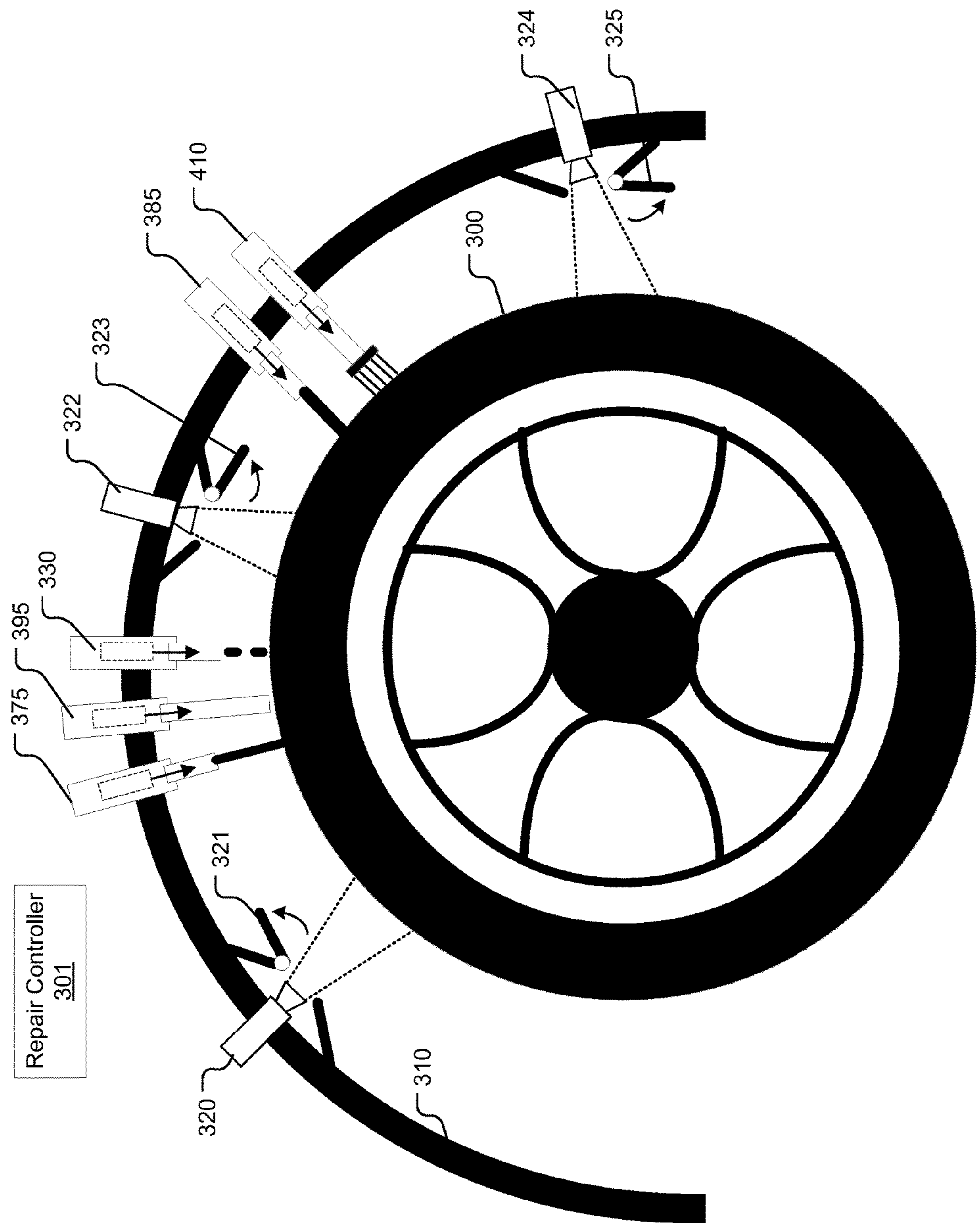
FIG. 36 depicts a tire-repairing system including a first tire sensor, a brush-type cleaner, a tire-contacting conductive heater, a second tire sensor, a 3D printing device, an extendable tire-contacting vulcanizer, a tire-contacting cutting tool and a third tire sensor.

FIG. 36 depicts a tire-repairing system having three tire sensors 320, 322, 324. Specifically, as in the embodiment depicted in FIG. 36, the tire-repairing system includes a brush-type cleaner 410, a tire-contacting conductive heater 385, a first tire sensor 320 with a first protective hatch 321, a 3D printing device 330, an extendable tire-contacting vulcanizer 395, a tire-contacting cutting tool 375, a second tire sensor 322 with a second protective hatch 323, and a third tire sensor 324 with a third protective hatch 325. All of these components may be controlled by the repair controller 301.

The tire condition may, in some embodiments, be the tire tread condition. Accordingly, in these embodiments, the vehicle includes a tire tread sensor for sensing a tire tread condition and for generating and outputting a tire tread condition signal indicative of the tire tread condition. The vehicle has a repair controller for receiving the tire tread condition signal from the tire sensor and for processing the tire tread condition signal to determine whether to repair the tire tread, wherein the repair controller is configured to generate and output a tire tread repair signal. The vehicle includes a 3D printing device disposed in the wheel well and communicatively connected to the repair controller to receive the tire tread repair signal and to 3D print an additive reparation to the tire tread by drawing a tire repair compound from a supply container within the vehicle and by depositing the tire repair compound on the tire tread to repair the tire tread. The various embodiments described above relating to the tire condition generally are applicable to the tire tread specifically. For example, the vehicle may include a laser cutter communicatively connected to, and controlled by, the repair controller to cut a groove in the additive reparation deposited on the tire tread. The vehicle may have a vulcanizer to vulcanize the tire repair compound deposited on the tire tread. The vehicle may comprise a heater to heat a portion of the tire tread where the tire repair compound is to be deposited to enhance adhesion of the tire repair compound to the tire tread. The vehicle may comprise a fluidjet cleaner to clean the tire tread prior to depositing the tire repair compound onto the tire tread.

Also disclosed herein is a method of repairing a tire tread of a vehicle when mounted to the vehicle. This method obviates the need to dismount the wheel and tire from the vehicle to effect the repair or refurbishment. This method thereby provides a technique for a vehicle to self-heal by autonomously repairing one or more of its tires when worn or damaged using one or more onboard 3D printing devices capable of depositing tire repair compound onto the tire treads in response to detecting that the tire tread is worn or damaged.

The method entails sensing a tire tread condition, using a tire sensor disposed within a wheel well of the vehicle, wherein sensing comprises generating and outputting a tire tread condition signal indicative of the tire tread condition. The method includes receiving, by a repair controller, the tire tread condition signal from the tire sensor and then processing the tire tread condition signal to determine whether to repair the tire tread, the repair controller generating and outputting a tire tread repair signal. The method includes receiving the tire tread repair signal by a 3D printing device and then, in response to receiving the tire tread repair signal, depositing a tire repair compound using the 3D printing device on a portion of the tire tread to repair the tire tread of the tire. The method may be performed in various different ways, using the techniques described herein. For example, the method may comprise vulcanizing the tire repair compound after depositing the tire repair compound. The tire repair compound may be green rubber or TPU. The method may comprise cutting a groove in the tire repair compound after depositing the tire repair compound. The method may comprise autonomously moving the vehicle forward or backward so that rotation of the tires sequentially exposes all portions of the tire tread for sensing and repair. The method enables a vehicle to self-heal or repair its tires while the tires are mounted to the vehicle. In-situ repair of the tire or tires using embodiments of this invention obviates the need to remove the wheel and tire from the vehicle.

As introduced earlier with regard to FIG. 6, the vehicle may include a coating-dispensing device 500. The coating-dispensing device 500 may be provided instead of, or in addition to, the 3D printing device. The coating-dispensing device 500 may be used to dispense a coating onto a tire. The vehicle may have one coating-dispensing device 500 per tire, i.e. four coating-dispensing devices on the vehicle. The coating-dispensing device 500 may be used to coat tires with a grip-enhancing coating to improve tire grip. In one embodiment, as described above with regard to FIG. 6, the vehicle downloads road condition data and then pre-emptively coats the tires with a grip-enhancing coating to improve the grip of the tires for safer traveling over icy, snowy, wet or otherwise slippery roads. The coating may be a spray-on resin coating that improves grip in icy conditions. The coating-dispensing device 500 may be controlled by a coating controller 501.

Figure 37:
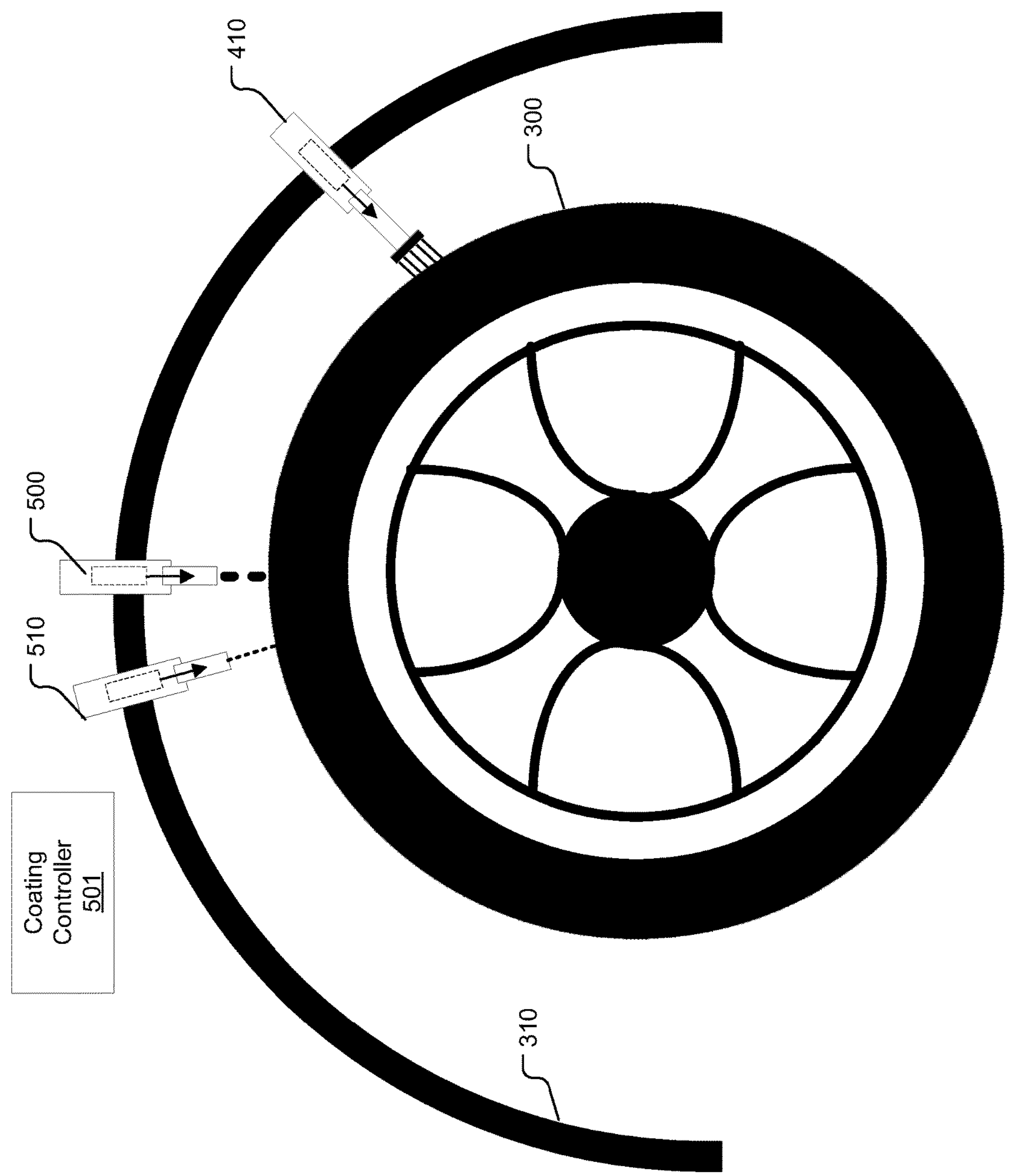
FIG. 37 depicts a tire-coating system that includes a brush-type cleaner, a coating-dispensing device for dispensing a coating onto a tire, and a curing light.

FIG. 37 depicts a tire-coating system including a brush-type cleaner 410, a coating-dispensing device 500 for dispensing a coating onto the tire and a curing light 510 for curing the coating. The brush-type cleaner 410, coating-dispensing device 500 and curing light are controlled by the coating controller 501.

Figure 38:
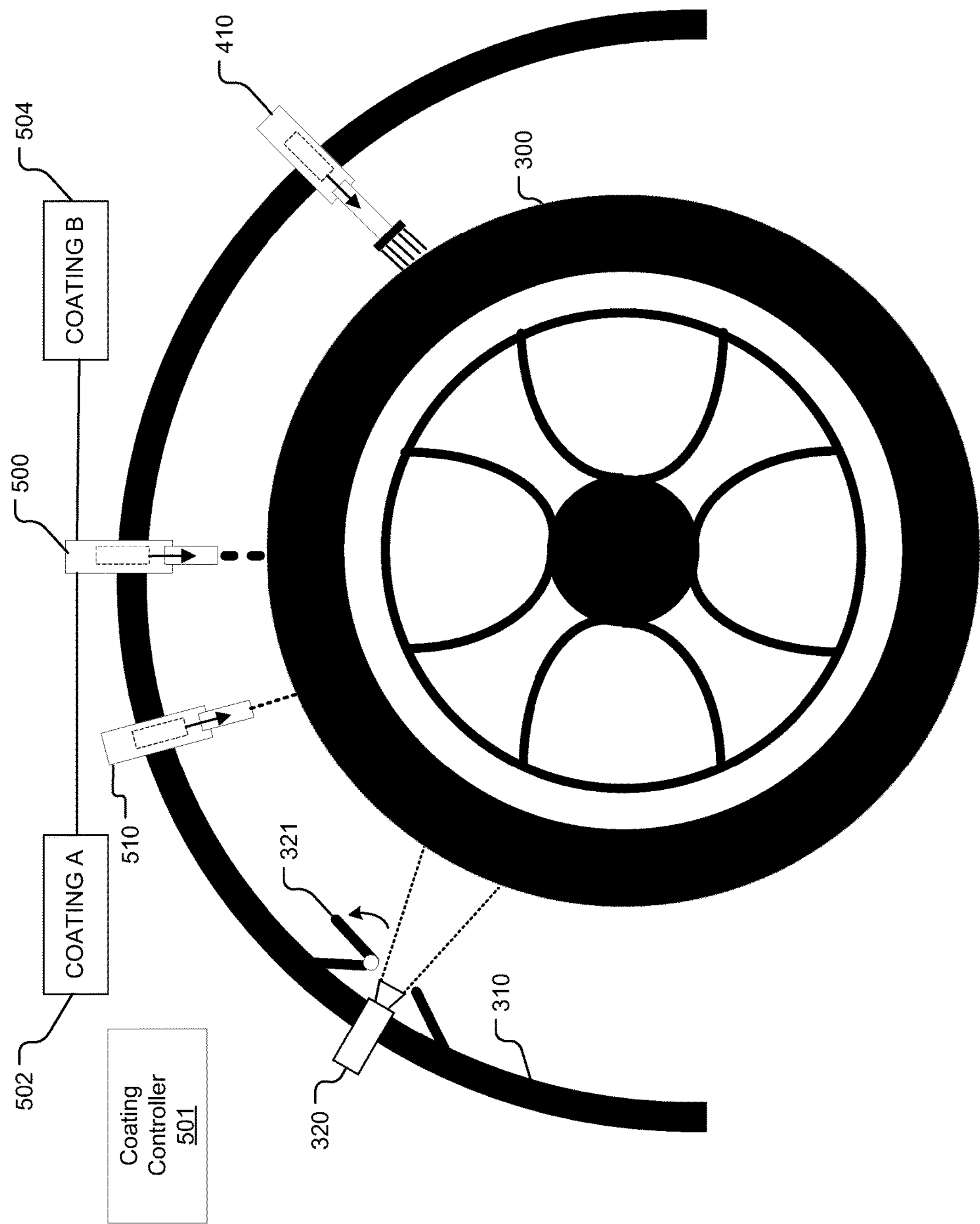
FIG. 38 depicts a tire-coating system that includes a brush-type cleaner, a coating-dispensing device for dispensing two different coatings, a curing light and a tire sensor.

FIG. 38 depicts a tire-coating system for dispensing two different coatings. The tire-coating system includes the brush-type cleaner 410, the coating-dispensing device 500 for dispensing two different coatings, and the curing light 510. In addition, this embodiment includes a tire sensor 320 and hatch 321 for inspecting the tire to assess or how much coating has been applied and/or how much has worn off. The coating-dispensing device 500 may be connected to the first coating supply container 502 via a first distribution line with a first valve and to the second coating supply container 504 via a second distribution line with a second valve. In one embodiment, the coating controller 501 selects one of the two coatings to apply based on road conditions. In another embodiment, the coating controller may apply a first coating for a first road condition and then a second coating for a second road condition so that when the first coating wears off the second coating is exposed. In another embodiment, the first coating may be a primer for the second coating.

Figure 39:
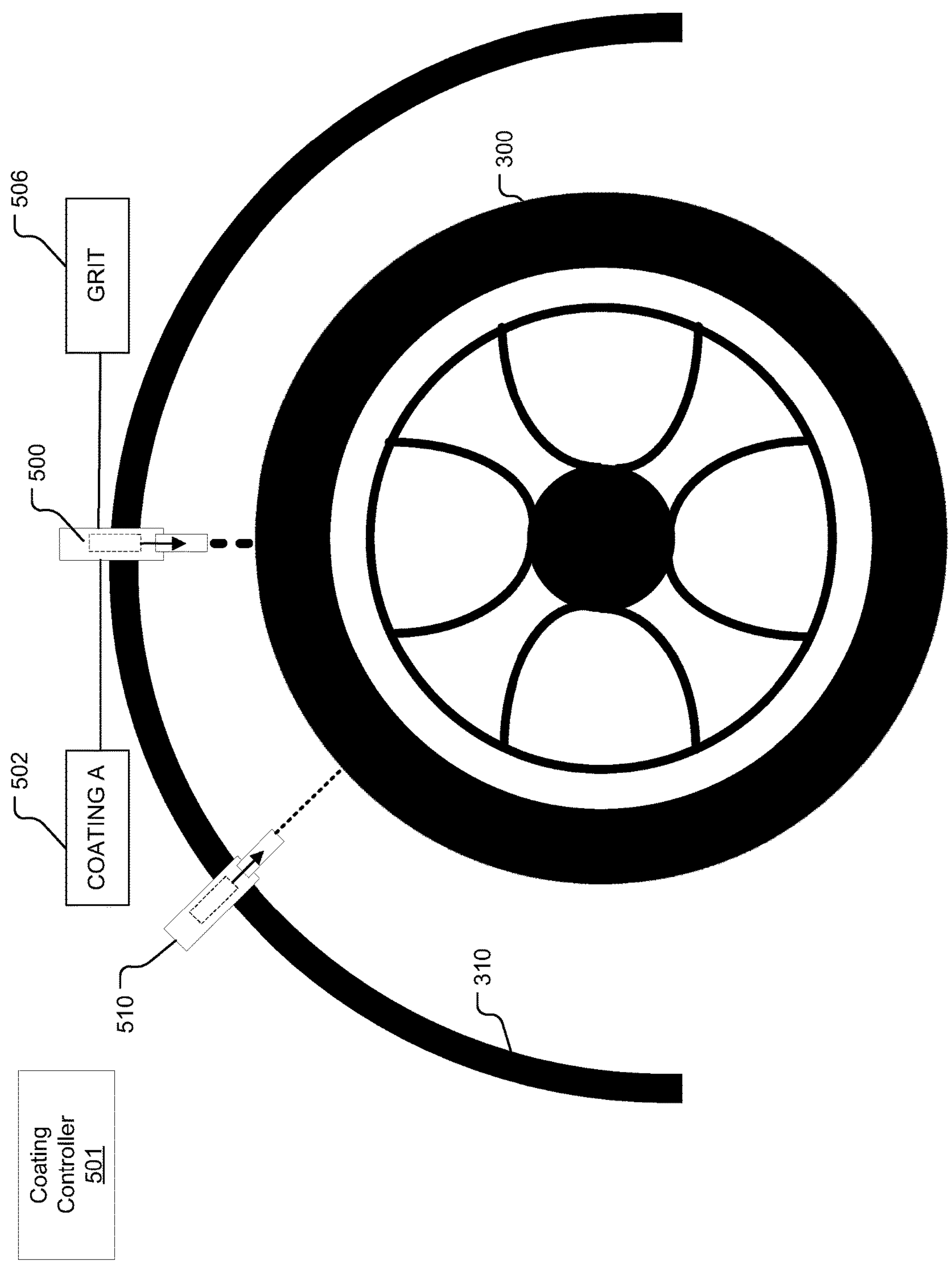
FIG. 39 depicts a tire-coating system that includes a coating-dispensing device for dispensing a coating and grit.

FIG. 39 depicts a tire-repairing system for dispensing a coating and grit onto the tires. The tire-repairing system of FIG. 39 includes for each tire a coating-dispensing device 500 for dispensing a coating and grit onto each tire. The coating may be drawn from a coating supply container 502 whereas the grit may be drawn from a grit supply container 506. In one embodiment the grit may be mixed with the coating in a mixing chamber or manifold prior to being dispensed by the coating-dispensing device 500. The mixing chamber or manifold may be part of the coating-dispensing device 500. In another embodiment the coating is sprayed onto the tire and the grit is dispensed onto the freshly coated tire. Optionally, a curing light 510 may be provided to cure the coating. In other embodiments where the coating does not require curing, there is no need for the curing light. The coating controller 501 may be communicatively connected to the coating-dispensing device 500 and the curing light 510 to control these two components.

Figure 40:
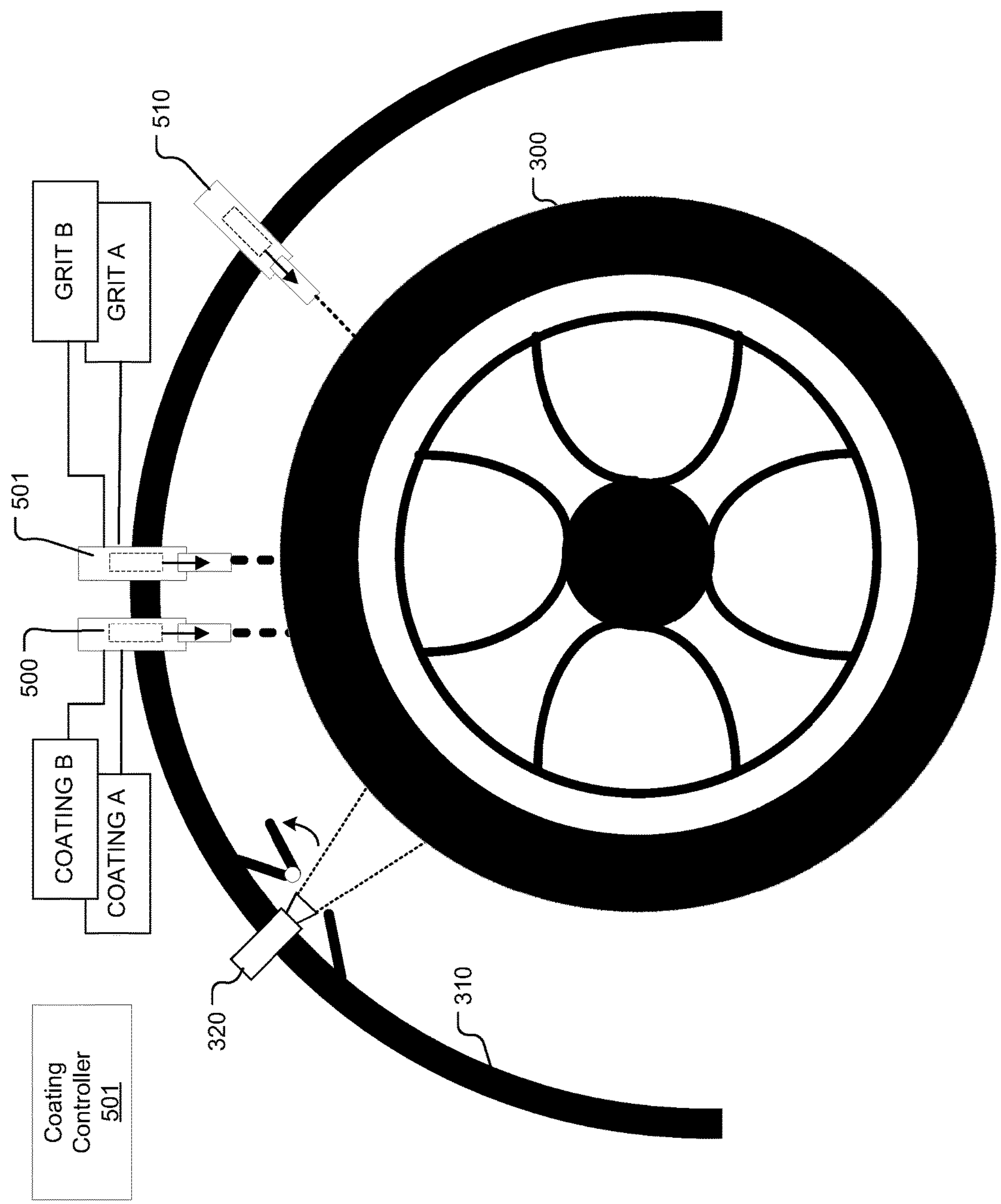
FIG. 40 depicts a tire-coating system capable of dispensing two different coatings and two different types of grit onto a tire.

FIG. 40 depicts a tire-repairing system having a coating-dispensing device 500 and a separate grit-dispensing device 501. The coating-dispensing device 500 is capable of depositing two different coatings. The grit-dispensing device 501 is capable of dispensing two different types of grit onto the tire. The coating controller 501 may coordinate the coating and grit so that the coating is applied first and then the grit is added to the coated tire while the coating is still fresh and has not dried or set. The coating controller 501 receives signals (e.g. images) of the tire from the tire sensor 320 to determine how much coating and grit has been applied and thus to control the application of the coating and grit. In one embodiment, the coating controller 501 selects one of the coatings and then one of the two grits depending on road conditions. In another embodiment, the coating controller 501 can apply two grit types to the same coating.

Figure 41:
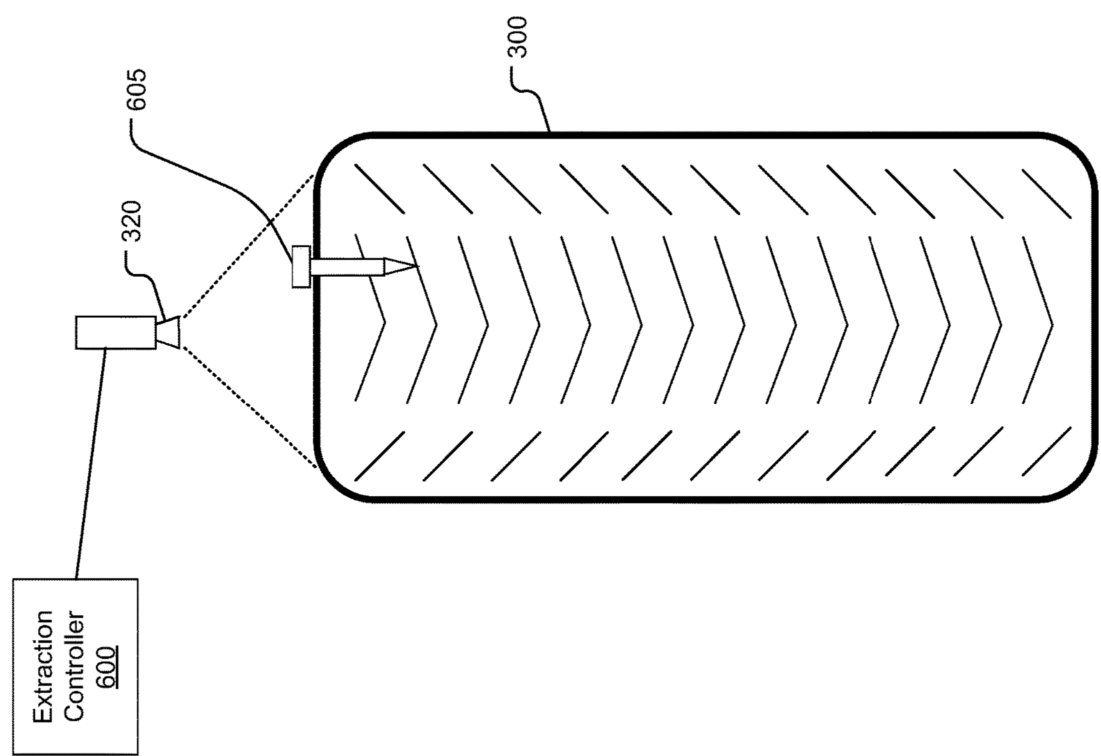
FIG. 41 is a front view of a tire sensor detecting that a tire has been punctured by a nail.
Figure 42:
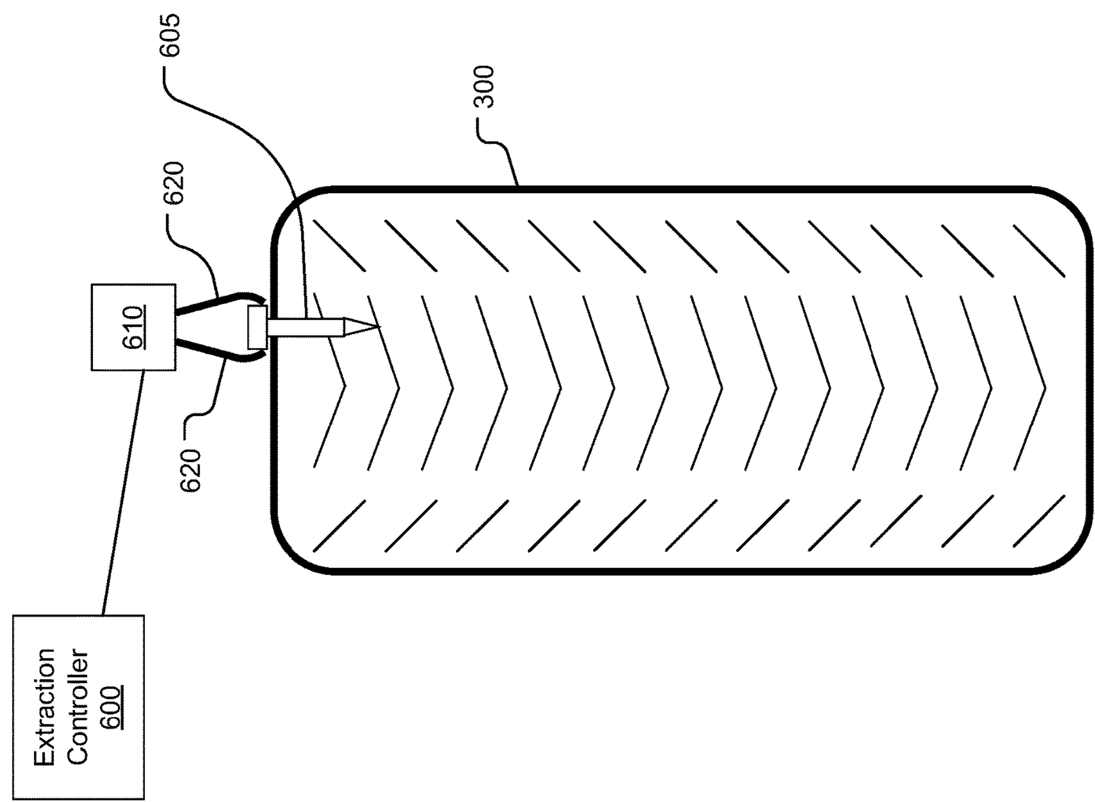
FIG. 42 is a front view of a pincer-type nail-extraction tool for extracting the nail from the tire.
Figure 43:
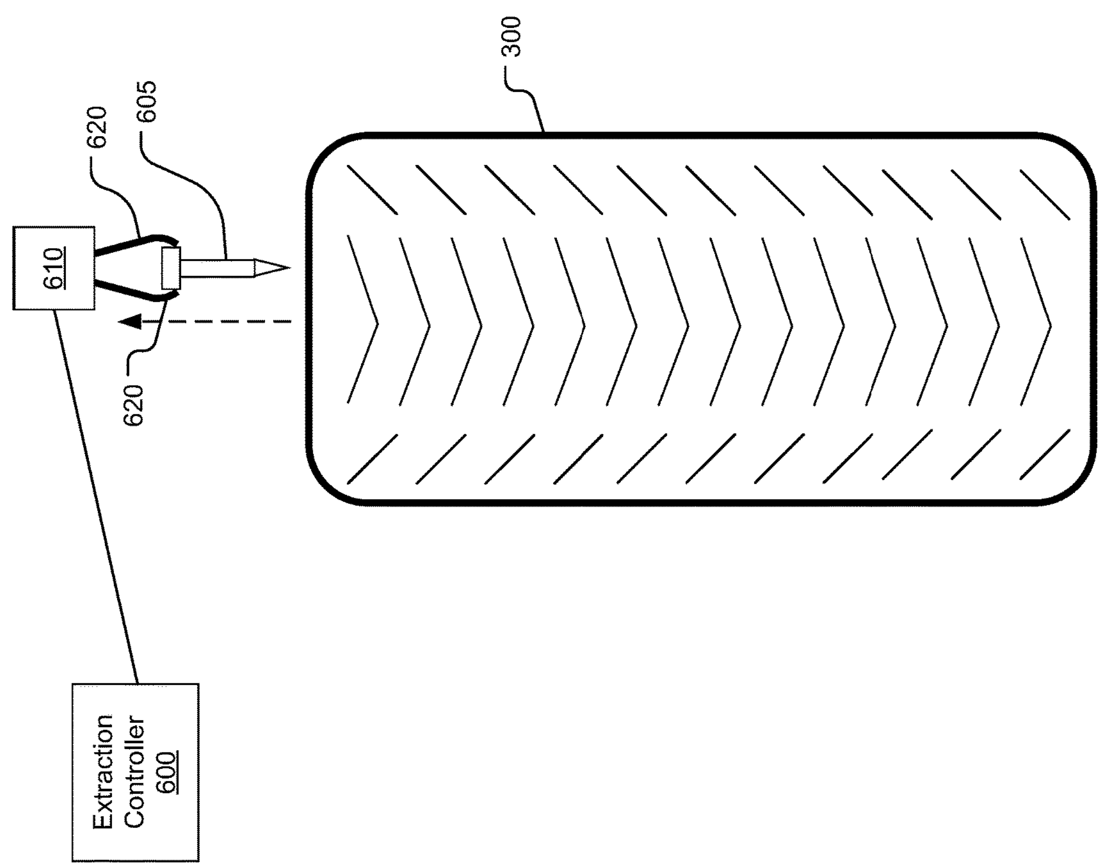
FIG. 43 is a front view of the pincer-type nail-extraction tool of FIG. 42 after extraction of the nail from the tire.

In another aspect, the vehicle 10 includes a nail-extraction system for automatically extracting a nail 605 from a tire 300 of the vehicle. The nail-extraction system may include a tire sensor 320 to detect the nail 605. FIG. 41 is a front view of the tire sensor 320 detecting that the tire 300 has been punctured by a nail 605. In the embodiment shown in FIG. 41, the nail-extraction system includes an extraction controller 600. The extraction controller 600 is communicatively connected to the tire sensor 320 to receive a signal or image data from the tire sensor to enable the extraction controller 600 to determine that the tire has been punctured by a nail or other sharp foreign object. It will be appreciated the term "nail" is meant for this specification to denote any sharp nail-like object such as a nail, screw, shard, or other sharp elongated object that has punctured the tire. The extraction controller 600 sends a command signal to a pincer-type nail-extraction tool 610 as shown in FIG. 42 for extracting the nail 605 from the tire 300. As further shown in FIG. 42, the nail-extraction tool 610 has two pincers 620 (or jaws) to grip the nail and to remove the nail from the tire. To remove the nail, the pincer-type nail-extraction tool 610 may be actuated upwardly as shown in FIG. 43. The upward actuation may by performed by an actuator subsystem (e.g. linear actuator) not shown in the figures. The upward actuation may be controlled by the extraction controller 600.

Figure 44:
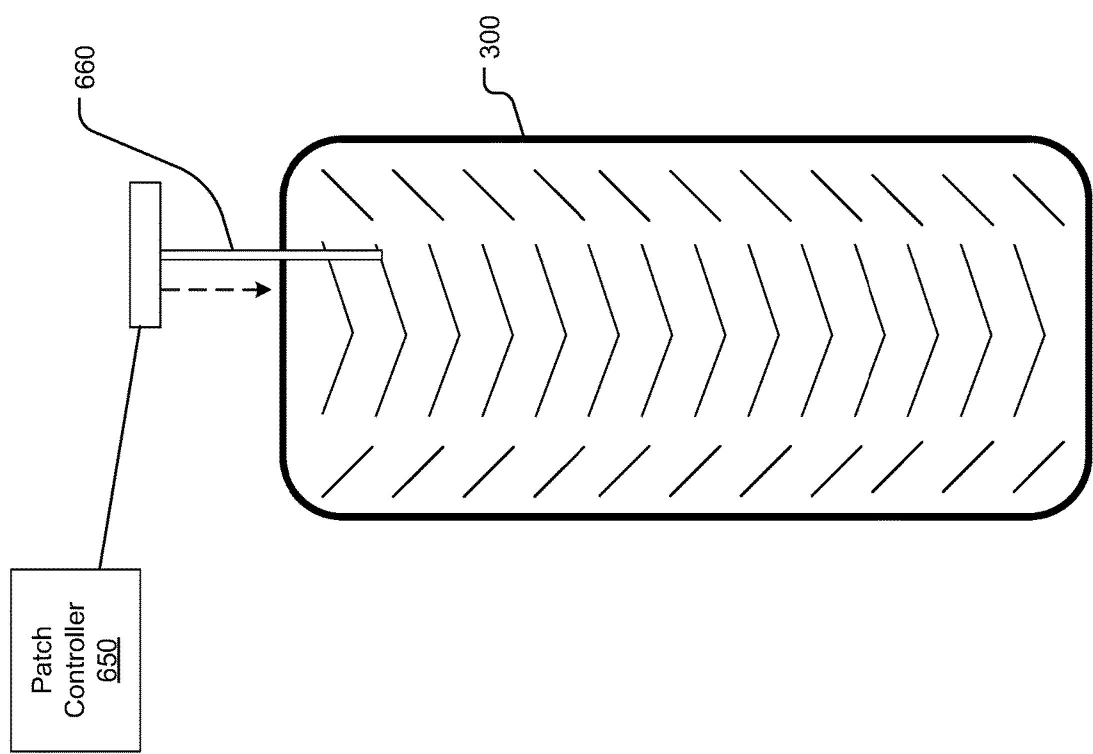
FIG. 44 is a front view of a tire-patching tool inserted into the punctured tire.
Figure 45:
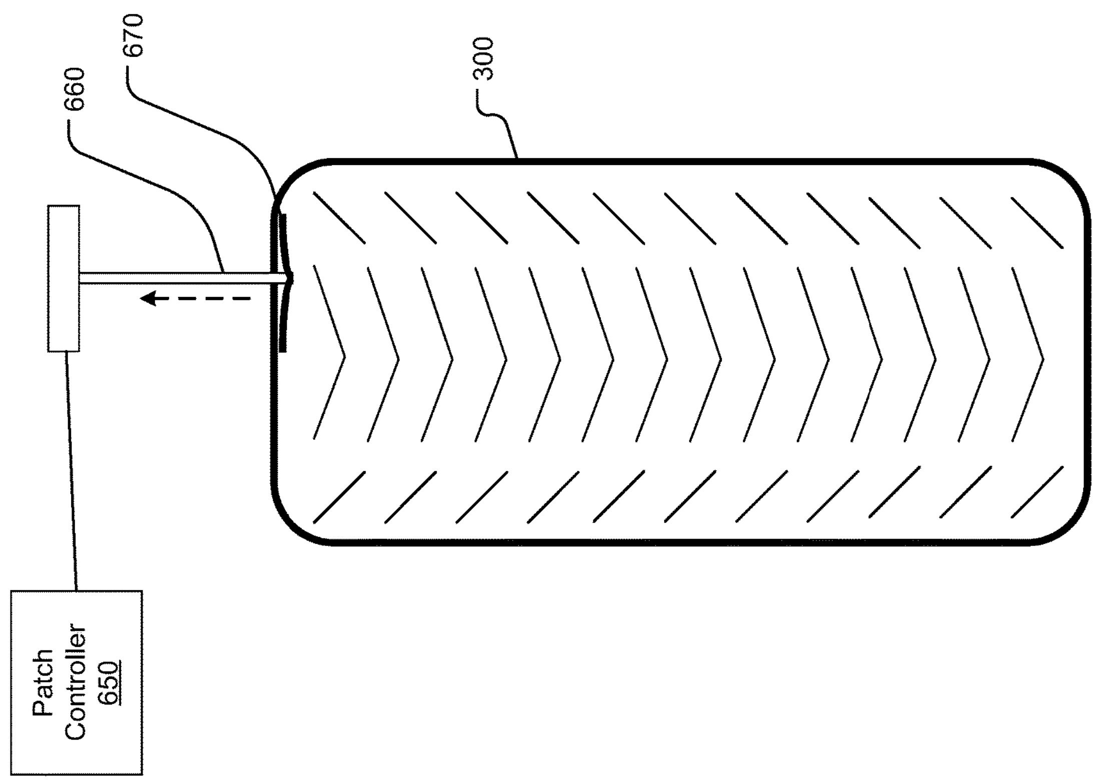
FIG. 45 is a front view of a patch being deployed inside the punctured tire to seal the puncture in the tire.
Figure 46:
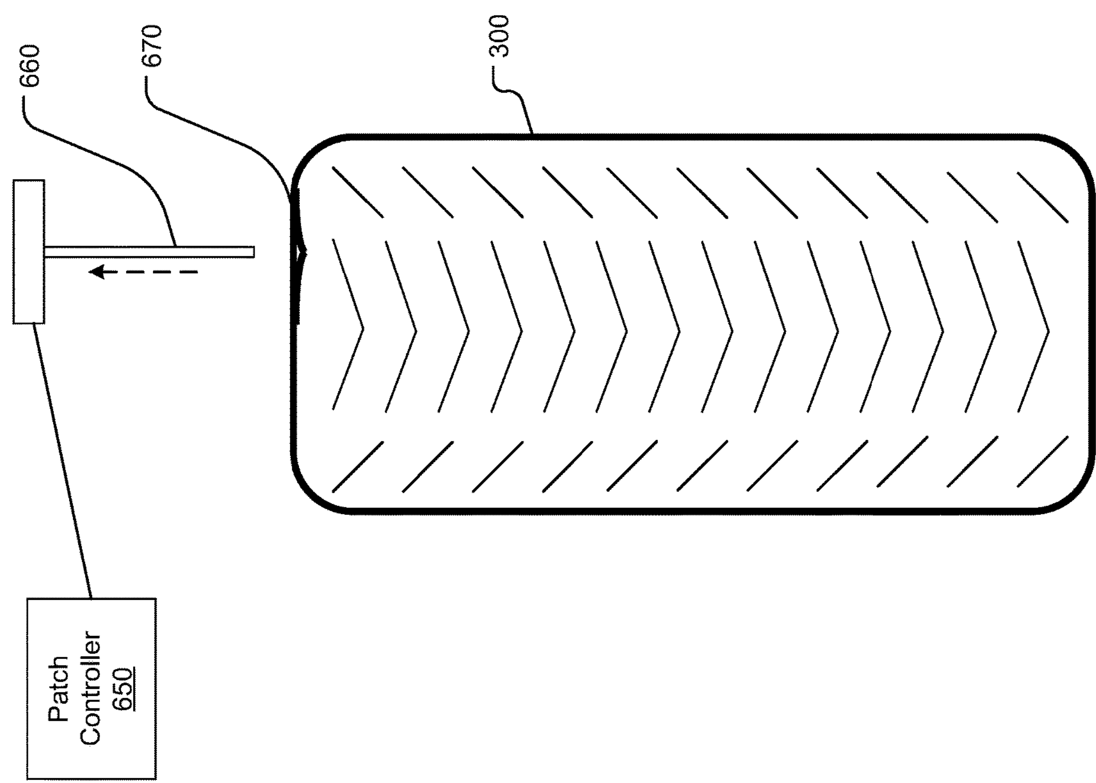
FIG. 46 is a front view of the patch after deployment inside the tire.
Figure 47:
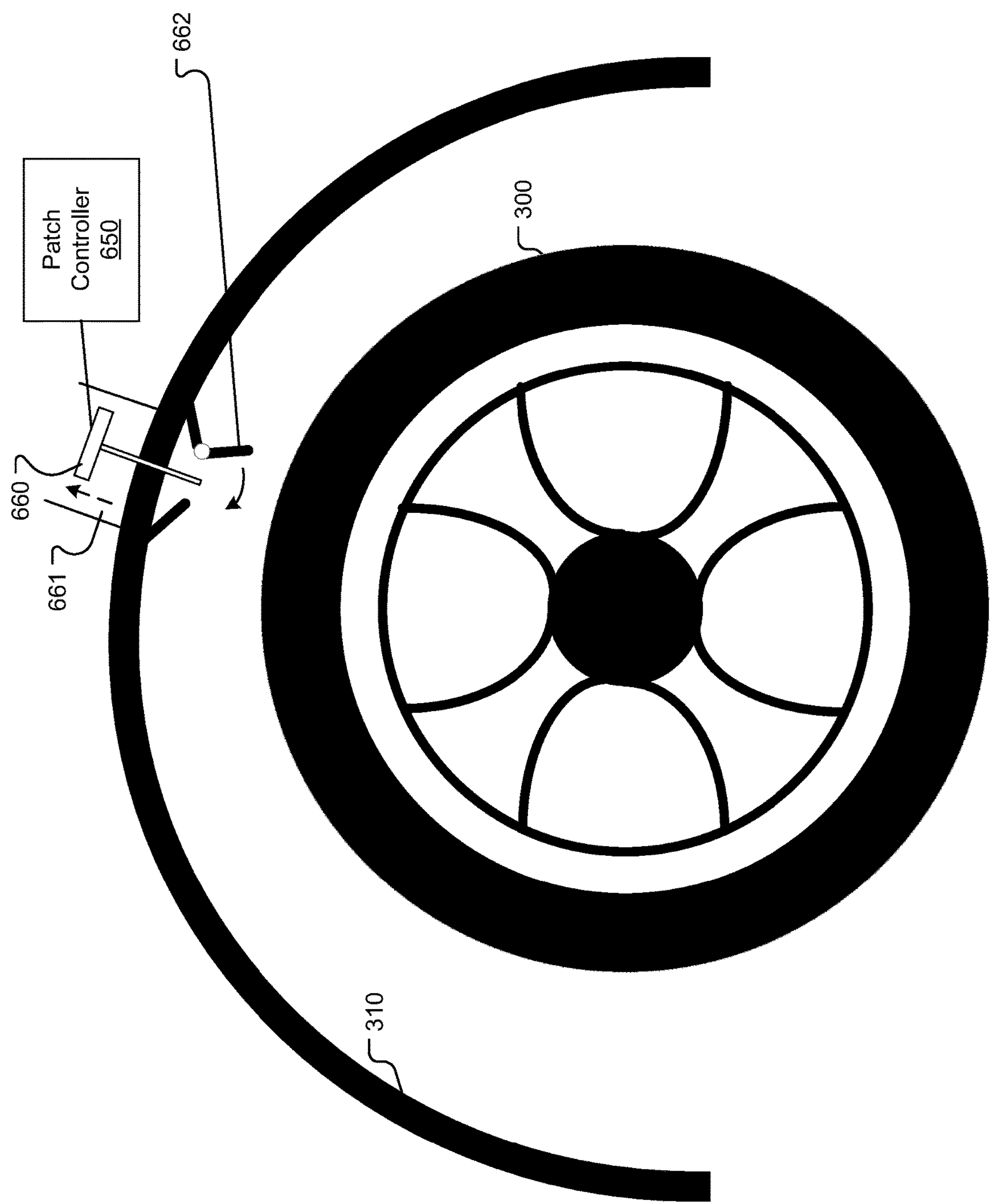
FIG. 47 is a side view of the tire-patching tool being retracted into a housing socket disposed in a wheel well and a hatch being closed to cover the housing socket of the tire-patching tool.

In another aspect, the vehicle 10 has a tire-patching system for patching a punctured tire. FIG. 44 is a front view of a patch controller 650 for controlling a tire-patching tool 660 that is inserted into the punctured tire 300. Once the tire-patching tool 660 has been inserted into the tire 300, a patch 670 is deployed inside the punctured tire to seal the puncture in the tire as shown in FIG. 45. The patch controller 650 withdraws the tire-patching tool 600 from the tire. FIG. 46 shows the patch 670 after deployment inside the tire 300. FIG. 47 is a side view of the tire-patching tool 660 being retracted into a housing socket 661 disposed in a wheel well. The tire-patching tool 660 and its housing socket 661 may be protected by a hatch 662 that may be closed to cover the housing socket 661 of the tire-patching tool 660.

Figure 48:
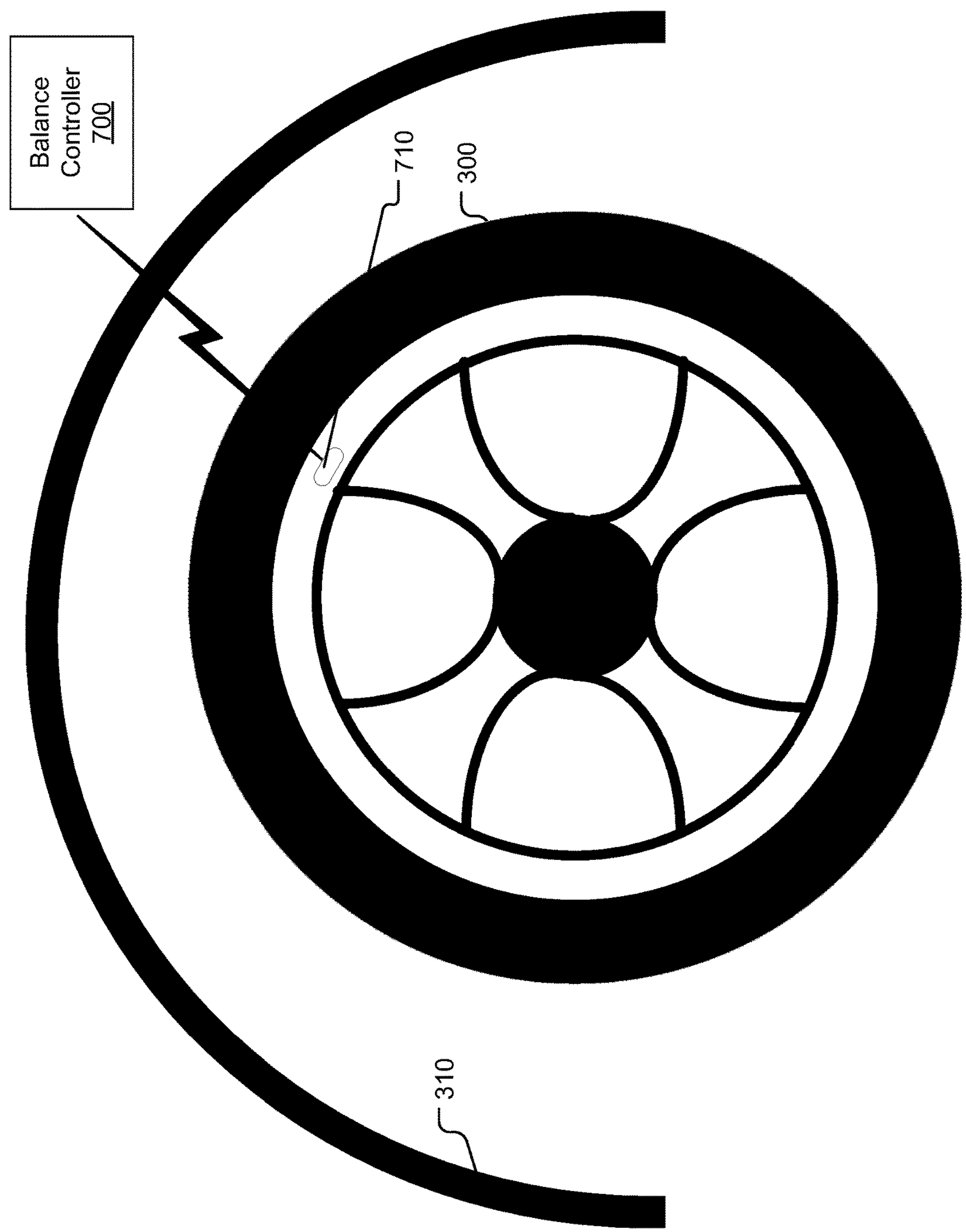
FIG. 48 is a side view of an automatically adjustable tire-balancing weight that is automatically adjustable by a wheel-balancing controller to balance the wheel.

In another aspect, the vehicle 10 has a tire-balancing system to automatically balance a wheel (i.e. a wheel-tire combination). This may be used after a tire repair is performed or independently of a repair, e.g. upon detecting a rotational vibration larger than a predetermined amount. The tire-balancing system is controlled by a balance controller 700 (or wheel-balancing controller). The tire-balancing system also includes, as shown in FIG. 48, an automatically adjustable tire-balancing weight 710 that is automatically adjustable by the wheel-balancing controller 700 to balance the wheel.

Figure 49:
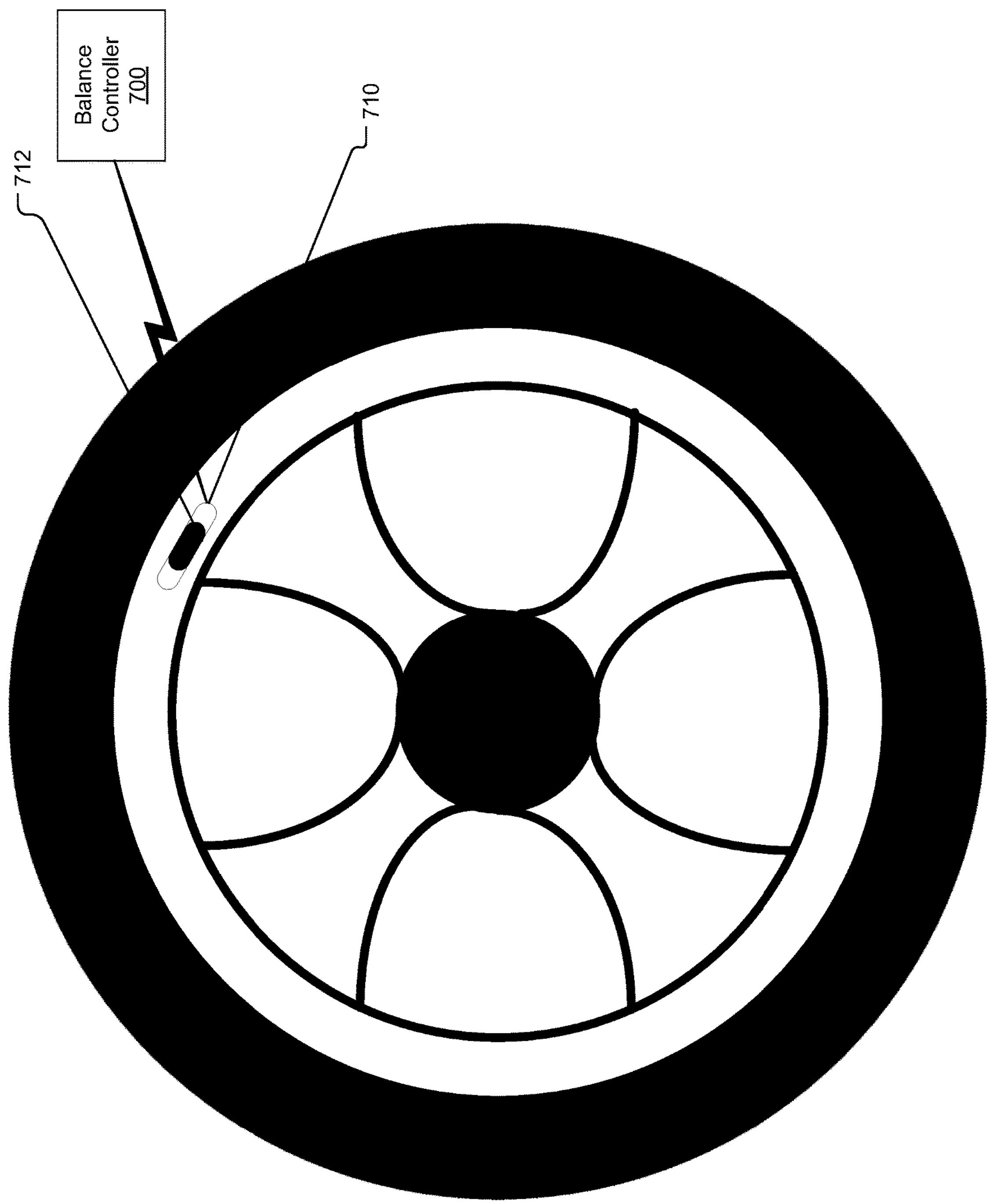
FIG. 49 is a side view of an automatically adjustable tire-balancing weight that is automatically movable within a track.

FIG. 49 is a side view of an automatically adjustable tire-balancing weight 710 that is automatically movable within a track 712. The track may be curved to match the curvature of the wheel. The automatically adjustable tire-balancing weight 710 may be moved by an actuator or it may be self-motive (e.g. it may have its own internal motor to move itself). The automatically adjustable tire-balancing weight may have a locking mechanism to lock the weight in place.

Figure 50:
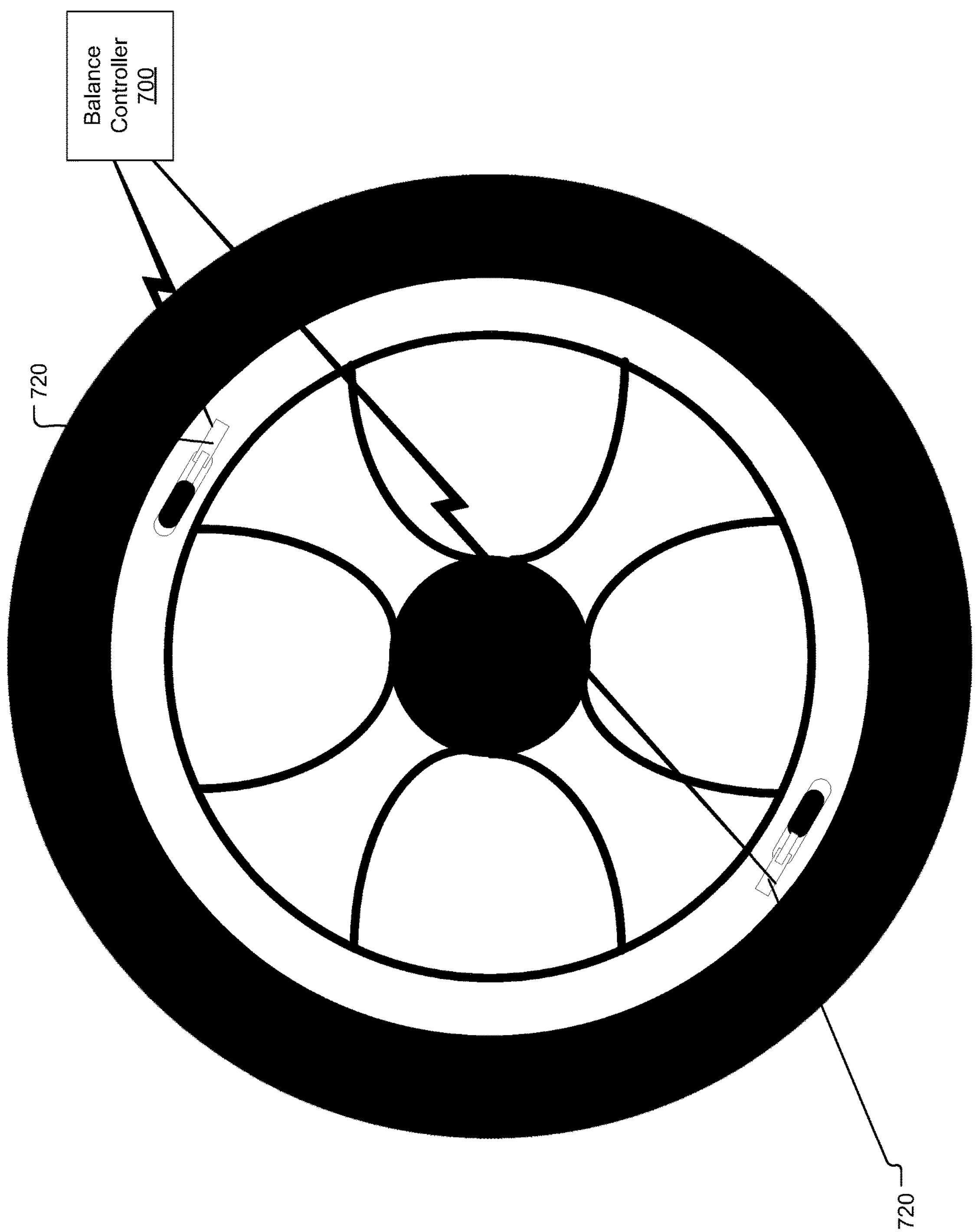
FIG. 50 is a side view of two automatically adjustable tire-balancing weights that are automatically adjustable by respective balance-adjusting actuators.

FIG. 50 is a side view of two automatically adjustable tire-balancing weights that are automatically adjustable by respective balance-adjusting actuators 720. The actuators may be disposed on the inside of the wheel for aesthetic reasons.

Figure 51:
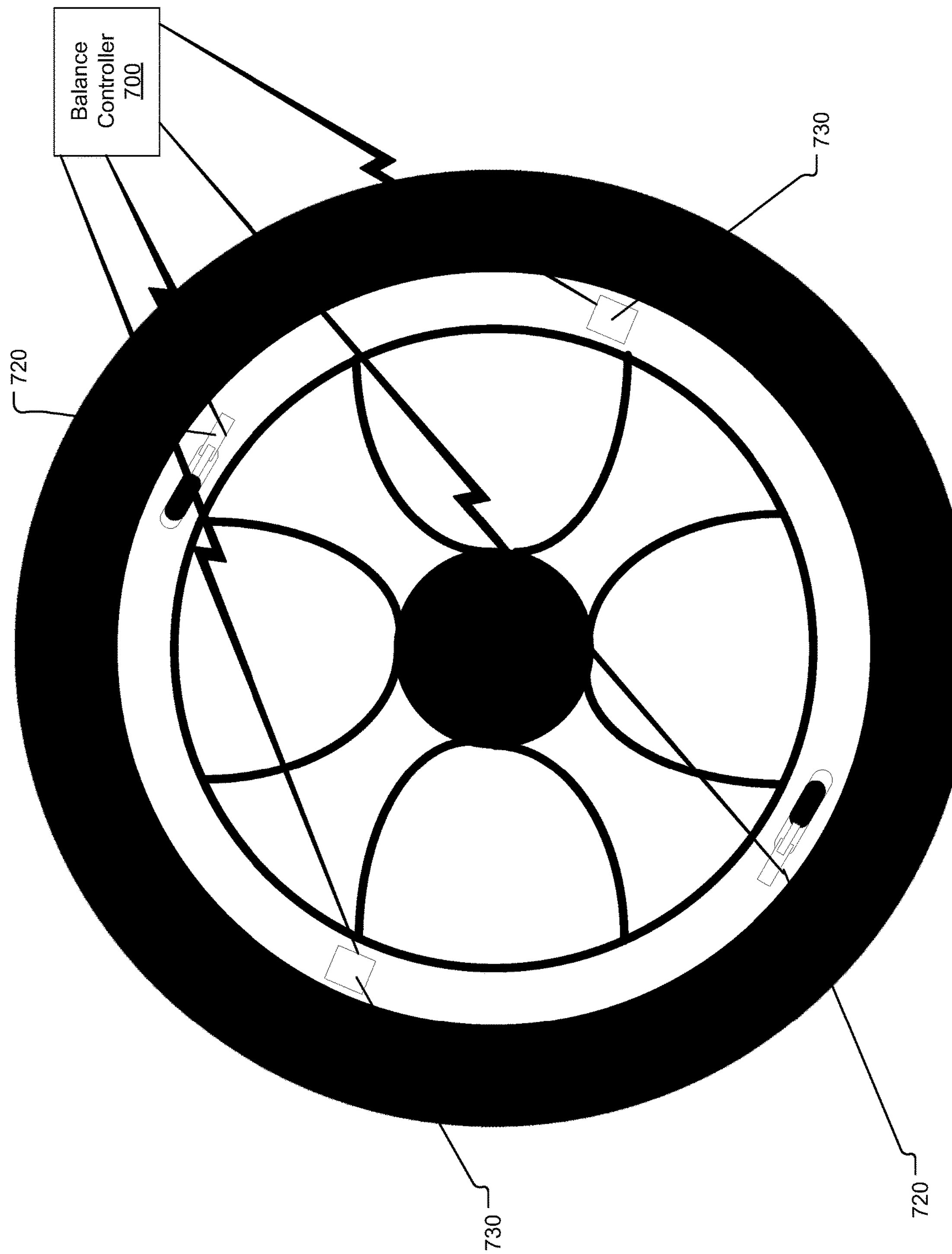
FIG. 51 is a side view of two vibration sensors mounted to a wheel to enable the balance-adjusting actuators to automatically adjust the weights.

FIG. 51 is a side view of two vibration sensors 730 mounted to a wheel to enable the balance-adjusting actuators 720 to automatically adjust the weights. The vibration sensors may detect vibrations due to a rotating imbalance of the wheel-tire combination. The vibrations sensors communicate the vibration signals to the balance controller 700. In response to receiving the vibration signals, the balance controller 700 generates and outputs a balance control signal to the balance-adjusting actuators 720 to adjust the weights to reduce the vibrations.

Figure 52:
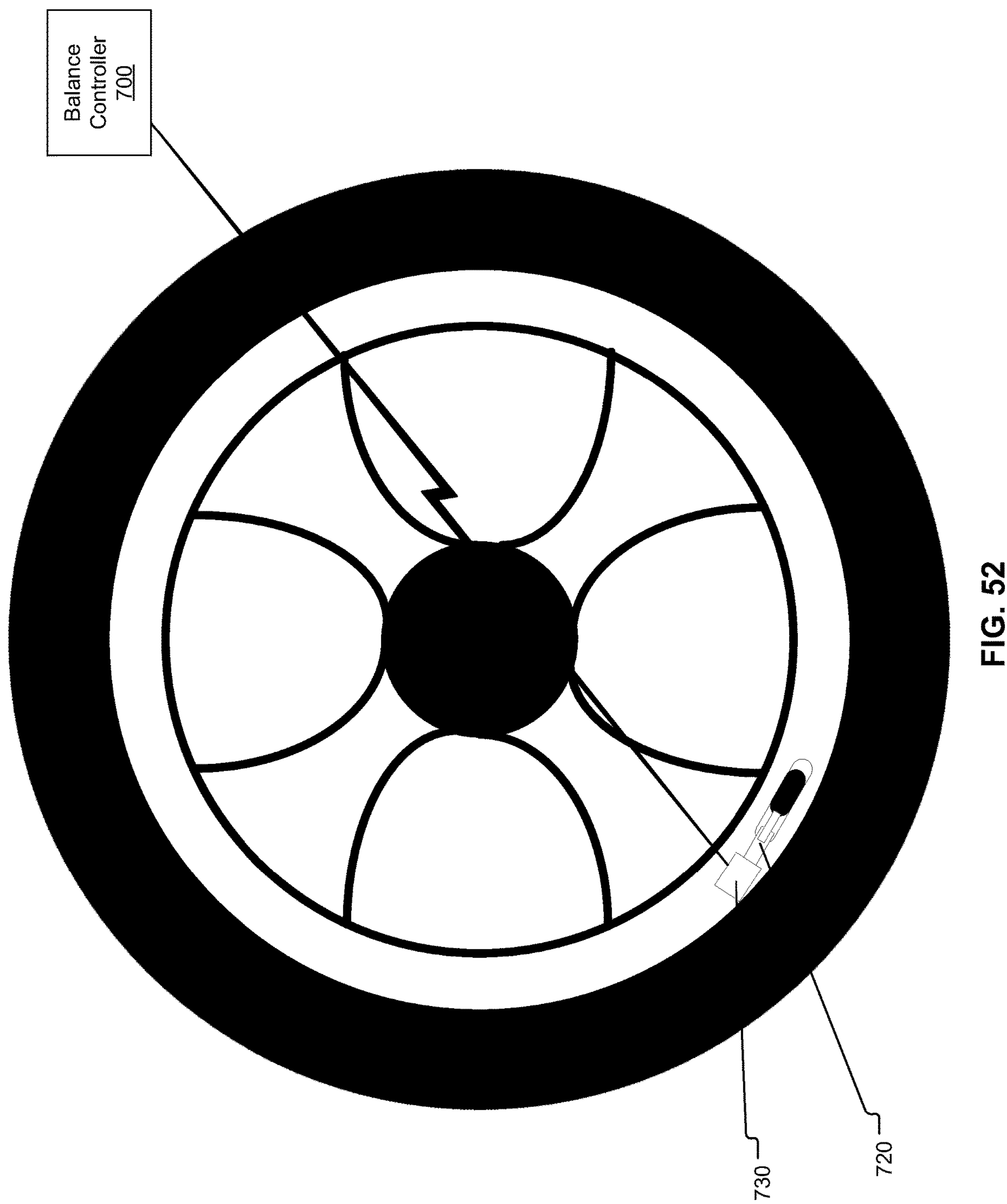
FIG. 52 is a side view of a single vibration sensor mounted to a wheel to enable a single balance-adjusting actuator to automatically adjust a weight.

In another embodiment, as shown in FIG. 52, the tire-balancing system may have only a single vibration sensor 730 and a single balance-adjusting actuator 720. The single vibration sensor 730 is mounted to the wheel to enable the single balance-adjusting actuator 720 to automatically adjust the automatically adjustable tire-balancing weight 710.

These methods can be implemented in hardware, software, firmware or as any suitable combination thereof. That is, if implemented as software, the computer-readable medium comprises instructions in code which when loaded into memory and executed on a processor of a tablet or mobile device causes the tablet or mobile device to perform any of the foregoing method steps. These method steps may be implemented as software, i.e. as coded instructions stored on a computer readable medium which performs the foregoing steps when the computer readable medium is loaded into memory and executed by the microprocessor of the mobile device. A computer readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

For the purposes of interpreting this specification, when referring to elements of various embodiments of the present invention, the articles “a”, “an”, “the” and “said” are intended to mean that there are one or more of the elements. The terms “comprising”, “including”, “having”, “entailing” and “involving”, and verb tense variants thereof, are intended to be inclusive and open-ended by which it is meant that there may be additional elements other than the listed elements.

This new technology has been described in terms of specific implementations and configurations which are intended to be exemplary only. Persons of ordinary skill in the art will appreciate that many obvious variations, refinements and modifications may be made without departing from the inventive concepts presented in this application. The scope of the exclusive right sought by the Applicant(s) is therefore intended to be limited solely by the appended claims.

The invention claimed is:

1. A vehicle comprising:

a chassis;

wheels rotationally mounted to the chassis, the wheels being disposed within respective wheel wells;

a tire mounted to each of the wheels;

a tire sensor mounted to the vehicle and disposed within one of the wheel wells for sensing a tire condition and for generating and outputting a tire condition signal indicative of the tire condition;

a repair controller disposed within the vehicle for receiving the tire condition signal from the tire sensor and for processing the tire condition signal to determine whether to repair the tire, wherein the repair controller is configured to generate and output a tire repair signal;

a supply container within the vehicle for containing a tire repair compound; and a 3D printing device attached to the vehicle and disposed in the one of the wheel wells in which the tire sensor is also disposed, the 3D printing device being communicatively connected to the repair controller to receive the tire repair signal and to 3D print an additive reparation to the tire by drawing the tire repair compound from the supply container and by depositing the tire repair compound on a portion of an exterior surface of the tire to repair the tire.

2. The vehicle of claim 1 comprising a laser cutter mounted to the vehicle within the one of the wheel wells in which the tire sensor is also disposed, the laser cutter being communicatively connected to, and controlled by, the repair controller to cut a groove in the additive reparation deposited on the tire.

3. The vehicle of claim 1 comprising a vulcanizer mounted to the vehicle within the one of the wheel wells in which the tire sensor is also disposed, the vulcanizer operable to vulcanize the tire repair compound deposited on the tire.

4. The vehicle of claim 1 comprising a heater mounted to the vehicle within the one of the wheel wells in which the tire sensor is also disposed, the heater being operable to heat a portion of the tire where the tire repair compound is to be deposited to enhance adhesion of the tire repair compound to the tire.

5. The vehicle of claim 1 comprising a fluidjet cleaner mounted to the vehicle within the one of the wheel wells in which the tire sensor is also disposed, the fluidjet cleaner being operable to clean the tire prior to depositing the tire repair compound onto the tire.

6. The vehicle of claim 1 comprising a brush mounted to the vehicle within the one of the wheel wells in which the tire sensor is also disposed, the brush being operable to clean the tire prior to depositing the tire repair compound onto the tire.

7. The vehicle of claim 1 wherein the 3D printing device is a transversely movable 3D printing device.

8. The vehicle of claim 1 wherein the tire sensor has a pivotal hatch to protect the tire sensor and to keep the tire sensor clean.

9. The vehicle of claim 1 wherein the tire sensor has a linearly extendable-retractable mechanism to protect the tire sensor and to keep the tire sensor clean.

10. The vehicle of claim 1 wherein the tire repair compound is thermoplastic polyurethane (TPU).

11. The vehicle of claim 1 wherein the tire repair compound is green rubber.

12. A vehicle comprising:

a chassis;

wheels rotationally mounted to the chassis and disposed within respective wheel wells;

tires mounted to the wheels, each tire having a tire tread;

a plurality of tire tread sensors attached to the vehicle and disposed within respective wheel wells for sensing tire tread conditions of the tire treads and for generating and outputting tire tread condition signals indicative of the tire tread conditions of the tire treads;

a repair controller disposed within the vehicle for receiving the tire tread condition signals from the tire tread sensors and for processing the tire tread condition signals to determine whether to repair one or more of the tire treads, wherein the repair controller is configured to generate and output a one or more tire tread repair signals; and a plurality of 3D printing devices attached to the vehicle and disposed in each of the wheel wells and communicatively connected to the repair controller to receive the one or more tire tread repair signals and to 3D print an additive reparation to one or more of the tire treads by drawing a tire repair compound from a supply container within the vehicle and by depositing the tire repair compound on the one or more tire treads to repair the one or more tire treads.

13. The vehicle of claim 12 comprising a plurality of laser cutters attached to the vehicle and disposed within the respective wheel wells and furthermore communicatively connected to, and controlled by, the repair controller to cut one or more grooves in the additive reparation deposited on the one or more tire treads.

14. The vehicle of claim 12 comprising a plurality of vulcanizers attached to the vehicle and disposed within the respective wheel wells to vulcanize the tire repair compound deposited on the one or more tire treads.

15. The vehicle of claim 12 comprising a plurality of heaters attached to the vehicle and disposed within the respective wheel wells to heat a one or more portions of the one or more tire treads where the tire repair compound is to be deposited to enhance adhesion of the tire repair compound to the one or more tire treads.

16. The vehicle of claim 12 comprising a plurality of fluidjet cleaners attached to the vehicle and disposed within the respective wheel wells to clean the one or more tire treads prior to depositing the tire repair compound onto the one or more tire treads.

17. A method of repairing a tire tread of a vehicle when mounted to the vehicle, the method comprising:

sensing a tire tread condition, using a tire sensor attached to the vehicle and disposed within a wheel well of the vehicle, wherein sensing comprises generating and outputting a tire tread condition signal indicative of the tire tread condition;

receiving, by a repair controller mounted in the vehicle, the tire tread condition signal from the tire sensor;

processing the tire tread condition signal to determine whether to repair the tire tread, the repair controller generating and outputting a tire tread repair signal; and receiving the tire tread repair signal by a 3D printing device mounted to the vehicle;

in response to receiving the tire tread repair signal, depositing a tire repair compound using the 3D printing device on a portion of the tire tread to repair the tire tread of the tire.

18. The method of claim 17 comprising vulcanizing the tire repair compound using a vulcanizer mounted to the vehicle after depositing the tire repair compound, wherein the tire repair compound comprises green rubber.

19. The method of claim 17 comprising cutting a groove in the tire repair compound using a cutter mounted to the vehicle after depositing the tire repair compound.

20. The method of claim 17 comprising autonomously moving the vehicle forward or backward so that rotation of the tires sequentially exposes all portions of the tire tread for sensing and repair.

* * * * *